United States Patent
Chang

(10) Patent No.: US 10,122,459 B2
(45) Date of Patent: Nov. 6, 2018

(54) RESOURCE ALLOCATION VIA WAVE-FRONT MULTIPLEXING IN A PON NETWORK

(71) Applicant: SPATIAL DIGITAL SYSTEMS, INC., Agoura Hills, CA (US)

(72) Inventor: Donald C. D. Chang, Thousand Oaks, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 0 days.

(21) Appl. No.: 15/883,087

(22) Filed: Jan. 29, 2018

(65) Prior Publication Data

US 2018/0159626 A1    Jun. 7, 2018

Related U.S. Application Data

(63) Continuation of application No. 15/652,233, filed on Jul. 17, 2017, now Pat. No. 9,882,641, which is a
(Continued)

(51) Int. Cl.
| | | |
|---|---|---|
| *H04B 10/25* | (2013.01) | |
| *H04J 14/00* | (2006.01) | |
| *H04J 14/02* | (2006.01) | |
| *H04Q 11/00* | (2006.01) | |

(Continued)

(52) U.S. Cl.
CPC .............. *H04B 10/25* (2013.01); *H04J 14/00* (2013.01); *H04J 14/0282* (2013.01);
(Continued)

(58) Field of Classification Search
CPC .. H04B 10/25; H04B 10/071; H04Q 11/0067; H04Q 11/0062; H04Q 2011/0064;
(Continued)

(56) References Cited

U.S. PATENT DOCUMENTS

| | | | | |
|---|---|---|---|---|
| 7,873,277 | B2 * | 1/2011 | Kazawa | H04J 14/025 398/68 |
| 8,412,044 | B2 * | 4/2013 | Ota | H04J 14/0282 398/67 |

(Continued)

*Primary Examiner* — Brian O'Connor
(74) *Attorney, Agent, or Firm* — Phuong-Quan Hoang

(57) ABSTRACT

A data communication system comprises an optical transferring device, optical network units, and user processors. The optical transferring device splits a received optical signal into split optical signals. Each optical network unit transforms a respective split optical signal into M first electronic signals, M>1. Each user processor comprises an input mapping unit to map the respective M first electronic signals into N second electronic signals, N≥M; an equalization processor to equalize the N second electronic signals and generate a set of N equalized electronic signals; a wave-front demultiplexer to perform a wave-front demultiplexing transform on the N equalized electronic signals, and output N wave-front demultiplexed signals, each of the N wave-front demultiplexed signals being a unique linear combination of the N equalized electronic signals; and an output mapping unit to map the N wave-front demultiplexed signals into at least M third digital electronic data signals.

20 Claims, 13 Drawing Sheets

Related U.S. Application Data continuation of application No. 14/977,663, filed on Dec. 22, 2015, now Pat. No. 9,712,235, which is a continuation of application No. 13/778,168, filed on Feb. 27, 2013, now Pat. No. 9,231,729.

(60) Provisional application No. 61/604,326, filed on Feb. 28, 2012.

(51) Int. Cl.
*H04J 14/08* (2006.01)
*H04B 10/071* (2013.01)

(52) U.S. Cl.
CPC ...... *H04J 14/0298* (2013.01); *H04Q 11/0062* (2013.01); *H04Q 11/0067* (2013.01); *H04B 10/071* (2013.01); *H04J 14/02* (2013.01); *H04J 14/0257* (2013.01); *H04J 14/08* (2013.01); *H04Q 2011/0064* (2013.01)

(58) Field of Classification Search
CPC .... H04J 14/0298; H04J 14/0282; H04J 14/00; H04J 14/0257; H04J 14/02; H04J 14/08
See application file for complete search history.

(56) References Cited

U.S. PATENT DOCUMENTS

| | | | | |
|---|---|---|---|---|
| 8,811,819 | B2* | 8/2014 | Kazawa | H04B 10/272 398/43 |
| 9,231,729 | B2* | 1/2016 | Chang | H04J 14/08 |
| 9,306,698 | B2* | 4/2016 | Chen | H04Q 11/0005 |
| 9,712,235 | B2* | 7/2017 | Chang | H04B 10/25 |
| 9,882,641 | B2* | 1/2018 | Chang | H04B 10/25 |
| 10,003,399 | B2* | 6/2018 | Chang | H04B 7/0413 |
| 2008/0138067 | A1* | 6/2008 | Beshai | H04L 49/357 398/45 |
| 2011/0052191 | A1* | 3/2011 | Beshai | H04Q 11/0005 398/52 |
| 2013/0223840 | A1* | 8/2013 | Chang | H04J 14/08 398/58 |
| 2014/0286235 | A1* | 9/2014 | Chang | G01S 13/9303 370/316 |
| 2014/0301734 | A1* | 10/2014 | Fang | H04J 14/005 398/76 |
| 2014/0321853 | A1* | 10/2014 | Beshai | H04Q 11/0005 398/52 |

\* cited by examiner

RESOURCE ALLOCATION VIA WAVE-FRONT MULTIPLEXING IN A PON NETWORK

RELATED APPLICATIONS

This application is a continuation of application Ser. No. 15/652,233, filed on Jul. 17, 2017, which is a continuation of application Ser. No. 14/977,663, filed on Dec. 22, 2015, now U.S. Pat. No. 9,712,235, which is a continuation of application Ser. No. 13/778,168, filed on Feb. 27, 2013, now U.S. Pat. No. 9,231,729, which claims priority to U.S. provisional application No. 61/604,326, filed on Feb. 28, 2012, all of which are incorporated herein by reference in their entireties.

BACKGROUND OF THE DISCLOSURE

Field of the Disclosure

The invention relates to resource allocation via wave-front multiplexing and demultiplexing, and particularly to resource allocation in passive optical networks (PON) via wave-front multiplexing and demultiplexing.

Brief Description of the Related Art

Most of the Fiber-to-the-Home deployments in recent years have been based on industry standard technologies such as Gigabit Ethernet Passive Optical Networks (GE-PON) and Gigabit PON (GPON). Passive Optical Network (PON) is a point-to multipoint network. A PON consists of optical line terminal at the service provider's central office and many number of optical network units near end users. The goal of PON is to reduce the amount of fiber. There are two standards of the Passive Optical Network available, the GPON and the GEPON.

GPON (Gigabit PON) is the evolution of broadband PON (BPON) standard. The protocols used by GPON are ATM, GEM, and Ethernet. It supports higher rates and has more security.

GEPON or EPON (Ethernet PON) is an IEEE standard that uses Ethernet for sending data packets. In current there are 15 million EPON ports installed. GEPON uses 1 gigabit per second upstream and downstream rates. EPON/GEPON is a fast Ethernet over passive optical networks which are point to multipoint to the premises (FTTP) or fiber to the home (FTTH) architecture in which single optical fiber is used to serve multiple premises or users.

The success of these deployments has led to significant innovation in both system architecture and the components that are used to build these systems, and the next generation of passive optical networks will inevitably be far more advanced than what is typically deployed today.

Traditional PON architectures feature one optical feed shared among 32 or more users. In a GPON or GEPON system all subscribers use a common optical wavelength. They share the fiber infrastructure, which is done through time division multiplexing (TDM). Each of those 32 homes transmits over the same fiber, but the time in which they are allowed to "occupy" the fiber is allocated by the optical line terminal (OLT) at the central office. While the equipment in each home is capable of transmitting at over 1,250 Mbps, it can only do so during its allotted time on the fiber, and therefore it is not uncommon for each subscriber in a legacy PON system to only achieve sustained data rates of around 30 Mbps. This concept of many users sharing a common fiber helps minimizing the fiber infrastructure required in an FTTH deployment.

SUMMARY OF THE DISCLOSURE

This invention relates to methods and architectures for dynamic allocations of time slots or equivalent bandwidths of passive optical networks (PON) via wave-front (WF) multiplexing/demultiplexing techniques to generate multi-dimensional wavefront-multiplexed signals concurrently propagating through the passive optical networks (PON), and thereby bandwidth limits set for subscribers can be broken through. The architectures of the invention support dynamic bandwidth allocations as well as configurable bandwidth allocations. They also support dynamic allocations for power resources as well as configurable allocations for power resources of optical lasers with regards to different signals transmitted to/from various subscribers.

In an embodiment, a data communication system comprises: a first processor configured to receive a first electronic signal and a second electronic signal and output a third electronic signal carrying information associated with said first and second electronic signals and a fourth electronic signal carrying information associated with said first and second electronic signals; a first signal mapping unit at a downstream side of said first processor, wherein said first signal mapping unit is configured to combine said third and fourth electronic signals into a fifth electronic signal; an electronic-to-optical converter at a downstream side of said first signal mapping unit, wherein said electronic-to-optical converter is configured to convert said fifth electronic signal into a first optical signal; an optical transferring module at a downstream side of said electronic-to-optical converter, wherein said optical transferring module is configured to split said first optical signal into a second optical signal and a third optical signal, wherein said first optical signal carries the same data as said second optical signal carries and said third optical signal carries; a first optical-to-electronic converter at a downstream side of said optical transferring module, wherein said first optical-to-electronic converter is configured to convert said second optical signal into a sixth electronic signal; a second optical-to-electronic converter at a downstream side of said optical transferring module, wherein said second optical-to-electronic converter is configured to convert said third optical signal into a seventh electronic signal; a second signal mapping unit at a downstream side of said first optical-to-electronic converter, wherein said second signal mapping unit is configured to allocate said sixth electronic signal into an eighth electronic signal and a ninth electronic signal; a third signal mapping unit at a downstream side of said second optical-to-electronic converter, wherein said third signal mapping unit configured to allocate said seventh electronic signal into a tenth electronic signal and an eleventh electronic signal; a second processor at a downstream side of said second signal mapping unit, wherein said second processor is configured to receive said eighth electronic signal and said ninth electronic signal and output a twelfth electronic signal carrying information associated with said eighth and ninth electronic signals and a thirteenth electronic signal carrying information associated with said eighth and ninth electronic signals, wherein said twelfth electronic signal is substantially equivalent to said first electronic signal, and said thirteenth electronic signal is substantially equivalent to said second electronic signal; and a third processor at a downstream side of said third signal mapping unit, wherein said third processor is configured to receive said tenth electronic signal and said eleventh electronic signal and output a fourteenth electronic signal carrying information associated with said tenth and eleventh electronic signals and a fifteenth electronic signal carrying information associated with said tenth and eleventh electronic signals, wherein said fourteenth electronic signal is substantially equivalent to said first electronic signal, and said fifteenth electronic signal is substantially equivalent to said second electronic signal.

In an embodiment, a data communication system comprises: a first signal mapping unit configured to allocate a first signal into a second signal and a third signal; a controller configured to alter the number of signals, into which said first signal is allocated; a first processor at a downstream side of said first signal mapping unit, wherein said first processor is configured to receive a fourth signal carrying information associated with said second signal and a fifth signal carrying information associated said third signal and output a sixth signal carrying information associated with said fourth and fifth signals and a seventh signal carrying information associated with said fourth and fifth signals; a second processor at a downstream side of said first processor, wherein said second processor is configured to receive an eighth signal carrying information associated with said sixth signal and a ninth signal carrying information associated said seventh signal and output a tenth signal carrying information associated with said eighth and ninth signals and an eleventh signal carrying information associated with said eighth and ninth signals, wherein said tenth signal is substantially equivalent to said fourth signal, and said eleventh signal is substantially equivalent to said fifth signal; and a second signal mapping unit at a downstream side of said second processor, wherein said second signal mapping unit is configured to combine said tenth and eleventh signals into a twelfth signal, wherein said controller is configured to alter the number of signals that are combined into said twelfth signal.

These, as well as other components, steps, features, benefits, and advantages of the present disclosure, will now become clear from a review of the following detailed description of illustrative embodiments, the accompanying drawings, and the claims.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1A:
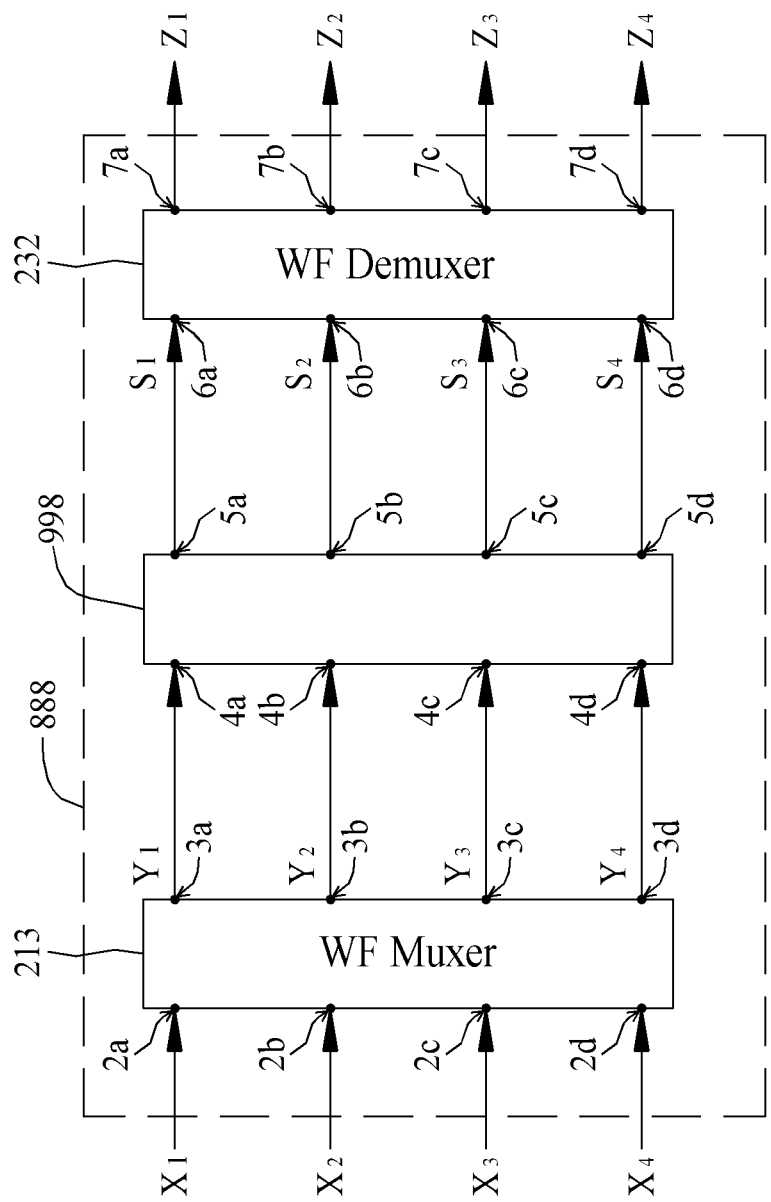
FIG. 1A shows a data communication system including a wave-front multiplexer, a data relaying system and a wave-front demultiplexer according to an embodiment of the present disclosure.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

Before describing embodiments of the present invention, a definition has been included for these various terms. These definitions are provided to assist in teaching a general understanding of the present invention.

Wave-Front Multiplexer (WF Muxer):

The term "wave-front multiplexer" is used herein to denote a specialized signal processing transform from a spatial-domain representation of signals to a wavefront-domain representation of the signals. A wave-front multiplexer performs an orthogonal functional transformation to multiply an orthogonal matrix, such as Fourier matrix, Butler matrix or Hadamard matrix, by an input matrix representing multiple input signals so as to obtain an output matrix representing multiple output signals. The orthogonal functional transformation can be, but not limited to, Fourier transformation, discrete Fourier transformation (DFT), fast Fourier transformation (FFT), Hartley transformation, Hadamard transformation, or any other Fourier-related transformation. Each output signal output from the wave-front multiplexer is a linear combination, i.e. weighted sum, of all input signals input into the wave-front multiplexer. As a result, each input signal into the wave-front multiplexer appears in all output signals. The weightings of one input signal among all the output signals feature a unique distribution which is defined as a wavefront multiplexing vector (WFMV). When the wave-front multiplexer features H inputs receiving H input signals and H outputs outputting H output signals, there are H wavefront multiplexing vectors (WFMVs) associated with the H inputs of the H-to-H wave-front multiplexer, and each of the H wavefront multiplexing vectors is an H-dimensional vector, where H is an integer equal to or greater than two, four, eight, sixteen, thirty-two, sixty-four or two-hundred-and-fifty-six. The H wavefront multiplexing vectors are mutually orthogonal to one another. Each of the H output signals carries a linear combination of all the H input signals, and the H input signals appearing in each of the H output signals can be completely independent from one another. The above-mentioned transform performed by the wave-front multiplexer is called herein a wave-front multiplexing transform or transformation, which can be applied to the following embodiments.

The wave-front multiplexing transform may be, but not limited to, implemented at base band in a digital format or by analog devices, wherein the devices may be selected from a group consisting of a Butler Matrix, a Fourier transform, and a Hartley transform.

The wave-front multiplexer can be, but not limited to, embedded in a processor. The wave-front multiplexer can be implemented by hardware which performing the above wave-front multiplexing transformation, such as FFT chip, Butler matrix, or a device performing a specified transformation of an orthogonal matrix such as Fourier matrix or Hadamard matrix. Alternatively, the function of the wave-front multiplexer can be realized by software installed in and performed by the processor, wherein the software can perform the above wave-front multiplexing transform. Alternatively, the wave-front multiplexer can be or include, but not limited to, a field programmable gate array (FPGA) or a digital signal processor (DSP).

The wave-front multiplexer can be layout with circuits for cells of basic functions recorded in a cell library such that any company of interest can implement the circuit layout in an integrated-circuit chip, a system-on chip (SOC) or an integrated-circuit chip package.

The wave-front multiplexer (WF muxer) features multiple-input and multiple-output (MIMO) processing that receives multiple input signals passing in parallel through multiple parallel input ports of the WF muxer and outputs multiple output signals passing in parallel through multiple parallel output ports of the WF muxer. The total number of the parallel input ports of the WF muxer may be equal to the total number of the parallel output ports of the WF muxer, may be equal to the number of rows or columns of an orthogonal matrix characterizing the WF muxer, and may be any number equal to or more than two, four, eight, sixteen, thirty-two or two-hundred-and-fifty-six. The total number of the input signals into the WF muxer may be equal to or less than the total number of the parallel input ports of the WF muxer, may be equal to or less than the number of rows or columns of the orthogonal matrix characterizing the WF muxer, and may be any number equal to or more than two, four, eight, sixteen, thirty-two or two-hundred-and-fifty-six. The total number of the output signals output form the WF muxer may be equal to the total number of the parallel output ports of the WF muxer, may be equal to the number of rows or columns of the orthogonal matrix characterizing the WF muxer, and may be any number equal to or more than two, four, eight, sixteen, thirty-two or two-hundred-and-fifty-six.

Wave-Front Demultiplexer (WF Demuxer):

The term "Wave-front demultiplexer" is used herein to denote a specialized signal processing transform from a wavefront-domain representation of signals to a spatial-domain representation of the signals. A wave-front demultiplexer performs a complementary transformation to a wave-front multiplexer and extracts multiple signals each corresponding to one of the original signals input to the wave-front multiplexer.

The wave-front demultiplexer performs an inverse orthogonal functional transformation to multiply an inverse orthogonal matrix, such as inverse Fourier matrix, Butler matrix or Hadamard matrix, by an input matrix representing multiple input signals so as to obtain an output matrix representing multiple output signals. The inverse transformation performed by the wave-front demultiplexer is the inverse of the transformation performed by a corresponding or complementary wave-front multiplexer. Many orthogonal matrixes, such as Hadamard matrix, have inverses which equal to the orthogonal matrixes themselves. The inverse orthogonal functional transformation can be, but not limited to, inverse Fourier transformation, inverse discrete Fourier transformation, inverse fast Fourier transformation (IFFT), Hadamard transformation, inverse Hartley transformation, any other inverse Fourier-related transformation, or any transformation of an orthogonal matrix (such as inverse Fourier matrix, Butler matrix, or Hadamard matrix).

Hadamard transforms featuring the inverse transforms equal to themselves may be used for the wave-front multiplexing and demultiplexing transforms. In the present disclosure, the wave-front multiplexing and demultiplexing transforms can be, but not limited to, characterized by same matrixes.

Alternatively, the wave-front multiplexing transform may have an inverse not equal to itself. The wave-front multiplexing transform is not equal to the corresponding or complementary wave-front demultiplexing transform. For example, the wave-front multiplexing and demultiplexing transforms can be, but not limited to, a fast Fourier transform (FFT) and its corresponding or complementary inverse fast Fourier transforms (IFFT).

Each output signal output from the wave-front demultiplexer is a linear combination, i.e. weighted sum, of all input signals input into the wave-front demultiplexer. As a result, each input signal into the wave-front demultiplexer appears in all output signals. The weightings of one input signal among all the output signals feature a unique distribution which is defined as a wavefront demultiplexing vector (WFDV). When the wave-front demultiplexer features I inputs receiving I input signals and I outputs outputting I output signals, there are I wavefront demultiplexing vectors (WFDVs) associated with the I inputs of the I-to-I wave-front demultiplexer, and each of the I wavefront demultiplexing vectors is an I-dimensional vector, where I is an integer equal to or greater than two, four, eight, sixteen, thirty-two, sixty-four or two-hundred-and-fifty-six. The I wavefront demultiplexing vectors are mutually orthogonal to one another. Each of the I output signals carries a linear combination of all the I input signals, and the I input signals appearing in each of the I output signals can be completely independent from one another.

Therefore, the wave-front demultiplexer extracts coherently combined signals from input signals input to the wave-front demultiplexer and outputs the coherently combined signals, such that each of the coherently combined signals output from the wave-front demultiplexer can be correspondent to or associated with one of the input signals input into the wave-front multiplexer. The above-mentioned transform performed by the wave-front demultiplexer is called herein a wave-front demultiplexing transform or transformation, which can be applied to the following embodiments.

The wave-front demultiplexer can be, but not limited to, embedded in a processor. The wave-front demultiplexer can be implemented by hardware which performing the above wave-front demultiplexing transformation, such as IFFT chip, Butler matrix, or a device performing a specified transformation of an inverse orthogonal matrix. Alternatively, the function of the wave-front demultiplexer can be realized by software installed in and performed by the processor, wherein the software can perform the above wave-front demultiplexing transform. Alternatively, the wave-front demultiplexer can be or include, but not limited to, a field programmable gate array (FPGA) or a digital signal processor (DSP). When the wave-front multiplexing and demultiplexing transformations are implemented by hardware, the wave-front multiplexer and the wave-front demultiplexer can be, but not limited to, a pair of Butler Matrixes, a Fourier transform pair, or a Hartley transform pair.

The wave-front demultiplexer can be layout with circuits for cells of basic functions recorded in a cell library such that any company of interest can implement the circuit layout in an integrated-circuit chip, a system-on chip (SOC) or an integrated-circuit chip package.

The wave-front demultiplexer (WF demuxer) features multiple-input and multiple-output (MIMO) processing that receives multiple input signals passing in parallel through multiple parallel input ports of the WF demuxer and outputs multiple output signals passing in parallel through multiple parallel output ports of the WF demuxer. The total number of the parallel input ports of the WF demuxer may be equal to the total number of the parallel output ports of the WF demuxer, may be equal to the total number of parallel input ports of a corresponding or complementary WF muxer, may be equal to the total number of parallel output ports of the corresponding or complementary WF muxer, may be equal to the number of rows or columns of an orthogonal matrix characterizing the corresponding or complementary WF muxer, may be equal to the number of rows or columns of an inverse orthogonal matrix characterizing the WF demuxer, and may be any number equal to or more than two, four, eight, sixteen, thirty-two or two-hundred-and-fifty-six. The total number of the input signals input in parallel to the WF demuxer may be equal to the total number of output signals output in parallel from the corresponding or complementary WF muxer, may be equal to the total number of the parallel inputs of the WF demuxer, and may be any number equal to or more than two, four, eight, sixteen, thirty-two or two-hundred-and-fifty-six. The total number of the output signals output in parallel form the WF demuxer may be equal to the total number of input signals input in parallel to the corresponding or complementary WF muxer, may be equal to or less than the total number of the input signals input in parallel to the WF demuxer, may be equal to or less than the total number of the output signals output in parallel from the corresponding or complementary WF muxer, may be equal to or less than the total number of the parallel output ports of the WF demuxer, and may be any number equal to or more than two, four, eight, sixteen, thirty-two or two-hundred-and-fifty-six.

Mathematically, the wave-front demultiplexing transformation can be expressed by a linear equation as Z=WFDM*S, where S denotes input vectors such as four components $S_1$-$S_4$ in the following matrix D as illustrated in FIG. 1A, Z denotes output vectors such as four components in the following matrix F as illustrated in FIG. 1A, and WFDM denotes an inverse orthogonal matrix, such as the following matrix E as illustrated in FIG. 1A, of the wave-front demultiplexer. The wave-front multiplexing transformation can be expressed by a linear equation as Y=WFM*X, where X denotes input vectors such as four components $X_1$-$X_4$ in the following matrix A as illustrated in FIG. 1A, Y denotes output vectors such as four components in the following matrix C as illustrated in FIG. 1A, and WFM denotes an orthogonal matrix, such as the following matrix B as illustrated in FIG. 1A, of the wave-front multiplexer. The wave-front demultiplexing transformation features the characteristic that WFM*WFDM=I, where I is a unit matrix. Basically, WFM and WFDM are square matrices, and the order of WFM has the same rows and columns as the order of WFDM. For example, in case the orders of WFM and WFDM each having N rows and N columns are N×N, each of the wave-front multiplexing and demultiplexing transformations is available to processing N input vectors, i.e. input signals, and transforming the N input vectors into N output vectors, i.e. output signals, where N is an integer equal to or greater than two, four, eight, sixteen, thirty-two or two-hundred-and-fifty-six.

The wave-front demultiplexer, for example, can be used at a receiving side of a passive optical network (PON) with a complementary wave-front multiplexer at a transmitting side of the passive optical network, and multiple signal paths, such as physical fiber channels, can be set between the transmitting side of the passive optical network and the receiving side of the passive optical network. One or more optical transferring devices can be arranged in the signal paths between the transmitting side of the passive optical network and the receiving side of the passive optical network.

The above-mentioned descriptions of the wave-front multiplexer and the wave-front demultiplexer can be applied to the following embodiments.

FIG. 1A shows an example illustrating how a four-input and four-output wave-front multiplexer along with a four-input and four-output wave-front demultiplexer works.

Referring to FIG. 1A, a data communication system 888 includes a wave-front multiplexer 213, a wave-front demultiplexer 232 and a data relaying system 998. Each of the wave-front multiplexer 213 and the wave-front multiplexer 232 can be, but not limited to, a four-input and four-output unit. That is, the wave-front multiplexer 213 may have four inputs 2a, 2b, 2c and 2d and four outputs 3a, 3b, 3c and 3d, and the wave-front demultiplexer 232 may have four inputs 6a, 6b, 6c and 6d and four outputs 7a, 7b, 7c and 7d.

The data relaying system 998 may include an optical line terminal (OLT), at least one optical transferring device and multiple optical network units (ONU) so as to relay data from a central office (CO) processor to multiple user processors or relay data from the user processors to the CO processor.

There are four input signals $X_1$, $X_2$, $X_3$ and $X_4$ input in parallel to the four inputs 2a, 2b, 2c and 2d of the wave-front multiplexer 213. The signals $X_1$, $X_2$, $X_3$ and $X_4$ can be, but not limited to, digital signals, analog signals, mixed analog and digital signals, or digital signal streams. Next, the wave-front multiplexer 213 performs the wave-front multiplexing transform to multiply the four input signals $X_1$, $X_2$, $X_3$ and $X_4$, represented by a 4×1 input matrix A, by an orthogonal matrix B so as to obtain four output signals $Y_1$, $Y_2$, $Y_3$ and $Y_4$ represented by a 4×1 output matrix C and then outputs the four output signals $Y_1$, $Y_2$, $Y_3$ and $Y_4$ from its four outputs 3a, 3b, 3c and 3d. The matrix B is a square matrix, and the transpose of the matrix B is equal to the inverse of the matrix B. The below formula (1) illustrates the input matrix A multiplied by the orthogonal matrix B, performed on the wave-front multiplexer 213.

$$\text{matrix } A = \begin{bmatrix} X_1 \\ X_2 \\ X_3 \\ X_4 \end{bmatrix} \quad (1)$$

$$\text{matrix } B = \begin{bmatrix} C_{11} & C_{12} & C_{13} & C_{14} \\ C_{21} & C_{22} & C_{23} & C_{24} \\ C_{31} & C_{32} & C_{33} & C_{34} \\ C_{41} & C_{42} & C_{43} & C_{44} \end{bmatrix}$$

$$\text{matrix } C = \begin{bmatrix} C_{11}X_1 + C_{12}X_2 + C_{13}X_3 + C_{14}X_4 \\ C_{21}X_1 + C_{22}X_2 + C_{23}X_3 + C_{24}X_4 \\ C_{31}X_1 + C_{32}X_2 + C_{33}X_3 + C_{34}X_4 \\ C_{41}X_1 + C_{42}X_2 + C_{43}X_3 + C_{44}X_4 \end{bmatrix}$$

$$\begin{bmatrix} C_{11} & C_{12} & C_{13} & C_{14} \\ C_{21} & C_{22} & C_{23} & C_{24} \\ C_{31} & C_{32} & C_{33} & C_{34} \\ C_{41} & C_{42} & C_{43} & C_{44} \end{bmatrix} \begin{bmatrix} X_1 \\ X_2 \\ X_3 \\ X_4 \end{bmatrix} =$$

$$\begin{bmatrix} C_{11}X_1 + C_{12}X_2 + C_{13}X_3 + C_{14}X_4 \\ C_{21}X_1 + C_{22}X_2 + C_{23}X_3 + C_{24}X_4 \\ C_{31}X_1 + C_{32}X_2 + C_{33}X_3 + C_{34}X_4 \\ C_{41}X_1 + C_{42}X_2 + C_{43}X_3 + C_{44}X_4 \end{bmatrix} = \begin{bmatrix} Y_1 \\ Y_2 \\ Y_3 \\ Y_4 \end{bmatrix}$$

The components associated with the input $X_1$ in the four outputs are in the forms of $C_{11}X_1$, $C_{21}X_1$, $C_{31}X_1$ and $C_{41}X_1$. The weighting distribution of the components associated with the input $X_1$ in the four outputs is characterized by a first column vector, i.e. first wave-front multiplexing vector (WFMV1), where $$WFMV1 = \begin{bmatrix} C_{11} \\ C_{21} \\ C_{31} \\ C_{41} \end{bmatrix}$$

Similarly, the components associated with the input $X_2$ in the four outputs are in the forms of $C_{12}X_2$, $C_{22}X_2$, $C_{32}X_2$ and $C_{42}X_2$. The weighting distribution of the components associated with the input $X_2$ in the four outputs is characterized by a second column vector, i.e. second wave-front multiplexing vector (WFMV2), where $$WFMV2 = \begin{bmatrix} C_{12} \\ C_{22} \\ C_{32} \\ C_{42} \end{bmatrix}$$

The components associated with the input $X_3$ in the four outputs are in the forms of $C_{13}X_3$, $C_{23}X_3$, $C_{33}X_3$ and $C_{43}X_3$. The weighting distribution of the components associated with the input $X_3$ in the four outputs is characterized by a third column vector, i.e. third wave-front multiplexing vector (WFMV3), where $$WFMV3 = \begin{bmatrix} C_{13} \\ C_{23} \\ C_{33} \\ C_{43} \end{bmatrix}$$

The components associated with the input $X_4$ in the four outputs are in the forms of $C_{14}X_4$, $C_{24}X_4$, $C_{34}X_4$ and $C_{44}X_4$. The weighting distribution of the components associated with the input $X_4$ in the four outputs is characterized by a fourth column vector, i.e. fourth wave-front multiplexing vector (WFMV4), where $$WFMV4 = \begin{bmatrix} C_{14} \\ C_{24} \\ C_{34} \\ C_{44} \end{bmatrix}$$

The first and second wave-front multiplexing vectors are mutually orthogonal to each other. The first and third wave-front multiplexing vectors are mutually orthogonal to each other. The first and fourth wave-front multiplexing vectors are mutually orthogonal to each other. The second and third wave-front multiplexing vectors are mutually orthogonal to each other. The second and fourth wave-front multiplexing vectors are mutually orthogonal to each other. The third and fourth multiplexing wave-front vectors are mutually orthogonal to each other.

The output signal $Y_1$ is a linear combination, i.e. weighted sum, of all input signals $X_1$, $X_2$, $X_3$ and $X_4$ multiplied by the weightings $C_{11}$, $C_{12}$, $C_{13}$, and $C_{14}$, respectively. That is, the output signal $Y_1$ can be represented by a linear combination of $C_{11}X_1$ plus $C_{12}X_2$ plus $C_{13}X_3$ plus $C_{14}X_4$. The four input signals $X_1$, $X_2$, $X_3$ and $X_4$ can be completely independent. The output signal $Y_2$ is a linear combination, i.e. weighted sum, of all input signals $X_1$, $X_2$, $X_3$ and $X_4$ multiplied by the weightings $C_{21}$, $C_{22}$, $C_{23}$, and $C_{24}$, respectively. That is, the output signal $Y_2$ can be represented by a linear combination of $C_{21}X_1$ plus $C_{22}X_2$ plus $C_{23}X_3$ plus $C_{24}X_4$. The output signal $Y_3$ is a linear combination, i.e. weighted sum, of all input signals $X_1$, $X_2$, $X_3$ and $X_4$ multiplied by the weightings $C_{31}$, $C_{32}$, $C_{33}$, and $C_{34}$, respectively. That is, the output signal $Y_3$ can be represented by a linear combination of $C_{31}X_1$ plus $C_{32}X_2$ plus $C_{33}X_3$ plus $C_{34}X_4$. The output signal $Y_4$ is a linear combination, i.e. weighted sum, of all input signals $X_1$, $X_2$, $X_3$ and $X_4$ multiplied by the weightings $C_{41}$, $C_{42}$, $C_{43}$, and $C_{44}$, respectively. That is, the output signal $Y_4$ can be represented by a linear combination of $C_{41}X_1$ plus $C_{42}X_2$ plus $C_{43}X_3$ plus $C_{44}X_4$.

Therefore, each of the output signals $Y_1$, $Y_2$, $Y_3$ and $Y_4$ output from the wave-front multiplexer 213 is a linear combination, i.e. weighted sum, of all input signals $X_1$, $X_2$, $X_3$ and $X_4$ multiplied by respective weightings, and distributions of the weightings of any two input components in the four output signals $Y_1$, $Y_2$, $Y_3$ and $Y_4$ are orthogonal.

In other words, each of the output signals $Y_1$, $Y_2$, $Y_3$ and $Y_4$ carries information associated with all of the input signals $X_1$, $X_2$, $X_3$ and $X_4$ multiplied by the corresponding weightings, respectively. The output signal $Y_1$ carries information associated with all of the input signals $X_1$, $X_2$, $X_3$ and $X_4$ multiplied by the respective weightings $C_{11}$, $C_{12}$, $C_{13}$ and $C_{14}$. The output signal $Y_2$ carries information associated with all of the input signals $X_1$, $X_2$, $X_3$ and $X_4$ multiplied by the respective weightings $C_{21}$, $C_{22}$, $C_{23}$ and $C_{24}$. The output signal $Y_3$ carries information associated with all of the input signals $X_1$, $X_2$, $X_3$ and $X_4$ multiplied by the respective weightings $C_{31}$, $C_{32}$, $C_{33}$ and $C_{34}$. The output signal $Y_4$ carries information associated with all of the input signals $X_1$, $X_2$, $X_3$ and $X_4$ multiplied by the respective weightings $C_{41}$, $C_{42}$, $C_{43}$ and $C_{44}$.

Figure 1B:
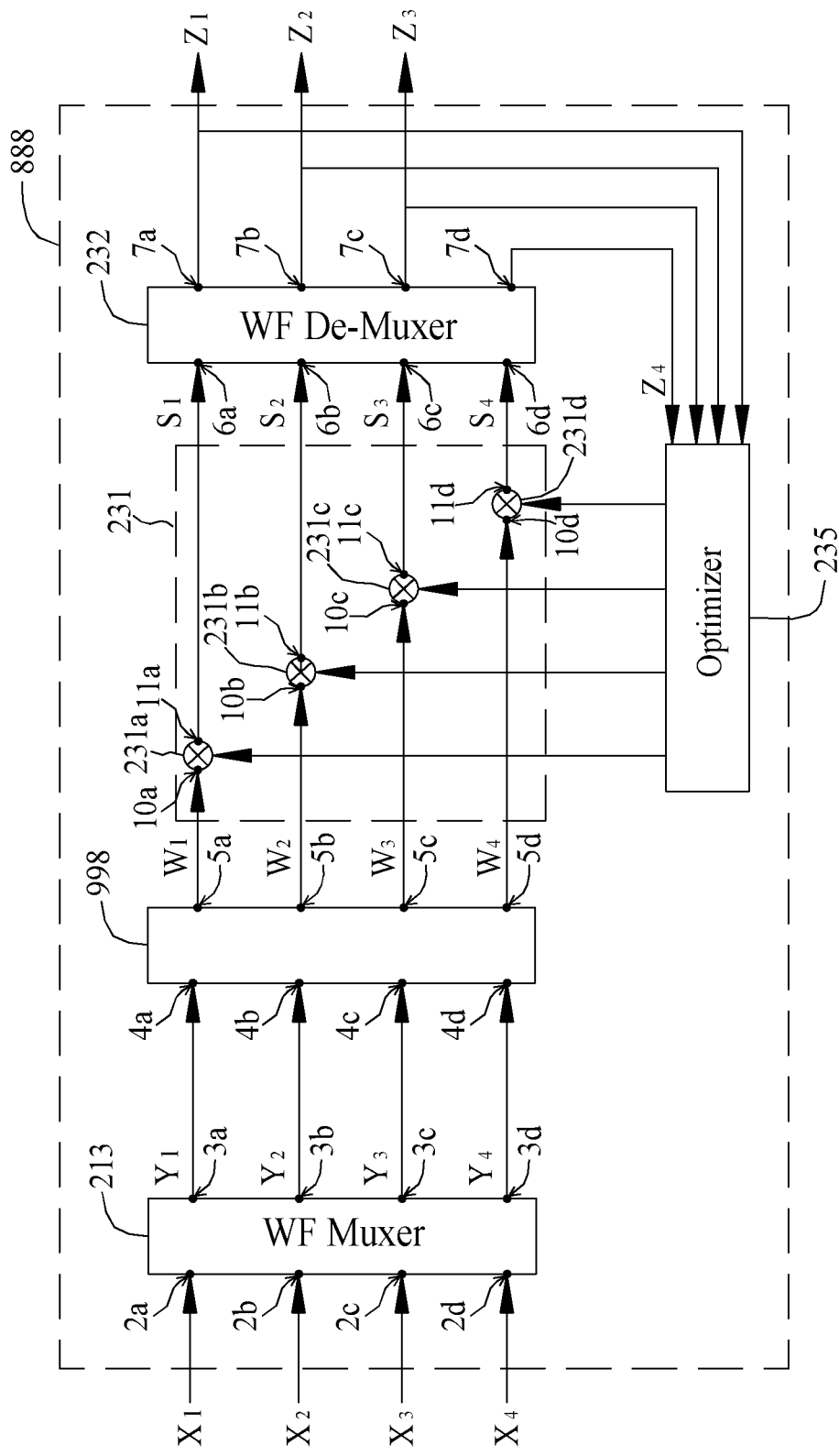
FIG. 1B shows a data communication system including a wave-front multiplexer, a data relaying system, an equalization processor, a wave-front demultiplexer and an optimizer according to another embodiment of the present disclosure.
Figure 1C:
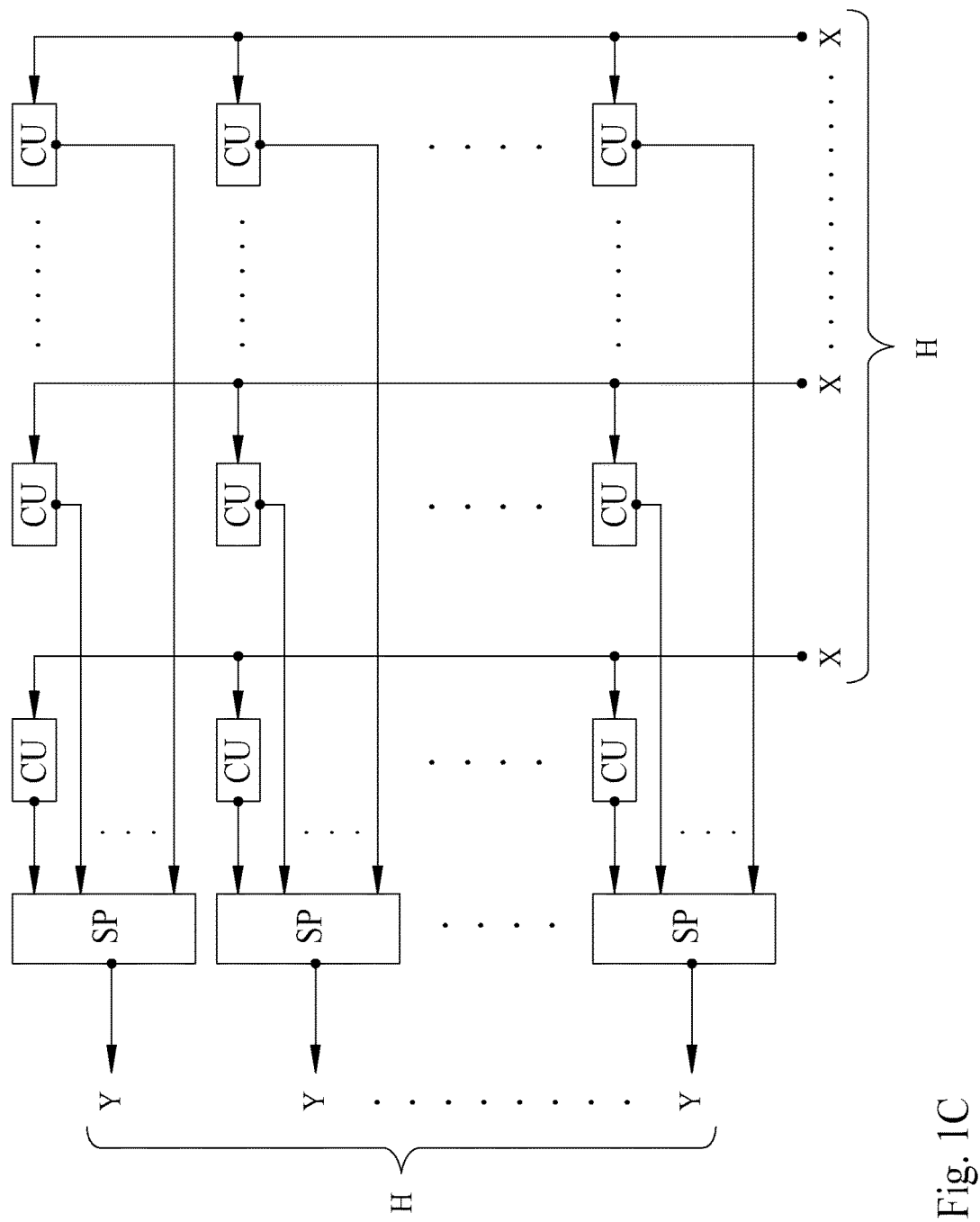
FIG. 1C shows architecture of a wave-front multiplexer according to an embodiment of the present disclosure.

Referring to FIG. 1C showing architecture of a wave-front multiplexer in accordance with the present invention. For more elaboration, the wave-front multiplexer can be adapted to receive the number H of input signals X, process the number H of the input signals X to be multiplied by the above-mentioned WFM matrix, such as H-by-H square orthogonal matrix, and output the number H of output signals Y, wherein H could be any number greater than or equal to 2, 4, 8, 16, 32, 64, 128 or 256. The input signals X can be, but not limited to, analog or digital signals. The output signals Y can be, but not limited to, analog or digital signals. The wave-front multiplexer may include the number H*H of computing units (CUs) and the number H of summing processors (SPs). The computing units (CUs) form an H-by-H processor array with the number H of columns and the number H of rows. The computing units (CUs) in each column in the processor array receive a corresponding input signal X, and thus the number H of the input signals X can be received by the computing units (CUs) in the number H of the respective columns in the processor array. Upon receiving the input signals X, each of the computing units (CUs) independently weights its received signal, multiplied by a corresponding weighting value, to generate a weighted signal. Each of the summing processors (SPs) provides a means for summing weighted signals generated by the corresponding computing units (CUs) in the same row in the processor array to produce a corresponding output signal Y. Accordingly, the number H of the summing processors (SPs) can output the number H of the output signals Y each combining the weighted signals output from the computing units (CUs) in a corresponding one of the number H of the rows in the processor array. The above-mentioned description of the wave-front multiplexer can be applied to the following embodiments.

In the case illustrated in FIG. 1A, the number of H is equal to 4. The wave-front multiplexer 213 illustrated in FIG. 1A may include 4*4 computing units (CUs) and four summing processors (SPs). The computing units (CUs) form a processor array with four rows and four columns. The input signals $X_1$-$X_4$ illustrated in FIG. 1A can be received by the computing units (CUs) in the respective four columns in the processor array. Upon receiving the input signals $X_1$-$X_4$, each of the computing units (CUs) independently weights its received signal, multiplied by a corresponding weighting value, to generate a corresponding weighted signal. The four summing processors (SPs) can output the four signals $Y_1$-$Y_4$ each combining the weighted signals output from the computing units (CUs) in a corresponding one of the four rows in the processor array.

Referring to FIG. 1A, after the wave-front multiplexer 213 outputs the signals $Y_1$, $Y_2$, $Y_3$ and $Y_4$, the signals $Y_1$, $Y_2$, $Y_3$ and $Y_4$ are transmitted in parallel into four inputs 4a, 4b, 4c and 4d of the data relaying system 998. The data relaying system 998 can relay data from the wave-front multiplexer 213 in the central office (CO) processor to a plurality of the wave-front demultiplexer 232 in the user processors, wherein the data carried by the signals $Y_1$, $Y_2$, $Y_3$ and $Y_4$ at the outputs 3a, 3b, 3c and 3d of the wave-front multiplexer 213 and the inputs of 4a, 4b, 4c and 4d of the data relaying system 998 are equivalent or correspondent to those carried by the signals $S_1$, $S_2$, $S_3$ and $S_4$ at the outputs 5a, 5b, 5c and 5d of the data relaying system 998 and the inputs of 6a, 6b, 6c and 6d of the wave-front demultiplexer 232, respectively. Alternatively, the data relaying system 998 can relay data from the wave-front multiplexer 213 in one of the user processor to the wave-front demultiplexer 232 in the central office (CO) processor, wherein the data carried by one or more of the signals $Y_1$, $Y_2$, $Y_3$ and $Y_4$ at the outputs 3a, 3b, 3c and 3d of the wave-front multiplexer 213 and the inputs of 4a, 4b, 4c and 4d of the data relaying system 998 are equivalent or correspondent to those carried by the corresponding one or more of the signals $S_1$, $S_2$, $S_3$ and $S_4$ at the outputs 5a, 5b, 5c and 5d of the data relaying system 998 and the inputs of 6a, 6b, 6c and 6d of the wave-front demultiplexer 232.

After the four signals $S_1$, $S_2$, $S_3$ and $S_4$ input in parallel to the four inputs 6a, 6b, 6c and 6d of the wave-front demultiplexer 232, the wave-front demultiplexer 232 performs the wave-front demultiplexing transform to multiply the four input signals $S_1$, $S_2$, $S_3$ and $S_4$, represented by a 4×1 input matrix D, by an orthogonal 4×4 matrix E so as to obtain four output signals $Z_1$, $Z_2$, $Z_3$ and $Z_4$ represented by a 4×1 output matrix F and then outputs the four output signals $Z_1$, $Z_2$, $Z_3$ and $Z_4$ from its outputs 7a, 7b, 7c and 7d. The matrix E is a square matrix, and the transpose of the matrix E is equal to the inverse of the matrix E. The below formula (2) illustrates the input matrix D multiplied by the orthogonal matrix E, performed on the wave-front demultiplexer 232.

$$\text{matrix } D = \begin{bmatrix} S_1 \\ S_2 \\ S_3 \\ S_4 \end{bmatrix} \quad (2)$$

$$\text{matrix } E = \begin{bmatrix} D_{11} & D_{12} & D_{13} & D_{14} \\ D_{21} & D_{22} & D_{23} & D_{24} \\ D_{31} & D_{32} & D_{33} & D_{34} \\ D_{41} & D_{42} & D_{43} & D_{44} \end{bmatrix}$$

$$\text{matrix } F = \begin{bmatrix} D_{11}S_1 + D_{12}S_2 + D_{13}S_3 + D_{14}S_4 \\ D_{21}S_1 + D_{22}S_2 + D_{23}S_3 + D_{24}S_4 \\ D_{31}S_1 + D_{32}S_2 + D_{33}S_3 + D_{34}S_4 \\ D_{41}S_1 + D_{42}S_2 + D_{43}S_3 + D_{44}S_4 \end{bmatrix}$$

$$\begin{bmatrix} D_{11} & D_{12} & D_{13} & D_{14} \\ D_{21} & D_{22} & D_{23} & D_{24} \\ D_{31} & D_{32} & D_{33} & D_{34} \\ D_{41} & D_{42} & D_{43} & D_{44} \end{bmatrix} \begin{bmatrix} S_1 \\ S_2 \\ S_3 \\ S_4 \end{bmatrix} =$$

$$\begin{bmatrix} D_{11}S_1 + D_{12}S_2 + D_{13}S_3 + D_{14}S_4 \\ D_{21}S_1 + D_{22}S_2 + D_{23}S_3 + D_{24}S_4 \\ D_{31}S_1 + D_{32}S_2 + D_{33}S_3 + D_{34}S_4 \\ D_{41}S_1 + D_{42}S_2 + D_{43}S_3 + D_{44}S_4 \end{bmatrix} = \begin{bmatrix} Z_1 \\ Z_2 \\ Z_3 \\ Z_4 \end{bmatrix}$$

The components associated with the input $S_1$ in the four outputs are in the forms of $D_{11}S_1$, $D_{21}S_1$, $D_{31}S_1$ and $D_{41}S_1$. The weighting distribution of the components associated with the input $S_1$ in the four outputs is characterized by a first column vector, i.e. first wave-front demultiplexing vector (WFDV1), where $$WFDV1 = \begin{bmatrix} D_{11} \\ D_{21} \\ D_{31} \\ D_{41} \end{bmatrix}$$

Similarly, the components associated with the input $S_2$ in the four outputs are in the forms of $D_{12}S_2$, $D_{22}S_2$, $D_{32}S_2$ and $D_{42}S_2$. The weighting distribution of the components associated with the input $S_2$ in the four outputs is characterized by a second column vector, i.e. second wave-front demultiplexing vector (WFDV2), where $$WFDV2 = \begin{bmatrix} D_{12} \\ D_{22} \\ D_{32} \\ D_{42} \end{bmatrix}$$

The components associated with the input $S_3$ in the four outputs are in the forms of $D_{13}S_3$, $D_{23}S_3$, $D_{33}S_3$ and $D_{43}S_3$. The weighting distribution of the components associated with the input $S_3$ in the four outputs is characterized by a third column vector, i.e. third wave-front demultiplexing vector (WFDV3), where $$WFDV3 = \begin{bmatrix} D_{13} \\ D_{23} \\ D_{33} \\ D_{43} \end{bmatrix}$$

The components associated with the input $S_4$ in the four outputs are in the forms of $D_{14}S_4$, $D_{24}S_4$, $D_{34}S_4$ and $D_{44}S_4$. The weighting distribution of the components associated with the input $S_4$ in the four outputs is characterized by a fourth column vector, i.e. fourth wave-front demultiplexing vector (WFDV4), where $$WFDV4 = \begin{bmatrix} D_{14} \\ D_{24} \\ D_{34} \\ D_{44} \end{bmatrix}$$

The first and second wave-front demultiplexing vectors are mutually orthogonal to each other. The first and third wave-front demultiplexing vectors are mutually orthogonal to each other. The first and fourth wave-front demultiplexing vectors are mutually orthogonal to each other. The second and third wave-front demultiplexing vectors are mutually orthogonal to each other. The second and fourth wave-front demultiplexing vectors are mutually orthogonal to each other. The third and fourth wave-front demultiplexing vectors are mutually orthogonal to each other.

The output signal $Z_1$ is a linear combination, i.e. weighted sum, of all input signals $S_1$, $S_2$, $S_3$ and $S_4$ multiplied by the weightings $D_{11}$, $D_{12}$, $D_{13}$, and $D_{14}$, respectively. That is, the output signal $Z_1$ can be represented by a linear combination of $D_{11}S_1$ plus $D_{12}S_2$ plus $D_{13}S_3$ plus $D_{14}S_4$. The output signal $Z_2$ is a linear combination, i.e. weighted sum, of all input signals $S_1$, $S_2$, $S_3$ and $S_4$ multiplied by the weightings $D_{21}$, $D_{22}$, $D_{23}$, and $D_{24}$, respectively. That is, the output signal $Z_2$ can be represented by a linear combination of $D_{21}S_1$ plus $D_{22}S_2$ plus $D_{23}S_3$ plus $D_{24}S_4$. The output signal $Z_3$ is a linear combination, i.e. weighted sum, of all input signals $S_1$, $S_2$, $S_3$ and $S_4$ multiplied by the weightings $D_{31}$, $D_{32}$, $D_{33}$, and $D_{34}$, respectively. That is, the output signal $Z_3$ can be represented by a linear combination of $D_{31}S_1$ plus $D_{32}S_2$ plus $D_{33}S_3$ plus $D_{34}S_4$. The output signal $Z_4$ is a linear combination, i.e. weighted sum, of all input signals $S_1$, $S_2$, $S_3$ and $S_4$ multiplied by the weightings $D_{41}$, $D_{42}$, $D_{43}$, and $D_{44}$, respectively. That is, the output signal $Z_4$ can be represented by a linear combination of $D_{41}S_1$ plus $D_{42}S_2$ plus $D_{43}S_3$ plus $D_{44}S_4$.

Therefore, each of the output signals $Z_1$, $Z_2$, $Z_3$ and $Z_4$ output from the wave-front demultiplexer 232 is a linear combination, i.e. weighted sum, of all input signals $S_1$, $S_2$, $S_3$ and $S_4$ multiplied by respective weightings, and distributions of the weightings of any two input components in the four output signals are orthogonal.

In other words, each of the output signals $Z_1$, $Z_2$, $Z_3$ and $Z_4$ carries information associated with all of the input signals $S_1$, $S_2$, $S_3$ and $S_4$ multiplied by the corresponding weightings, respectively. The output signal $Z_1$ carries information associated with all of the input signals $S_1$, $S_2$, $S_3$ and $S_4$ multiplied by the respective weightings $D_{11}$, $D_{12}$, $D_{13}$ and $D_{14}$. The output signal $Z_2$ carries information associated with all of the input signals $S_1$, $S_2$, $S_3$ and $S_4$ multiplied by the respective weightings $D_{21}$, $D_{22}$, $D_{23}$ and $D_{24}$. The output signal $Z_3$ carries information associated with all of the input signals $S_1$, $S_2$, $S_3$ and $S_4$ multiplied by the respective weightings $D_{31}$, $D_{32}$, $D_{33}$ and $D_{34}$. The output signal $Z_4$ carries information associated with all of the input signals $S_1$, $S_2$, $S_3$ and $S_4$ multiplied by the respective weightings $D_{41}$, $D_{42}$, $D_{43}$ and $D_{44}$.

Therefore, each of the signals $Z_1$, $Z_2$, $Z_3$ and $Z_4$ output from the wave-front demultiplexer 232 is correspondent or substantially equivalent to or carries information associated with a corresponding one of the signals $X_1$, $X_2$, $X_3$ and $X_4$ input to the wave-front multiplexer 213.

The matrix B and the matrix E, for example, can be equal. That is, the weightings at the same column and row in the matrix B and the matrix E have the same values, and the matrix B has the same number of rows and columns as the matrix E. In other words, the matrix B and the matrix E have the same dimensions and have the same values at the same positions. For instance, the weighting $C_{11}$ of the matrix B may have a value equal to the value of the weighting $D_{11}$ of the matrix E. The weighting $C_{12}$ of the matrix B may have a value equal to the value of the weighting $D_{12}$ of the matrix E. The weighting $C_{13}$ of the matrix B may have a value equal to the value of the weighting $D_{13}$ of the matrix E. The weighting $C_{14}$ of the matrix B may have a value equal to the value of the weighting $D_{14}$ of the matrix E. The weighting $C_{21}$ of the matrix B may have a value equal to the value of the weighting $D_{21}$ of the matrix E. The weighting $C_{22}$ of the matrix B may have a value equal to the value of the weighting $D_{22}$ of the matrix E. The weighting $C_{23}$ of the matrix B may have a value equal to the value of the weighting $D_{23}$ of the matrix E. The weighting $C_{24}$ of the matrix B may have a value equal to the value of the weighting $D_{24}$ of the matrix E. The weighting $C_{31}$ of the matrix B may have a value equal to the value of the weighting $D_{31}$ of the matrix E. The weighting $C_{32}$ of the matrix B may have a value equal to the value of the weighting $D_{32}$ of the matrix E. The weighting $C_{33}$ of the matrix B may have a value equal to the value of the weighting $D_{33}$ of the matrix E. The weighting $C_{34}$ of the matrix B may have a value equal to the value of the weighting $D_{34}$ of the matrix E. The weighting $C_{41}$ of the matrix B may have a value equal to the value of the weighting $D_{41}$ of the matrix E. The weighting $C_{42}$ of the matrix B may have a value equal to the value of the weighting $D_{42}$ of the matrix E. The weighting $C_{43}$ of the matrix B may have a value equal to the value of the weighting $D_{43}$ of the matrix E. The weighting $C_{44}$ of the matrix B may have a value equal to the value of the weighting $D_{44}$ of the matrix E.

Alternatively, the matrix E can be constructed to be equal to the matrix B multiplied by a scalar, and the matrix B and the matrix E have the same dimensions. That is, each of the weightings $D_{11}$, $D_{12}$, $D_{13}$, $D_{14}$, $D_{21}$, $D_{22}$, $D_{23}$, $D_{24}$, $D_{31}$, $D_{32}$, $D_{33}$, $D_{34}$, $D_{41}$, $D_{42}$, $D_{43}$ and $D_{44}$ in the matrix E may have a value equal to the value of the corresponding one of the weightings $C_{11}$, $C_{12}$, $C_{13}$, $C_{14}$, $C_{21}$, $C_{22}$, $C_{23}$, $C_{24}$, $C_{31}$, $C_{32}$, $C_{33}$, $C_{34}$, $C_{41}$, $C_{42}$, $C_{43}$ and $C_{44}$ in the matrix B, at the same column and row as the each of the weightings $D_{11}$, $D_{12}$, $D_{13}$, $D_{14}$, $D_{21}$, $D_{22}$, $D_{23}$, $D_{24}$, $D_{31}$, $D_{32}$, $D_{33}$, $D_{34}$, $D_{41}$, $D_{42}$, $D_{43}$ and $D_{44}$ in the matrix E, multiplied by the same scalar, and the matrix B has the same numbers of rows and columns as the matrix E. The weightings $D_{11}$, $D_{12}$, $D_{13}$, $D_{14}$, $D_{21}$, $D_{22}$, $D_{23}$, $D_{24}$, $D_{31}$, $D_{32}$, $D_{33}$, $D_{34}$, $D_{41}$, $D_{42}$, $D_{43}$ and $D_{44}$ in the matrix E may have values equal respectively to the values of the corresponding weightings $C_{11}$, $C_{12}$, $C_{13}$, $C_{14}$, $C_{21}$, $C_{22}$, $C_{23}$, $C_{24}$, $C_{31}$, $C_{32}$, $C_{33}$, $C_{34}$, $C_{41}$, $C_{42}$, $C_{43}$ and $C_{44}$ in the matrix B multiplied by the same scalar.

Alternatively, each weighting in the matrix E may have a value taking the complex conjugate of the value of the corresponding weighting in the matrix B, at the same column and row as the each weighting in the matrix E. For instance, the weighting $C_{11}$ of the matrix B has a value equal to the conjugate of the value of the weighting $D_{11}$. The weighting $C_{12}$ of the matrix B has a value equal to the conjugate of the value of the weighting $D_{12}$. The weighting $C_{13}$ of the matrix B has a value equal to the conjugate of the value of the weighting $D_{13}$. The weighting $C_{14}$ of the matrix B has a value equal to the conjugate of the value of the weighting $D_{14}$. The weighting $C_{21}$ of the matrix B has a value equal to the conjugate of the value of the weighting $D_{21}$. The weighting $C_{22}$ of the matrix B has a value equal to the conjugate of the value of the weighting $D_{22}$. The weighting $C_{23}$ of the matrix B has a value equal to the conjugate of the value of the weighting $D_{23}$. The weighting $C_{24}$ of the matrix B has a value equal to the conjugate of the value of the weighting $D_{24}$. The weighting $C_{31}$ of the matrix B has a value equal to the conjugate of the value of the weighting $D_{31}$. The weighting $C_{32}$ of the matrix B has a value equal to the conjugate of the value of the weighting $D_{32}$. The weighting $C_{33}$ of the matrix B has a value equal to the value of the conjugate of the weighting $D_{33}$. The weighting $C_{34}$ of the matrix B has a value equal to the conjugate of the value of the weighting $D_{34}$. The weighting $C_{41}$ of the matrix B has a value equal to the conjugate of the value of the weighting $D_{41}$. The weighting $C_{42}$ of the matrix B has a value equal to the conjugate of the value of the weighting $D_{42}$. The weighting $C_{43}$ of the matrix B has a value equal to the conjugate of the value of the weighting $D_{43}$. The weighting $C_{44}$ of the matrix B has a value equal to the conjugate of the value of the weighting $D_{44}$.

Alternatively, each of the weightings $D_{11}$, $D_{12}$, $D_{13}$, $D_{14}$, $D_{21}$, $D_{22}$, $D_{23}$, $D_{24}$, $D_{31}$, $D_{32}$, $D_{33}$, $D_{34}$, $D_{41}$, $D_{42}$, $D_{43}$ and $D_{44}$ in the matrix E may have a value taking the complex conjugate of the value of the corresponding one of the weightings $C_{11}$, $C_{12}$, $C_{13}$, $C_{14}$, $C_{21}$, $C_{22}$, $C_{23}$, $C_{24}$, $C_{31}$, $C_{32}$, $C_{33}$, $C_{34}$, $C_{41}$, $C_{42}$, $C_{43}$ and $C_{44}$ in the matrix B, at the same column and row as the each of the weightings $D_{11}$, $D_{12}$, $D_{13}$, $D_{14}$, $D_{21}$, $D_{22}$, $D_{23}$, $D_{24}$, $D_{31}$, $D_{32}$, $D_{33}$, $D_{34}$, $D_{41}$, $D_{42}$, $D_{43}$ and $D_{44}$ in the matrix E, multiplied by the same scalar, and the matrix B has the same numbers of rows and columns as the matrix E. The weightings $D_{11}$, $D_{12}$, $D_{13}$, $D_{14}$, $D_{21}$, $D_{22}$, $D_{23}$, $D_{24}$, $D_{31}$, $D_{32}$, $D_{33}$, $D_{34}$, $D_{41}$, $D_{42}$, $D_{43}$ and $D_{44}$ in the matrix E may have values equal respectively to the conjugates of the values of the weightings $C_{11}$, $C_{12}$, $C_{13}$, $C_{14}$, $C_{21}$, $C_{22}$, $C_{23}$, $C_{24}$, $C_{31}$, $C_{32}$, $C_{33}$, $C_{34}$, $C_{41}$, $C_{42}$, $C_{43}$ and $C_{44}$ in the matrix B multiplied by the same scalar.

Figure 1D:
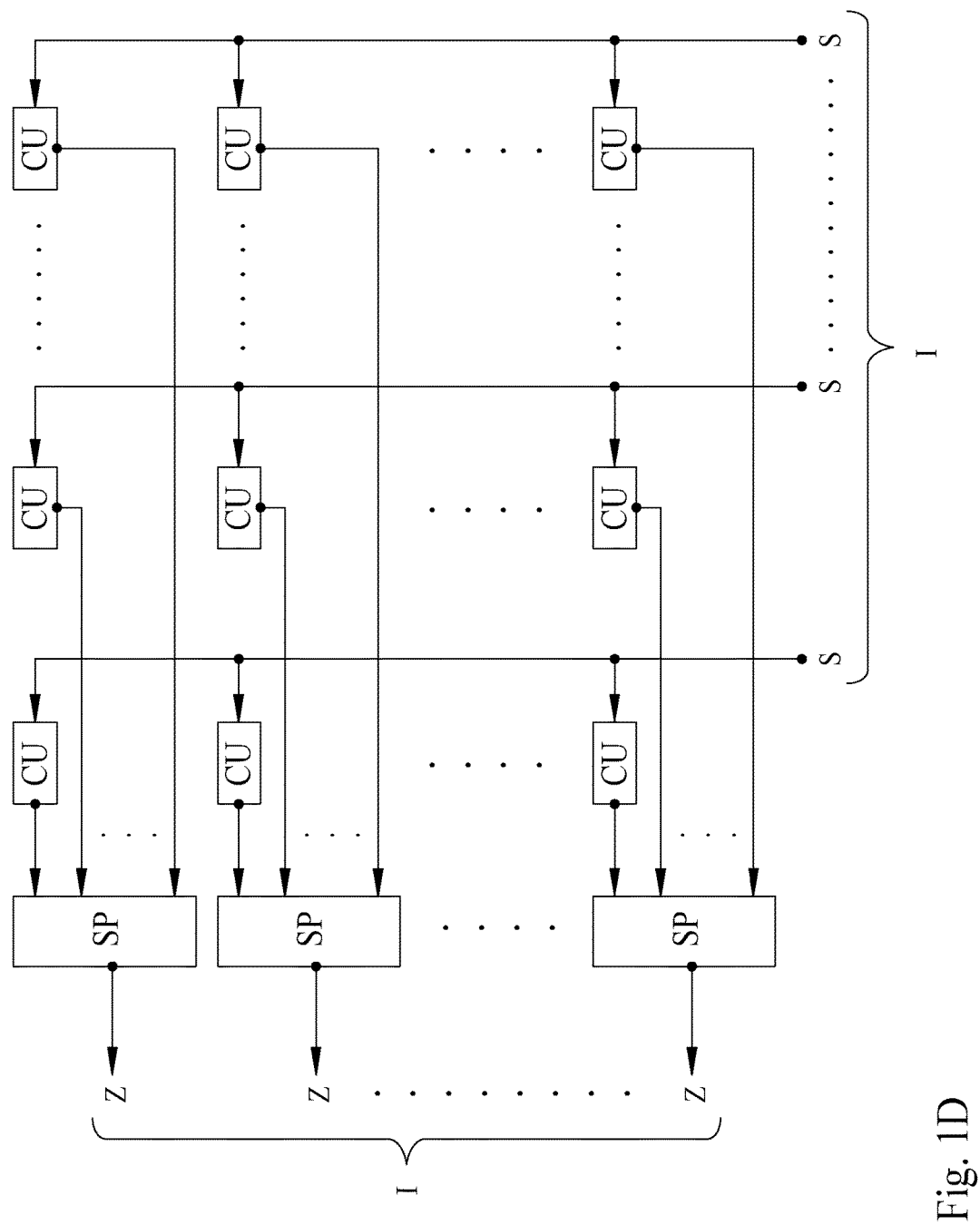
FIG. 1D shows architecture of a wave-front demultiplexer according to an embodiment of the present disclosure.

Referring to FIG. 1D showing architecture of a wave-front demultiplexer in accordance with the present invention. For more elaboration, the wave-front demultiplexer can be adapted to receive the number I of input signals S, process the number I of the input signals S to be multiplied by the above-mentioned WFDM matrix, such as I-by-I square orthogonal matrix, and output the number I of output signals Z, wherein I could be any number greater than or equal to 2, 4, 8, 16, 32, 64, 128 or 256. The input signals S can be, but not limited to, analog or digital signals. The output signals Z can be, but not limited to, analog or digital signals. The wave-front demultiplexer may include the number I*I of computing units (CUs) and the number I of summing processors (SPs). The computing units (CUs) form an I-by-I processor array with the number I of columns and the number I of rows. The computing units (CUs) in each column in the processor array receive a corresponding input signal S, and thus the number I of the input signals S can be received by the computing units (CUs) in the number I of the respective columns in the processor array. Upon receiving the input signals S, each of the computing units (CUs) independently weights its received signal, multiplied by a corresponding weighting value, to generate a weighted signal. Each of the summing processors (SPs) provides a means for summing weighted signals generated by the corresponding computing units (CUs) in the same row in the processor array to produce a corresponding output signal Z. Accordingly, the number I of the summing processors (SPs) can output the number I of the output signals Z each combining the weighted signals output from the computing units (CUs) in a corresponding one of the number I of the rows in the processor array. The above-mentioned description of the wave-front demultiplexer can be applied to the following embodiments.

In the case illustrated in FIG. 1A, the number of I is equal to 4. The wave-front demultiplexer 232 illustrated in FIG. 1A may include 4*4 computing units (CUs) and four summing processors (SPs). The computing units (CUs) form a processor array with four rows and four columns. The four input signals $S_1$-$S_4$ illustrated in FIG. 1A can be received by the computing units (CUs) in the respective four columns in the processor array. Upon receiving the four input signals $S_1$-$S_4$, each of the computing units (CUs) independently weights its received signal, multiplied by a corresponding weighting value, to generate a corresponding weighted signal. The four summing processors (SPs) can output the four signals $Z_1$-$Z_4$ each combining the weighted signals output from the computing units (CUs) in a corresponding one of the four rows in the processor array.

Referring to FIGS. 1A, 1C and 1D, when the above-mentioned wave-front demultiplexing transformation performed by the wave-front demultiplexer 232 having the architecture illustrated in FIG. 1D inverts or transforms signals previously transformed by the wave-front multiplexing transformation performed by its complementary wave-front multiplexer 213 having the architecture illustrated in FIG. 1C, the number of H is equal to the number of I. Each weighting for multiplying a corresponding one of the input signals X, performed by a corresponding one of the computing units of the wave-front multiplexer 213, may have the same value as the corresponding weighting for multiplying a corresponding one of the input signals S, performed by a corresponding one of the computing units of the wave-front demultiplexer 232 at the same row and column as the corresponding computing unit of the wave-front multiplexer 213. Alternatively, each weighting for multiplying a corresponding one of the input signals X, performed by a corresponding one of the computing units of the wave-front multiplexer 213, may have a value equal to that of the corresponding weighting for multiplying a corresponding one of the input signals S, performed by a corresponding one of the computing units of the wave-front demultiplexer 232 at the same row and column as the corresponding computing unit of the wave-front multiplexer 213, multiplied by the same scalar. Alternatively, each weighting for multiplying a corresponding one of the input signals X, performed by a corresponding one of the computing units of the wave-front multiplexer 213, may have a value equal to the conjugate of the value of the corresponding weighting for multiplying a corresponding one of the input signals S, performed by a corresponding one of the computing units of the wave-front demultiplexer 232 at the same row and column as the corresponding computing unit of the wave-front multiplexer 213. Alternatively, each weighting for multiplying a corresponding one of the input signals X, performed by a corresponding one of the computing units of the wave-front multiplexer 213, may have a value equal to the conjugate of the value of the corresponding weighting for multiplying a corresponding one of the input signals S, performed by a corresponding one of the computing units of the wave-front demultiplexer 232 at the same row and column as the corresponding computing unit of the wave-front multiplexer 213, multiplied by the same scalar.

Alternatively, referring to FIG. 1B, the data communication system 888 may further include an equalization processor 231 and an optimizer or optimization processor 235 for performing signal compensations. The equalization processor 231 may include multiple adaptive equalizers 231a, 231b, 231c and 231d for compensating the amplitudes, phases and/or time delays of signals passing through respective paths between the outputs 5a, 5b, 5c and 5d of the data relaying system 998 and the inputs 6a, 6b, 6c and 6d of the wave-front demultiplexer 232. The data communication system 888 shown in FIG. 1B is similar to the data communication system 888 illustrated in FIG. 1A except that the data communication system 888 illustrated in FIG. 1B further includes the equalization processor 231 and the optimizer 235 and that the signal $X_4$ illustrated in FIG. 1B is a pilot or diagnostic signal. The pilot or diagnostic signal $X_4$ may have a single frequency and fixed amplitude. Alternatively, the pilot or diagnostic signal $X_4$ could change based on time or could be any signal known by the data communication system 888. In contrast, the extraneous signals $X_1$, $X_2$ and $X_3$ are unknown by the data communication system 888 and input into the data communication system 888 from an extraneous system.

Besides, compared with the signals $S_1$, $S_2$, $S_3$ and $S_4$, in FIG. 1A, input into the wave-front demultiplexer 232, the signals $S_1$, $S_2$, $S_3$ and $S_4$, in FIG. 1B, are equalized by the equalizers 231a, 231b, 231c and 231d. In this embodiment, four signals $W_1$, $W_2$, $W_3$ and $W_4$ are defined as ones output from outputs 5a, 5b, 5c and 5d of the data relaying system 998 and have not been equalized by the equalization processor 231.

Referring to FIG. 1B, the data relaying system 998 can be arranged between the wave-front multiplexer 213 and the equalization processor 231. The data relaying system 998 can relay data from the wave-front multiplexer 213 in the CO processor to a plurality of the equalization processor 231 in the user processors, wherein the data carried by the signals $Y_1$, $Y_2$, $Y_3$ and $Y_4$ at the inputs of 4a, 4b, 4c and 4d of the data relaying system 998 are equivalent or correspondent to those carried by the signals $W_1$, $W_2$, $W_3$ and $W_4$ at the outputs 5a, 5b, 5c and 5d of the data relaying system 998, respectively. Alternatively, the data relaying system 998 can relay data from the wave-front multiplexer 213 in one of the user processors to the equalization processor 231 in the CO processor, wherein the data carried by one or more of the signals $Y_1$, $Y_2$, $Y_3$ and $Y_4$ at the inputs of 4a, 4b, 4c and 4d of the data relaying system 998 are equivalent or correspondent to those carried by the corresponding one or more of the signals $W_1$, $W_2$, $W_3$ and $W_4$ at the outputs 5a, 5b, 5c and 5d of the data relaying system 998.

The equalizers 231a, 231b, 231c and 231d are in four signal paths between the four outputs 5a, 5b, 5c and 5d of the data relaying system 998 and the input ports 6a, 6b, 6c and 6d of the wave-front demultiplexer 232. The optimizer 235 is in signal paths between the outputs 7a, 7b, 7c and 7d of the wave-front demultiplexer 232 and the equalizers 231a, 231b, 231c and 231d. In this embodiment, the input signal $X_4$ input to the input 2d of the wave-front multiplexer 213 is a pilot or diagnostic signal. The output signal $Z_4$ output from the output 7d of the wave-front demultiplexer 232 is supposed to be correspondent or substantially equivalent to the input signal $X_4$, i.e. pilot or diagnostic signal. The equalization processor 231 can perform amplitude, phase, and time-delay compensation to adjust the amplitudes, phases, and/or time-delays of the signals $W_1$, $W_2$, $W_3$ and $W_4$. The wave-front multiplexing transform performed by the wave-front multiplexer 213 shown in FIG. 1B can refer to the wave-front multiplexing transform performed by the wave-front multiplexer 213 as illustrated in FIG. 1A. The wave-front demultiplexing transform performed by the wave-front demultiplexer 232 shown in FIG. 1B can refer to the wave-front demultiplexing transform performed by the wave-front demultiplexer 232 as illustrated in FIG. 1A.

To avoid propagation effects and/or the difference of unbalanced amplitudes, unbalanced phases and/or unbalanced time-delays among the signals $W_1$, $W_2$, $W_3$ and $W_4$ output from the data relaying system 998, the data communication system 888 performs an optimizing and equalizing process to the signals $W_1$, $W_2$, $W_3$ and $W_4$ by the equalization processor 231 and the optimization processor 235. The signals $W_1$, $W_2$, $W_3$ and $W_4$ input to the inputs 10a, 10b, 10c and 10d of the equalizers 231a, 231b, 231c and 231d can be equalized by the equalizers 231a, 231b, 231c and 231d weighting or multiplying the signals $W_1$, $W_2$, $W_3$ and $W_4$ by four respective equalizing weights for compensating unbalanced amplitudes, unbalanced phases and/or unbalanced time-delays among the signals $W_1$, $W_2$, $W_3$ and $W_4$ so as to generate the respective equalized signals $S_1$, $S_2$, $S_3$ and $S_4$. The equalizing weights can be updated by the optimizer 235 based on calculation of cost functions in accordance with a cost minimization algorithm, such as steepest descent method.

During the optimizing and equalizing process, one (F1) of the cost functions may observe the change between the known diagnostic data, which is carried by the diagnostic or pilot signal $X_4$ at the input 2d of the wave-front multiplexer 213, and the signal $Z_4$ at the output 7d of the wave-front demultiplexer 232. In the other words, the cost function (F1)

may be based on observation of changes between the recovered diagnostic signal $Z_4$ at the output 7d of the wave-front demultiplexer 232 and the injected diagnostic signal $X_4$ at the input 2d of the wavefront multiplexer 432. When there is no observed change, the cost function (F1) shall be assigned to zero. On the other hand, the value of the cost function (F1) shall be assigned to a positive number when there are observed change. The larger the positive number shall be assigned to the larger the observed change is.

Alternatively, others (F2) of the cost functions may be based on observations among the signals $Z_1$, $Z_2$, $Z_3$ and $Z_4$ output from the wave-front demultiplexer 232. More specifically, the cost functions (F2) may be related to cross-correlation between each two of the signals $Z_1$, $Z_2$, $Z_3$ and $Z_4$ received by the optimizer 235. When the observed cross-correlations are less than a pre-assigned threshold, the corresponding cost functions (F2) shall be assigned to zero. On the other hand, when the observed cross-correlation is greater than the pre-assigned threshold, the value of the corresponding cost function (F2) shall be assigned to a positive number. The larger the observed cross-correlation is the larger value the corresponding cost function (F2) shall be assigned to.

In the equalizing and optimizing process, the optimizer 235 is configured to calculate a total cost based on the sum of all of the cost functions (F1) and (F2) and then compare the total cost with a predetermined cost threshold. When the total cost is verified to be greater than the predetermined cost threshold, the optimizer 235 is configured to calculate a variation in the total cost in response to perturbations on the equalizing weights buffered in the equalizers 231a, 231b, 231c and 231d or to measure each gradient of the total cost with respect to the equalizing weights buffered in the equalizers 231a, 231b, 231c and 231d. Based on the calculated variation or measured gradients, the optimizer 235 creates updated equalizing weights, based on a cost minimization algorithm, such as steepest descent method, to be sent to the adaptive equalizers 231a, 231b, 231c and 231d respectively and to replace respective current ones buffered in the adaptive equalizers 231a, 231b, 231c and 231d in the next scheduled clock cycle. Thereby, the equalizing weights buffered in the equalizers 231a, 231b, 231c and 231d can be updated. The optimizer 235 is configured to stop the equalizing and optimizing process when the total cost is verified to be less than the predetermined cost threshold.

Each of the equalizing weights buffered in the equalizers 231a, 231b, 231c and 231c can be, but not limited to, a complex value such that the equalized signals, such as the equalized signals $S_1$, $S_2$, $S_3$ and $S_4$, e.g., illustrated in FIG. 1B, can be rotated precisely to become in phase. In the case that the equalizer is performed by a narrow band equalizer, such as amplitude-and-phase filter, the narrow band equalizer can alter each of the received signals, such as the signals $W_1$, $W_2$, $W_3$ and $W_4$, e.g., illustrated in FIG. 1B, by fixed amplitude and phase across a narrow frequency band. The narrow band equalizer can provide phase and amplitude modifications to each of the received signals, such as the signals $W_1$, $W_2$, $W_3$ and $W_4$, e.g., illustrated in FIG. 1B, with a constant phase shift and constant amplitude attenuation across the narrow frequency band. Alternatively, in the case that the equalizer is performed by a broadband equalizer, such as finite impulse filter (FIR), the broadband equalizer can alter each of the received signals, such as the signals $W_1$, $W_2$, $W_3$ and $W_4$, e.g., illustrated in FIG. 1B, by amplitude and phase depending on an amplitude and phase profile, changing with frequencies, across a broad frequency band.

The broad band equalizer can provide phase and amplitude modifications to each of the received signals, such as the signals $W_1$, $W_2$, $W_3$ and $W_4$, e.g., illustrated in FIG. 1B, with a constant phase shift and a constant amplitude attenuation in each sub-band across the broad frequency band, but the phase shift and amplitude attenuation in one sub-band across the broad frequency band is different from those in the other sub-bands across the broad frequency band.

The equalized signals, such as the equalized signals $S_1$, $S_2$, $S_3$ and $S_4$, e.g., illustrated in FIG. 1B, are transformed by the wave-front demultiplexer 232, which can refer to the wave-front demultiplexing transform performed by the wave-front demultiplexer 232 as illustrated in FIG. 1A.

In all of the embodiments of the present disclosure, the equalization processor 231, the wave-front demultiplexer 232 and the optimizer 235 can be, but not limited to, embedded in a single integrated circuit chip, single system-on chip or single chip package. The equalization processor 231 can be hardware or can be realized by software installed in and performed by a computer. The optimizer 235 can be hardware or can be realized by software installed in and performed by the computer.

The above-mentioned descriptions of the wave-front multiplexer 213, the wave-front demultiplexer 232, the equalization processor 231, and the optimizer 235 can be applied to the following embodiments of the invention.

Time-Domain Multiplexer (TDM):

A time-domain multiplexer (TDM) can perform time-domain multiplexing to combine or integrate the number N of pieces of input digital data in the number N of respective input data flows each having a low bandwidth J/N sampled at a low sampling rate K/N into a piece of output digital data in an output data flow having a high bandwidth J sampled at a high sampling rate K based on the number N of respective non-overlapped time slots. For example, the time-domain multiplexer is a 4-to-1 time-domain multiplexer that can combine or integrate four pieces of input digital data, i.e. first, second, third and fourth pieces of input data flow, in four respective input data flows, i.e. first, second, third and fourth input data flows, each having a bandwidth J/4 sampled at a sampling rate K/4 into a piece of output digital data in an output data flow having a bandwidth J sampled at a sampling rate K based on four respective non-overlapped time slots, i.e. first, second, third and fourth time slots. For more elaboration, the piece of output digital data output from the 4-to-1 time-domain multiplexer at the first time slot may be the first piece of input digital data in the first input data flow. The piece of output digital data output from the 4-to-1 time-domain multiplexer at the second time slot may be the second piece of input digital data in the second input data flow. The piece of output digital data output from the 4-to-1 time-domain multiplexer at the third time slot may be the third piece of input digital data in the third input data flow. The piece of output digital data output from the 4-to-1 time-domain multiplexer at the fourth time slot may be the fourth piece of input digital data in the fourth input data flow.

The time-domain multiplexer can be implemented digitally in software programming in a microprocessor, programmable application-specific integrated circuit (ASIC), and/or field-programmable gate array (FPGA).

Time-Domain Demultiplexer (TDDM):

A time-domain demultiplexer (TDDM) can perform time-domain demultiplexing to allocate input digital data in an input data flow having a high bandwidth P sampled at a high sampling rate Q into the number M of pieces of output digital data in the number M of respective data flows having a low bandwidth P/M sampled at a low sampling rate Q/M based on the number M of respective non-overlapped time slots. For example, the time-domain demultiplexer is a 1-to-4 time-domain demultiplexer that can allocate input digital data in an input data flow having a high bandwidth P sampled at a high sampling rate Q into four pieces of output digital data, i.e. first, second, third and fourth pieces of output digital data, in four respective non-overlapped data flows, i.e. first, second, third and fourth data flows, having a bandwidth P/4 sampled at a sampling rate Q/4 based on four respective time slots, i.e. first, second, third and fourth time slots. For more elaboration, the first piece of output digital data in the first output data flow may be the input digital data, in the input data flow, arriving at the 1-to-4 time-domain demultiplexer at the first time slot. The second piece of output digital data in the second output data flow may be the input digital data, in the input data flow, arriving at the 1-to-4 time-domain demultiplexer at the second time slot. The third piece of output digital data in the third output data flow may be the input digital data, in the input data flow, arriving at the 1-to-4 time-domain demultiplexer at the third time slot. The fourth piece of output digital data in the fourth output data flow may be the input digital data, in the input data flow, arriving at the 1-to-4 time-domain demultiplexer at the fourth time slot.

The time-domain demultiplexer can be implemented digitally in software programming in a microprocessor, programmable application-specific integrated circuit (ASIC), and/or field-programmable gate array (FPGA).

Figure 2A:
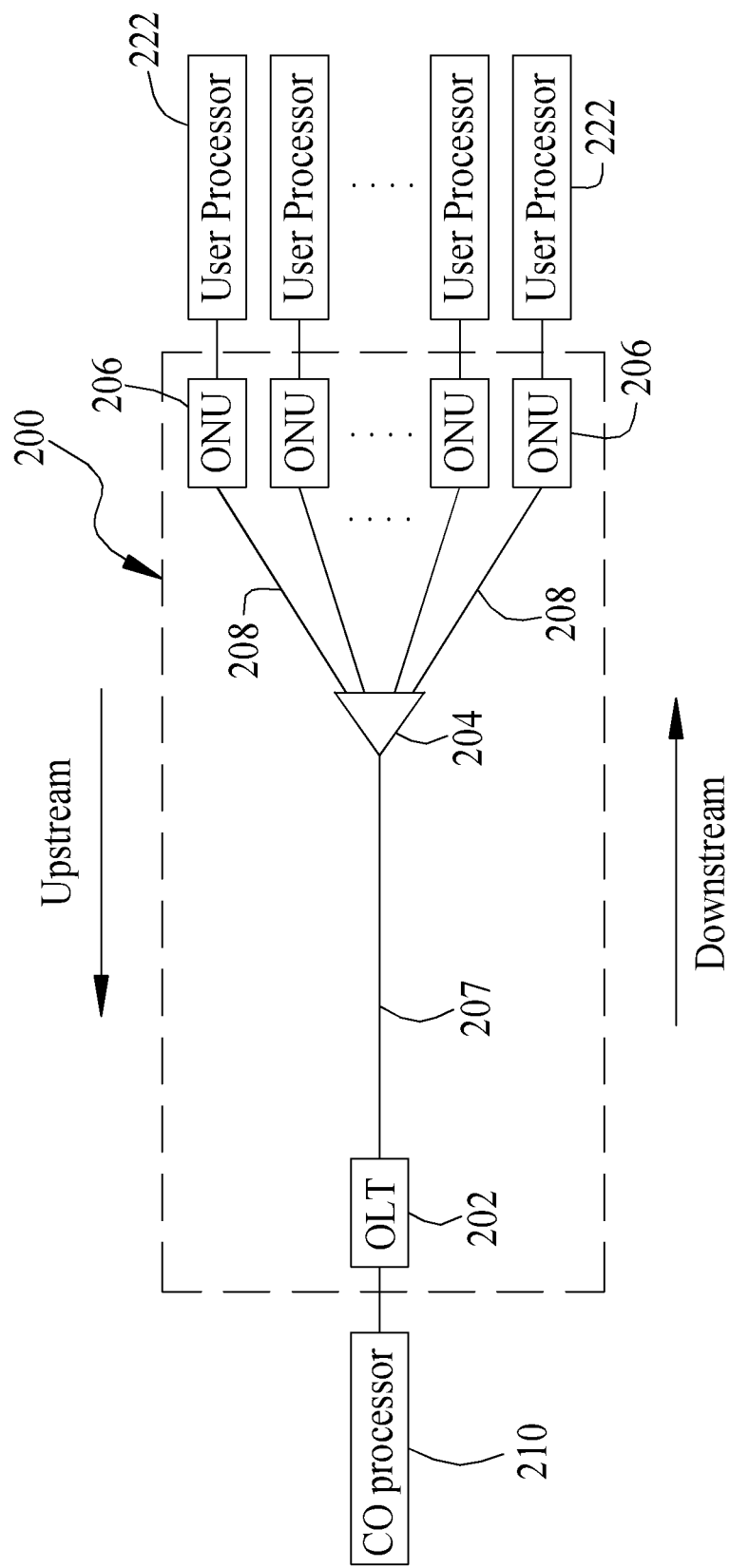
FIG. 2A shows a schematic diagram of a passive optical network according to an embodiment of the present disclosure.

Structure of Passive Optical Network (PON):

FIG. 2A is a schematic diagram showing a passive optical network (PON) in combination with wave-front multiplexing and demultiplexing techniques for dynamically allocating the resource of the passive optical network system for multiple user processors according to an embodiment of the present invention. The passive optical network 200 includes an optical line terminal 202 (OLT) 202, an optical transferring device 204, the number n of optical network units 206 (ONUs), and multiple optical fibers 207 and 208, wherein the number n may be a positive integer greater than 2, such as 4, 8 or 12. The optical fiber 207 connects the optical line terminal 202 (OLT) and the optical transferring device 204 and each of the optical fibers 208 connects the optical transferring device 204 and a corresponding one of the optical network units 206 (ONUs).

Referring to FIG. 2A, the optical transferring device 204 may serve as an optical coupler and an optical splitter. For example, in a downstream direction, the optical transferring device 204 can serve as an optical splitter for splitting an input optical signal, passing from the optical line terminal 202 and through the optical fiber 207, into multiple output optical signals, passing to the respective optical network units 206 and through the respective optical fibers 208, wherein data carried by each of the output optical signals are substantially equivalent to those carried by the input optical signal. In an upstream direction, the optical transferring device 204 can serve as an optical coupler for combining optical signals, passing from the respective optical network units 206 and through the respective optical fibers 208, into an optical signal, passing to the optical line terminal 202 and through the optical fiber 207.

Referring to FIG. 2A, the optical line terminal 202 (OLT) is arranged between the central office (CO) processor 210 and the optical transferring device 204. In the downstream direction, the optical line terminal 202 can transform electronic data, output from the central office processor 210, into optical data sent to the optical transferring device 204 through the optical fiber 207. In the upstream direction, the optical line terminal 202 can transform optical data, output from the optical transferring device 204, into electronic data sent to the central office processor 210.

Referring to FIG. 2A, each of the optical network units 206 (ONUs) is arranged between and the optical transferring device 204 and a corresponding one of thirty-two user processors 222. In the downstream direction, each of the optical network units 206 can transform optical data, output from the optical transferring device 204, into electronic data sent to a corresponding one of the user processors 222. In the upstream direction, each of the optical network units 206 can transform electronic data, output from a corresponding one of the user processors 222, into optical data sent to the optical transferring device 204 through a correspond one of the optical fibers 208.

Figure 2B:
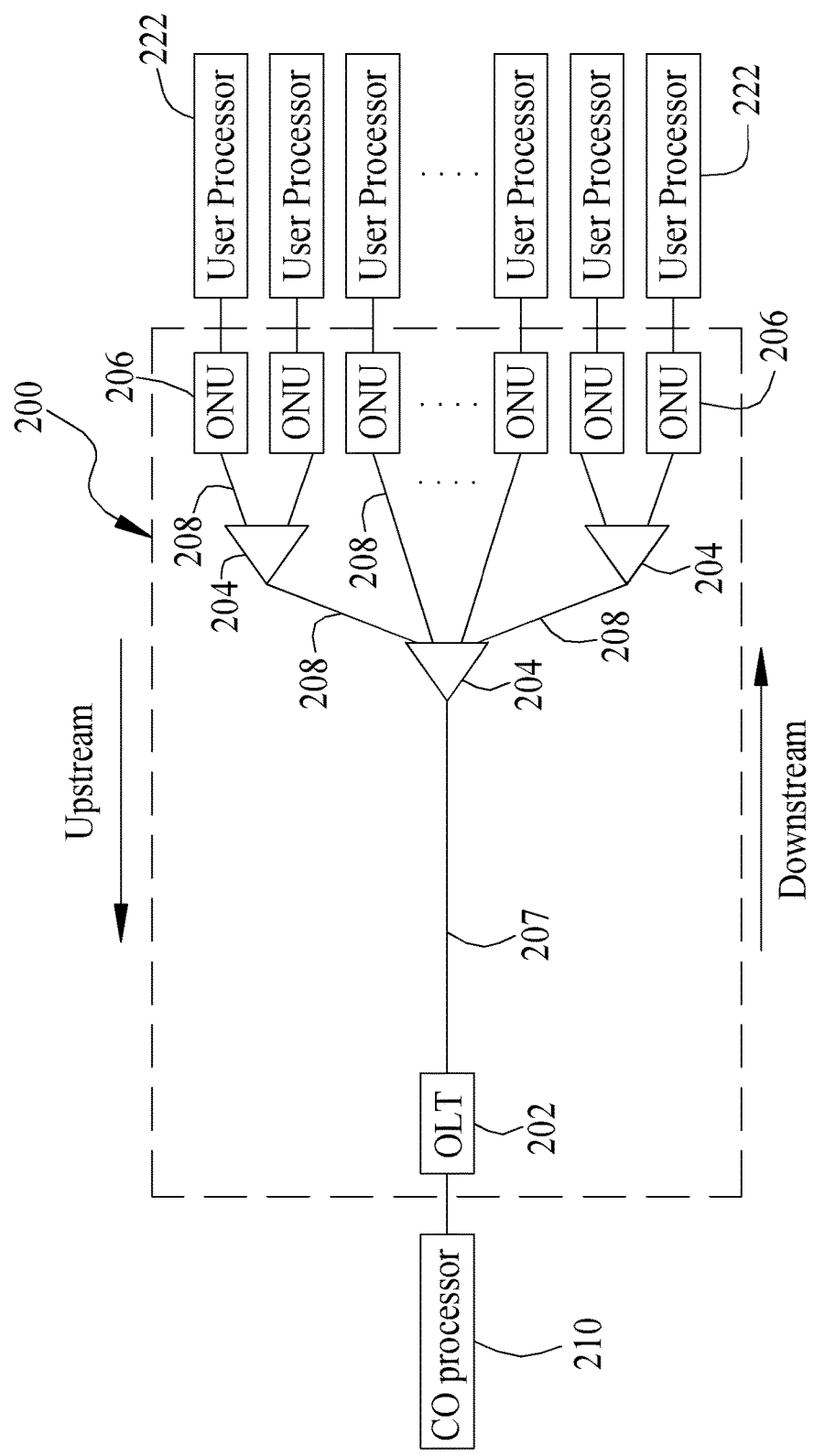
FIG. 2B shows a schematic diagram of a passive optical network according to another embodiment of the present disclosure.

Alternatively, FIG. 2B is a schematic diagram showing a passive optical network (PON) in combination with wave-front multiplexing and demultiplexing techniques for dynamically allocating the resource of the passive optical network system for multiple user processors according to another embodiment of the present invention. Referring to FIG. 2B, the optical transferring devices 204 can be multiple layered for some of the user processors 222, i.e. the top two and bottom two of the user processors 222, wherein an optical fiber 208 connects optical transferring devices 204 at different layers for communicating data therebetween. The optical transferring device 204 can be single layered for some of the user processors 222, i.e. the middle ones of the user processors 222.

Figure 3A:
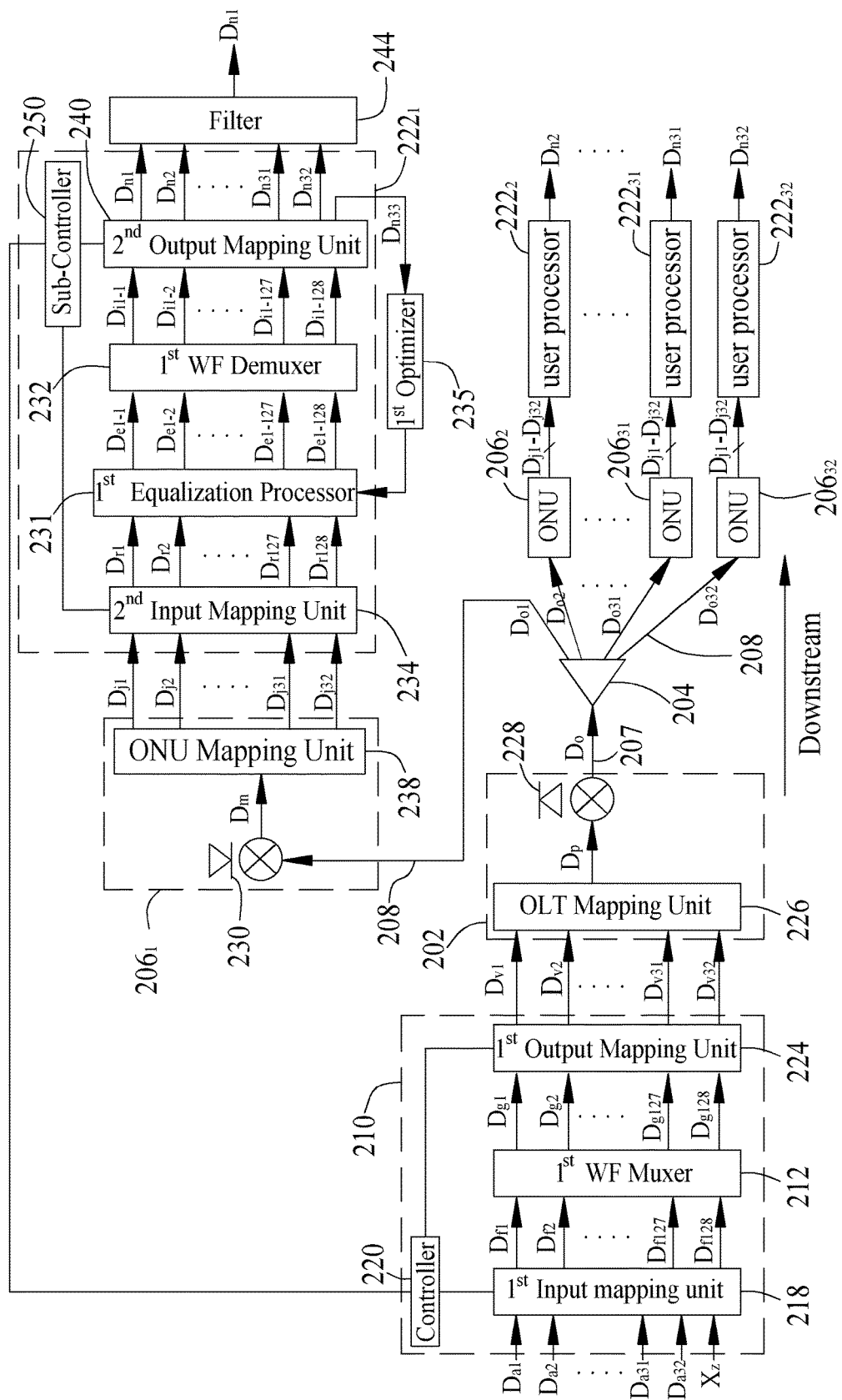
FIGS. 3A-3C show schematic diagrams of downstream data flows via a passive optical network PON system according to an embodiment of the present disclosure.
Figure 3B:
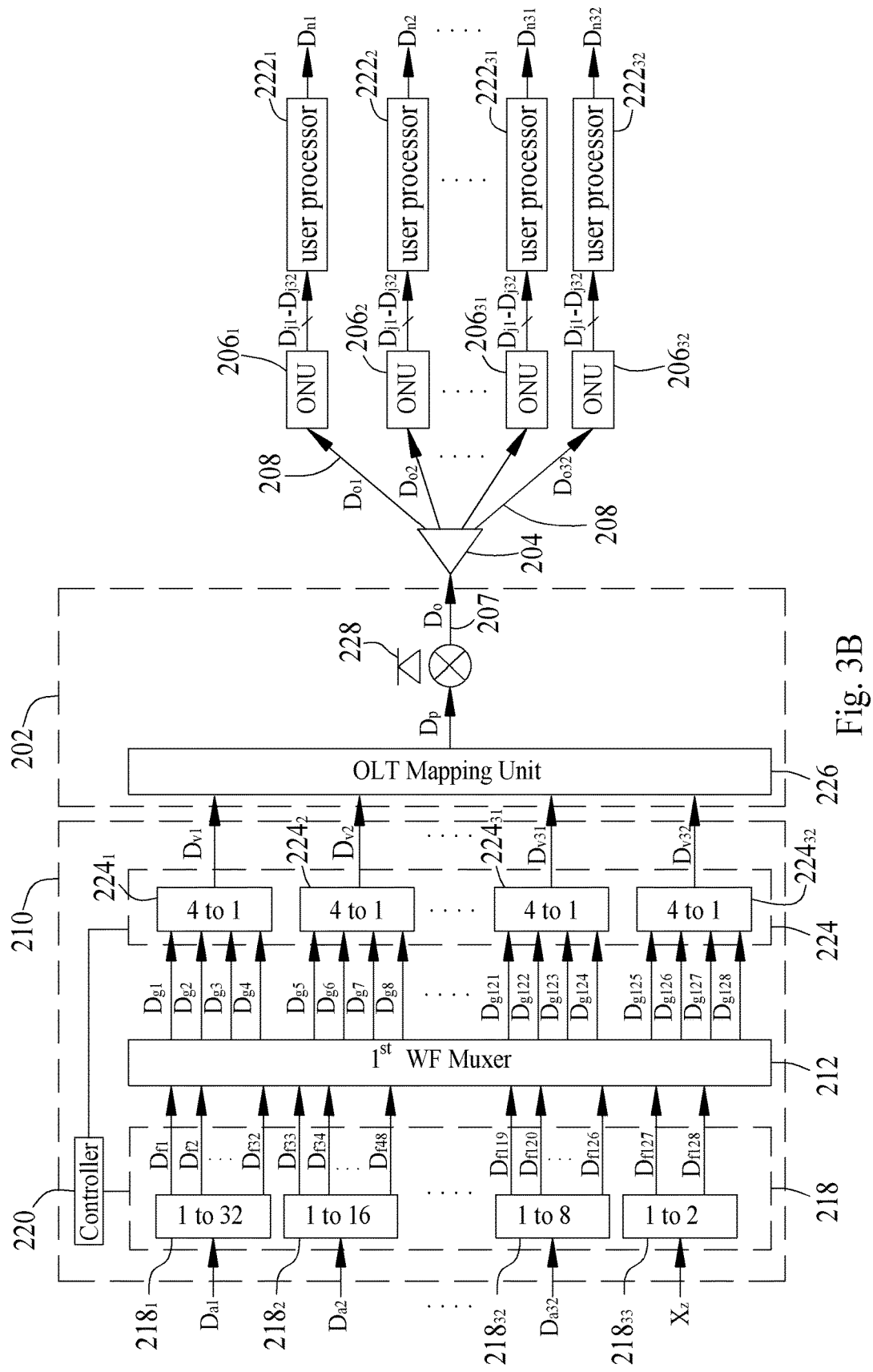
Figure 3C:
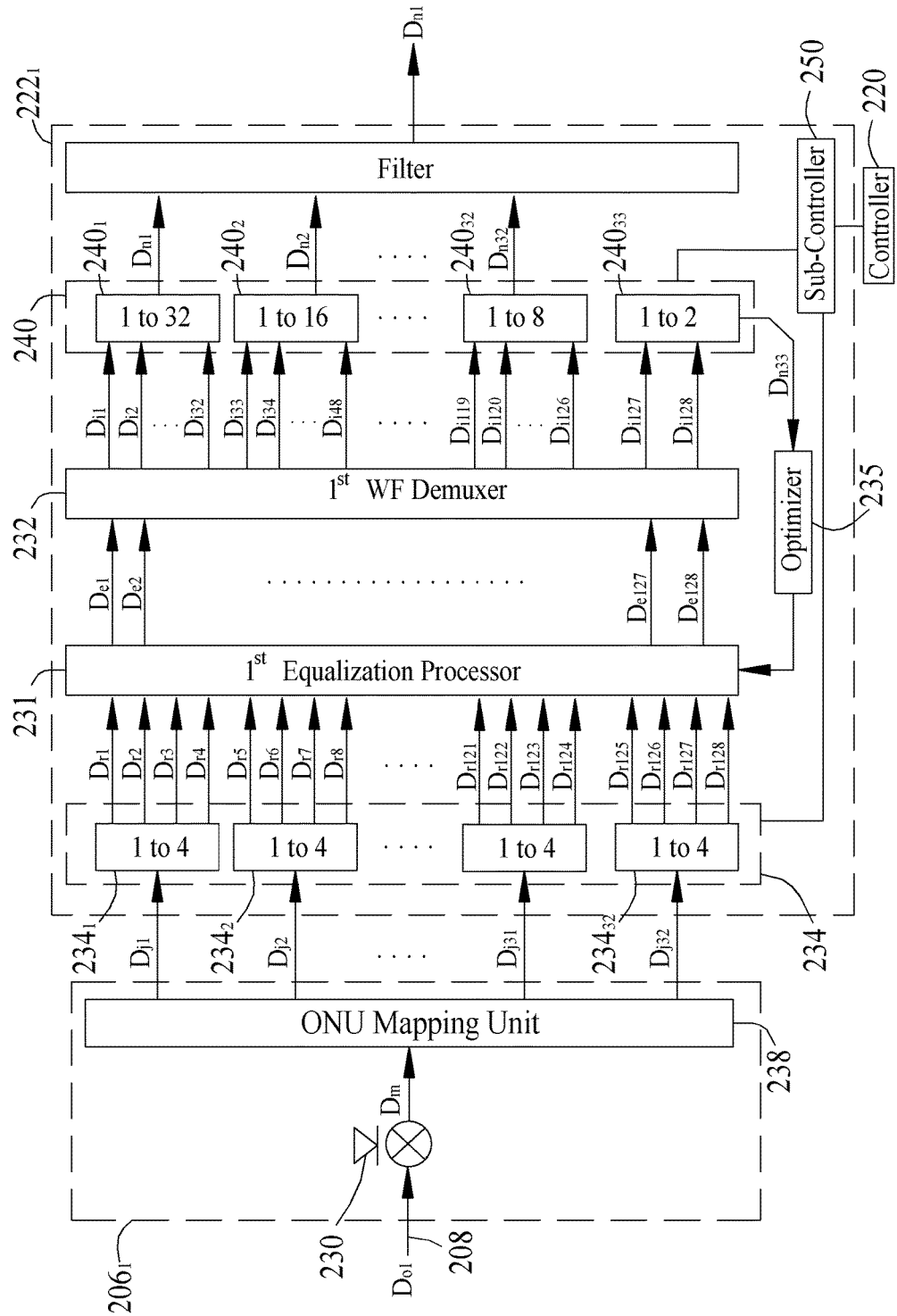

Downstream Dataflow Via Passive Optical Network (PON):

FIGS. 3A, 3B and 3C are schematic diagrams showing downstream dataflow performed by a passive optical network (PON) in combination with wave-front multiplexing and demultiplexing techniques according to an embodiment of the present invention. Referring to FIG. 3A and FIG. 3B, the passive optical network includes a central office (CO) processor 210 and thirty-two user processors $222_1$-$222_{32}$, for example. The central office processor 210 includes a first wave-front multiplexer 212, which can refer to the wave-front multiplexer 212 as illustrated in FIGS. 1A and 1B, a first input mapping unit 218 at the upstream side of the wave-front multiplexer 212, a first output mapping unit 224 at the downstream side of the wave-front multiplexer 212 and a controller 220 controlling the mapping of the first input mapping unit 218 and second output mapping unit 240 and/or the mapping of the first output mapping unit 224 and second input mapping unit 234. Digital electronic data in thirty-two data flows $D_{a1}$-$D_{a32}$ and pilot or diagnostic electronic data in data flow $X_z$ are injected into the central office processor 210 and are to be transmitted to the thirty-two user processor $222_1$-$222_{32}$, respectively.

Referring to FIGS. 3A and 3B, the first input mapping unit 218 is arranged for dynamically mapping digital data in the data flows $D_{a1}$-$D_{a32}$ and pilot or diagnostic data in the data flow $X_z$ and can be implemented digitally in software programming in a microprocessor, programmable application-specific integrated circuit (ASIC), and/or field-programmable gate array (FPGA). The first input mapping unit 218 can perform time-domain demultiplexing (TDDM), frequency-division/domain demultiplexing (FDDM) or combinations of FDDM/TDDM techniques, to map digital data in the data flows $D_{a1}$-$D_{a32}$ and the pilot or diagnostic data in the data flow $X_z$. The pilot or diagnostic signal $X_z$ may have a single frequency and fixed amplitude. Alternatively, the pilot or diagnostic signal $X_z$ could change based on time or could be any signal known by the passive optical network (PON). In contrast, the extraneous signals $D_{a1}$-$D_{a32}$ are unknown by the passive optical network and input into the passive optical network from an extraneous system. In this embodiment, the first input mapping unit 218 may include thirty-three time-domain demultiplexers $218_1$-$218_{33}$ each allocating digital data in a corresponding received one of the data flows $D_{a1}$-$D_{a32}$ and $X_z$ into the corresponding number of pieces of digital electronic data in corresponding ones of 128 data flows $D_{f1}$-$D_{f128}$ based on the corresponding number of respective non-overlapped time slots, which can refer to the above paragraphs in the section "Time-domain demultiplexer (TDDM)". For example, the time-domain demultiplexer $218_1$ may allocate the received digital data in the data flow $D_{a1}$ into thirty-two pieces of digital data in the thirty-two respective data flows $D_{f1}$-$D_{f32}$ based on thirty-two respective non-overlapped time slots $ta1_1$-$ta1_{32}$. For more elaboration, the digital data in the data flow $D_{f1}$ output from the time-domain demultiplexer $218_1$ may be the digital data, in the data flow $D_{a1}$, arriving at the time-domain demultiplexer $218_1$ at the time slot $ta1_1$. The digital data in the data flow $D_{f2}$ output from the time-domain demultiplexer $218_1$ may be the digital data, in the data flow $D_{a1}$, arriving at the time-domain demultiplexer $218_1$ at the time slot $ta1_1$. Other situations can be considered in a similar way.

Alternatively, the thirty-three time-domain demultiplexers $218_1$-$218_{33}$ may be replaced with thirty-three respective frequency-domain demultiplexers each allocating digital data in a corresponding received one of the data flows $D_{a1}$-$D_{a32}$ and $X_z$ into the corresponding number of pieces of digital electronic data in corresponding ones of 128 data flows $D_{f1}$-$D_{f128}$ based on the corresponding number of respective non-overlapped frequency spectrums. For example, the frequency-domain demultiplexer $218_1$ may allocate the received digital data in the data flow $D_{a1}$ into thirty-two pieces of digital data in the thirty-two respective data flows $D_{f1}$-$D_{f32}$ based on thirty-two respective non-overlapped frequency spectrums $fa1_1$-$fa1_{32}$. For more elaboration, the digital data in the data flow $D_{f1}$ output from the frequency-domain demultiplexer $218_1$ may be the digital data in the data flow $D_{a1}$ at the frequency spectrum $fa1_1$. The digital data in the data flow $D_{f2}$ output from the frequency-domain demultiplexer $218_1$ may be the digital data in the data flow $D_{a1}$ at the frequency spectrum $fa1_2$. Other situations can be considered in a similar way.

The digital data in each of the data flows $D_{a1}$-$D_{a32}$ and $X_z$ can be allocated into the various number of pieces of data in accordance with data volume of the digital data to be transferred. The larger the data volume of the digital data to be transferred in one of the data flows $D_{a1}$-$D_{a32}$ and $X_z$, the larger number of pieces of data the digital data to be transferred in one of the data flows $D_{a1}$-$D_{a32}$ and $X_z$ can be allocated into. In this embodiment, currently, the data volume of the digital data to be transferred in the data flow $D_{a1}$ is larger than that in the data flow $D_{a2}$, so the digital data in the data flow $D_{a1}$ are allocated into the larger number of pieces of data than the digital data in the data flow $D_{a2}$ are allocated, wherein the digital data in the data flow $D_{a1}$ are allocated into thirty-two pieces of data in the data flows $D_{f1}$-$D_{f32}$, and the digital data in the data flow $D_{a2}$ are allocated into sixteen pieces of data in the data flows $D_{f33}$-$D_{f48}$. At the next time point, if the data volume of the digital data to be transferred in the data flow $D_{a1}$ is less than that in the data flow $D_{a2}$, the digital data in the data flow $D_{a1}$ can be allocated into the smaller number of pieces of data than the digital data in the data flow $D_{a2}$ are allocated.

Alternatively, the digital data in each of the data flows $D_{a1}$-$D_{a32}$ and $X_z$ can be allocated into the various number of pieces of data in accordance with user's subscription for a specific data flow rate.

Referring to FIGS. 3A and 3B, the number of pieces of data, into which the digital data in each of the data flows $D_{a1}$-$D_{a32}$ and $X_z$ are allocated, can be altered or controlled by the controller 220. The controller 220 also synchronously alters or controls mapping of each second output mapping unit 240 in the thirty-two user processor $222_1$-$222_{32}$, that is the controller 220 can dynamically and synchronously alter or control the input mapping of the central office processor 210 and the output mapping of the user processors $222_1$-$222_{32}$, such that the mapping of the first input mapping unit 218 is correspondent to that of the second output mapping unit 240 in each of the thirty-two user processor $222_1$-$222_{32}$. Thereby, the digital data in the data flows $D_{a1}$-$D_{a32}$ and $X_z$ can efficiently share the resource or bandwidth of the passive optical network 200. The resource or bandwidth of the passive optical network 200 for the digital data in the data flows $D_{a1}$-$D_{a32}$ and $X_z$ can be dynamically controlled or altered.

Referring to FIG. 3B, the first wave-front multiplexer 212 performs the above wave-front multiplexing transform to process 128 input signals, carrying 128 respective pieces of digital data in the respective data flows $D_{f1}$-$D_{f128}$, into 128 linear combinations in the respective data flows $D_{g1}$-$D_{g128}$, each combining all of the input signals multiplied by respective weightings, which can refer to the description illustrated in FIGS. 1A, 1B and 1C. In this case, the number of H is equal to 128. The first wave-front multiplexer 212 may include 128*128 computing units (CU) and 128 summing processors (SP). The computing units (CU) form a processor array with 128 rows and 128 columns. The 128 input digital signals $D_{f1}$-$D_{f128}$ can be received by the computing units (CU) in the respective 128 columns in the processor array. Upon receiving the input digital signals $D_{f1}$-$D_{f128}$, each of the computing units (CU) independently weights or multiplies its received signal by a weighting value, to generate a weighted signal. The 128 summing processors (SP) can output 128 digital signals $D_{g1}$-$D_{g128}$ each combining the weighted signals output from the computing units (CU) in a corresponding one of the 128 rows in the processor array.

The first output mapping unit 224 can receive digital electronic data in the data flows $D_{g1}$-$D_{g128}$ output from the first wave-front multiplexer 212, wherein the first output mapping unit 224 comprises thirty-two 4-to-1 time-domain multiplexer (TDM) $224_1$-$224_{32}$, each combining four received corresponding pieces of digital data in respective four of the data flows $D_{g1}$-$D_{g128}$ into digital data in corresponding one of the thirty-two data flows $D_{v1}$-$D_{v32}$ based on four respective non-overlapped time slots, which can refer to the above paragraphs in the section "Time-domain multiplexer (TDM)". For example, the time-domain multiplexer $224_1$ may combine or integrate the four received pieces of digital electronic data in the respective four data flows $D_{g1}$-$D_{g4}$ into a piece of digital data in the data flow $D_{v1}$ based on four respective non-overlapped time slots $tb1_1$-$tb1_4$. For more elaboration, the digital data in the data flow $D_{v1}$ output from the time-domain multiplexer $224_1$ at the time slot $tb1_1$ may be the digital data in the data flow $D_{g1}$, the digital data in the data flow $D_{v1}$ output from the time-domain multiplexer $224_1$ at the time slot $tb1_2$ may be the digital data in the data flow $D_{g2}$, the digital data in the data flow $D_{v1}$ output from the time-domain multiplexer $224_1$ at the time slot $tb1_3$ may be the digital data in the data flow $D_{g3}$ and the digital data in the data flow $D_{v1}$ output from the time-domain multiplexer $224_1$ at the time slot $tb1_4$ may be the digital data in the data flow $D_{g4}$. Other situations can be considered in a similar way.

Alternatively, the thirty-two time-domain multiplexers $224_1$-$224_{32}$ may be replaced with thirty-two respective 4-to-1 frequency-domain multiplexers each combining four received corresponding pieces of digital electronic data in respective four of the data flows $D_{g1}$-$D_{g128}$ into digital data in corresponding one of the thirty-two data flows $D_{v1}$-$D_{v32}$ based on four respective non-overlapped frequency spectrums. For example, the 4-to-1 frequency-domain multiplexer $224_1$ may combine or integrate the four received pieces of digital data in the respective four data flows $D_{g1}$-$D_{g4}$ into a piece of digital data in the data flow $D_{v1}$ based on four respective non-overlapped frequency slots $fb1_1$-$fb1_4$. For more elaboration, the digital data in the data flow $D_{v1}$ output from the frequency-domain multiplexer $224_1$ at the frequency spectrum $fb1_1$ may be the digital data in the data flow $D_{g1}$, the digital data in the data flow $D_{v1}$ output from the frequency-domain multiplexer $224_1$ at the frequency spectrum $fb1_2$ may be the digital data in the data flow $D_{g2}$, the digital data in the data flow $D_{v1}$ output from the frequency-domain multiplexer $224_1$ at the frequency spectrum $fb1_3$ may be the digital data in the data flow $D_{g3}$ and the digital data in the data flow $D_{v1}$ output from the frequency-domain multiplexer $224_1$ at the frequency spectrum $fb1_4$ may be the digital data in the data flow $D_{g4}$. Other situations can be considered in a similar way.

Referring to FIGS. 3A and 3B, the number of pieces of data, which are combined into a corresponding one of the data flows $D_{v1}$-$D_{v32}$, can also be altered or controlled by the controller 220. The controller 220 also synchronously alters or controls mapping of each second input mapping unit 234 in the thirty-two user processor $222_1$-$222_{32}$, that is the controller 220 can dynamically and synchronously alter or control the output mapping of the central office processor 210 and the input mapping of the user processors $222_1$-$222_{32}$, such that the mapping of the first output mapping unit 224 is correspondent to that of the second input mapping unit 234 in each of the thirty-two user processor $222_1$-$222_{32}$.

Referring to FIG. 3B, the optical line terminal (OLT) 202 comprises a time-domain multiplexer (TDM) 226 and an optical laser device 228 connected to the time-domain multiplexer (TDM) 226, wherein the optical laser device 228 is at the downstream side of the time-domain multiplexer (TDM) 226. The time-domain multiplexer (TDM) 226 can receive digital electronic data in the data flows $D_{v1}$-$D_{v32}$ output from the first output mapping unit 224 of the central office processor 210. The time-domain multiplexer 226 may combine or integrate the thirty-two received pieces of digital electronic data in the respective thirty-two data flows $D_{v1}$-$D_{v32}$ into a piece of digital electronic data in the data flow $D_p$ based on thirty-two respective non-overlapped time slots $tc_1$-$tc_{32}$, which can refer to the above paragraphs in the section "Time-domain multiplexer (TDM)". For more elaboration, the digital electronic data in the data flow $D_p$ output from the time-domain multiplexer 226 at the time slot $tc_1$ may be the digital electronic data in the data flow $D_{v1}$. The digital electronic data in the data flow $D_p$ output from the time-domain multiplexer 226 at the time slot $tc_2$ may be the digital electronic data in the data flow $D_{v2}$. Other situations can be considered in a similar way.

Alternatively, the time-domain multiplexer (TDM) 226 may be replaced with a frequency-domain multiplexer combining or integrating the thirty-two received pieces of digital electronic data in the respective thirty-two data flows $D_{v1}$-$D_{v32}$ into a piece of digital electronic data in the data flow $D_p$ based on thirty-two respective non-overlapped frequency spectrums $fc_1$-$fc_{32}$. For more elaboration, the digital electronic data in the data flow $D_p$ output from the frequency-domain multiplexer 226 at the frequency spectrum $fc_1$ may be the digital electronic data in the data flow $D_{v1}$. The digital electronic data in the data flow $D_p$ output from the frequency-domain multiplexer 226 at the frequency spectrum $fc_2$ may be the digital electronic data in the data flow $D_{v2}$. Other situations can be considered in a similar way.

Referring to FIGS. 3A and 3B, the optical laser device 228 can transform the electronic digital electronic data in the data flow $D_p$ into an optical signal $D_o$, wherein the optical signal $D_o$ can be output from the optical laser device 228 to the optical transferring device 204 via the optical fiber 207. In this embodiment, the optical transferring device 204 serves as an optical splitter (OS). The optical signal $D_o$ can be split to thirty-two optical signals $D_{o1}$-$D_{o32}$ by the optical transferring device 204, wherein each of the optical signals $D_{o1}$-$D_{o32}$ is substantially equivalent to the optical signal $D_o$. The thirty-two split optical signals $D_{o1}$-$D_{o32}$ can be transmitted to thirty-two optical network units (ONU) $206_1$-$206_{32}$ via the optical fibers 208, respectively.

Referring to FIGS. 3A and 3C, the optical network units (ONU) $206_1$-$206_{32}$ have the same architecture as one another and each include an optical signal receiver 230 and a time-domain demultiplexer (TDDM) 238. One of the thirty-two optical network units (ONU) $206_1$-$206_{32}$ is shown in detail in FIGS. 3A and 3C. With regards to each of the optical network units (ONU) $206_1$-$206_{32}$, the optical signal receivers 230 can transform a corresponding received one of the optical signals $D_{o1}$-$D_{o32}$ into electronic digital electronic data $D_m$ to be transmitted to the time-domain demultiplexer (TDDM) 238. Each of the time-domain demultiplexer (TDDM) 238 can allocate the received electronic digital electronic data $D_m$ into thirty-two pieces of digital electronic data in thirty-two respective data flows $D_{j1}$-$D_{j32}$ based on thirty-two respective non-overlapped time slots $td_1$-$td_{32}$, which can refer to the above paragraphs in the section "Time-domain demultiplexer (TDDM)". For more elaboration, the digital electronic data in the data flow $D_{j1}$ output from the time-domain demultiplexer 238 may be the digital electronic data $D_m$ arriving at the time-domain demultiplexer 238 at the time slot $td_1$. The digital electronic data in the data flow $D_{j2}$ output from the time-domain demultiplexer 238 may be the digital electronic data $D_m$ arriving at the time-domain demultiplexer 238 at the time slot $td_2$. Other situations can be considered in a similar way.

Alternatively, the time-domain demultiplexer 238 may be replaced with a frequency-domain demultiplexer allocating the received electronic digital electronic data $D_m$ into thirty-two pieces of digital electronic data in thirty-two respective data flows $D_{j1}$-$D_{j32}$ based on thirty-two respective non-overlapped frequency spectrums $fd_1$-$fd_{32}$. For more elaboration, the digital electronic data in the data flow $D_{j1}$ output from the frequency-domain demultiplexer 238 may be the digital electronic data $D_m$ at the frequency spectrum $fd_1$. The digital electronic data in the data flow $D_{j2}$ output from the frequency-domain demultiplexer 238 may be the digital electronic data $D_m$ at the frequency spectrum $fd_2$. Other situations can be considered in a similar way.

When the device 226 of the optical line terminal (OLT) 202 is the above-mentioned time-domain multiplexer, the device 238 in each of the optical network units (ONU) $206_1$-$206_{32}$ can be the above-mentioned time-domain demultiplexer. When the device 226 of the optical line terminal (OLT) 202 is the above-mentioned frequency-domain multiplexer, the device 238 in each of the optical network units (ONU) $206_1$-$206_{32}$ can be the above-mentioned frequency-domain demultiplexer. The thirty-two pieces of digital electronic data in the data flows $D_{j1}$-$D_{j32}$ are substantially equivalent to the thirty-two pieces of digital electronic data in the data flows $D_{v1}$-$D_{v32}$, respectively, that is, the data flows $D_{j1}$-$D_{j32}$ carry substantially the same information as the respective data flows $D_{v1}$-$D_{v32}$ carry.

Referring to FIGS. 3A and 3C, the user processors $222_1$-$222_{32}$ have the same architecture as one another and each include a second input mapping unit 234 at a downstream side of a corresponding one of the optical network units (ONU) $206_1$-$206_{32}$, a first equalization processor 231 at a downstream side of the second input mapping unit 234, a first wave-front demultiplexer 232 at a downstream side of the first equalization processor 231, a second output mapping unit 240 at a downstream side of the first wave-front demultiplexer 232, a filter 244 at a downstream side of the second output mapping unit 240, a first optimizer 235 arranged between outputs of the second output mapping unit 240 and the first equalization processor 231 and a sub-controller 250 configured to control or alter the mapping of the second output mapping unit 240 and/or the mapping of the second input mapping unit 234. One of the thirty-two user processors $222_1$-$222_{32}$ is shown in detail in FIGS. 3A and 3C.

Referring to FIG. 3C, the second input mapping unit 234 can receive digital electronic data in the data flows $D_{j1}$~$D_{j32}$ output from a corresponding one of the optical network units (ONU) $206_1$-$206_{32}$, wherein the second input mapping unit 234 comprises thirty-two 1-to-4 time-domain demultiplexer (TDDM) $234_1$-$234_{32}$, each allocating digital electronic data in a corresponding received one of the data flows $D_{j1}$-$D_{j32}$ into four pieces of digital electronic data in corresponding four of 128 data flows $D_{r1}$-$D_{r128}$ based on four respective non-overlapped time slots, which can refer to the above paragraphs in the section "Time-domain demultiplexer (TDDM)". For example, the time-domain demultiplexer $234_1$ may allocate the received digital electronic data in the data flow $D_{j1}$ into four pieces of digital electronic data in the four respective data flows $D_{r1}$-$D_{r4}$ based on four respective non-overlapped time slots $te1_1$-$te1_4$. For more elaboration, the digital electronic data in the data flow $D_{r1}$ output from the time-domain demultiplexer $234_1$ may be the digital electronic data, in the data flow $D_{j1}$, arriving at the time-domain demultiplexer $234_1$ at the time slot tell, the digital electronic data in the data flow $D_{r2}$ output from the time-domain demultiplexer $234_1$ may be the digital electronic data, in the data flow $D_{j1}$, arriving at the time-domain demultiplexer $234_1$ at the time slot $te1_2$, the digital electronic data in the data flow $D_{r3}$ output from the time-domain demultiplexer $234_1$ may be the digital electronic data, in the data flow $D_{j1}$, arriving at the time-domain demultiplexer $234_1$ at the time slot $te1_3$, and the digital electronic data in the data flow $D_{r4}$ output from the time-domain demultiplexer $234_1$ may be the digital electronic data, in the data flow $D_{j1}$, arriving at the time-domain demultiplexer $234_1$ at the time slot $te1_4$. Other situations can be considered in a similar way.

Alternatively, the thirty-two time-domain demultiplexers $234_1$-$234_{32}$ may be replaced with thirty-two respective 1-to-4 frequency-domain demultiplexers each allocating digital electronic data in a corresponding received one of the data flows $D_{j1}$-$D_{j32}$ into four pieces of digital electronic data in corresponding four of 128 data flows $D_{r1}$-$D_{r128}$ based on four respective non-overlapped frequency spectrums. For example, the frequency-domain demultiplexer $234_1$ may allocate the received digital electronic data in the data flow $D_{j1}$ into four pieces of digital electronic data in the four respective data flows $D_{r1}$-$D_{r4}$ based on four respective non-overlapped frequency spectrums $fe1_1$-$fe1_4$. For more elaboration, the digital electronic data in the data flow $D_{r1}$ output from the frequency-domain demultiplexer $234_1$ may be the digital electronic data in the data flow $D_{j1}$ at the frequency spectrum $fe1_1$, the digital electronic data in the data flow $D_{r2}$ output from the frequency-domain demultiplexer $234_1$ may be the digital electronic data in the data flow $D_{j1}$ at the frequency spectrum $fe1_2$, the digital electronic data in the data flow $D_{r3}$ output from the frequency-domain demultiplexer $234_1$ may be the digital electronic data in the data flow $D_{j1}$ at the frequency spectrum $fe1_3$, and the digital electronic data in the data flow $D_{r4}$ output from the frequency-domain demultiplexer $234_1$ may be the digital electronic data in the data flow $D_{j1}$ at the frequency spectrum $fe1_4$. Other situations can be considered in a similar way.

When the devices $224_1$-$224_{32}$ of the first output mapping unit 224 are the above-mentioned time-domain multiplexers, the devices $234_1$-$234_{32}$ of the second input mapping unit 234 in each of the user processors $222_1$-$222_{32}$ can be the above-mentioned time-domain demultiplexers. When the devices $224_1$-$224_{32}$ of the first output mapping unit 224 are the above-mentioned frequency-domain multiplexers, the devices $234_1$-$234_{32}$ of the second input mapping unit 234 in each of the user processors $222_1$-$222_{32}$ can be the above-mentioned frequency-domain demultiplexers. The 128 pieces of digital electronic data in the data flows $D_{r1}$-$D_{r128}$ are substantially equivalent to the 128 pieces of digital electronic data in the data flows $D_{g1}$-$D_{g128}$, respectively, that is, the data flows $D_{r1}$-$D_{r128}$ carry substantially the same information as the respective data flows $D_{g1}$-$D_{g128}$ carry.

Referring to FIG. 3C, the sub-controllers 250 of the user processors $222_1$-$222_{32}$ are controlled by the controller 220 of the central office processor 210 and can alter or control the mapping of the second input mapping units 234 of the user processors $222_1$-$222_{32}$, respectively. The mapping of the second input mapping unit 234 in each of the thirty-two user processor $222_1$-$222_{32}$ is correspondent to that of the first output mapping unit 224 in the central office processor 210, that is, the number of pieces of digital electronic data in the input data flows, e.g. $D_{g1}$-$D_{g4}$, that are mapped, by the first output mapping unit 224, to be combined into a specific piece of digital electronic data in the output data flow, e.g. $D_{v1}$, can be substantially the same as the number of pieces of digital electronic data in the output data flows, e.g. $D_{r1}$-$D_{r4}$, into which the digital electronic data in the input data flow, e.g. $D_{j1}$, substantially equivalent to the specific piece of digital electronic data in the output data flow, e.g. $D_{v1}$, from the first output mapping unit 224, are mapped, by the second input mapping unit 234 in each of the user processors $222_1$-$222_{32}$, to be allocated.

For instance, when the time-domain or frequency-domain multiplexer $224_1$ of the first output mapping unit 224, as illustrated in FIG. 3B, is mapped to combine the four pieces of digital electronic data in the data flows $D_{g1}$-$D_{g4}$ into the digital electronic data in the data flow $D_{v1}$ based on the four respective non-overlapped time slots $tb1_1$-$tb1_4$ or frequency spectrums $fb1_1$-$fb1_4$, the time-domain or frequency-domain multiplexer $234_1$ in each of the user processors $222_1$-$222_{32}$, complementary to the time-domain or frequency-domain demultiplexer $224_1$, as illustrated in FIG. 3C, can be mapped to allocate the input digital electronic data in the data flow $D_{j1}$ into the four pieces of digital electronic data in the data flows $D_{r1}$-$D_{r4}$, which are substantially equivalent to the four pieces of digital electronic data in the data flows $D_{g1}$-$D_{g4}$ respectively, based on the four respective non-overlapped time slots $te1_1$-$te1_4$ or frequency spectrums $fe1_1$-$fe1_4$. The time slots $tb1_1$-$tb1_4$ may have substantially the same time interval or period as the time slots $te1_1$-$te1_4$, respectively. For example, the time slot $te1_1$ may have substantially the same time interval or period as the time slot $tb1_1$. The time slot $te1_4$ may have substantially the same time interval or period as the time slot $tb1_4$. Alternatively, all of the time slots $te1_1$-$te1_4$ and $tb1_1$-$tb1_4$ may have substantially the same time interval or period. The frequency spectrums $fb1_1$-$fb1_4$ may have substantially the same frequency bandwidth as the frequency spectrums $fe1_1$-$fe1_4$, respectively. For example, the frequency spectrum $fe1_1$ may have substantially the same frequency bandwidth as the frequency spectrum $fb1_1$. The frequency spectrum $fe1_4$ may have substantially the same frequency bandwidth as the frequency spectrum $fb1_4$. Alternatively, all of the frequency spectrums $fe1_1$-$fe1_4$ and $fb1_1$-$fb1_4$ may have substantially the same frequency bandwidth.

Referring to FIG. 3C, the digital electronic data in the data flows $D_{r1}$-$D_{r128}$ can be transmitted in parallel to the first equalization processor 231 through, e.g., 128 parallel signal paths, 128 parallel wireless channels, or 128 parallel physical channels. The first equalization processor 231 can weight or multiply each of the 128 input signals, i.e. the digital electronic data in the data flows $D_{r1}$-$D_{r128}$, by a corresponding equalizing weight, which can refer to the illustration in FIG. 1B, so as to create 128 equalized signals, i.e. the digital electronic data in the data flows $D_{e1}$-$D_{e128}$, respectively. The first equalization processor 231 can compensate unbalanced amplitudes, unbalanced phases and/or unbalanced time-delays among the digital electronic data in the data flows $D_{r1}$-$D_{r128}$. The equalizing weights can be updated by the first optimizer 235 based on calculation of cost functions in accordance with a cost minimization algorithm, such as steepest descent method, as mentioned above. The first equalization processor 231 and first optimizer 235 can perform the above-mentioned equalizing and optimizing process, which can refer to the illustration in FIG. 1B.

Referring to FIG. 3C, upon receiving the digital electronic data in the data flows $D_{e1}$-$D_{e128}$, the first wave-front demultiplexer 232 performs the above wave-front demultiplexing transformation, which can refer to the illustration in FIGS. 1A-1D, to process the equalized signals, i.e. the digital electronic data in the data flows $D_{e1}$-$D_{e128}$, into multiple linear combinations, each combining all of the 128 equalized signals, i.e. the digital electronic data in the data flows $D_{e1}$-$D_{e128}$, multiplied by 128 respective weightings, represented by the digital electronic data in the respective data flows $D_{i1}$-$D_{i128}$ output in parallel from the first wave-front demultiplexer 232 to the second output mapping unit 240. The 128 pieces of digital electronic data in the data flows $D_{i1}$-$D_{i128}$ are substantially equivalent to the 128 pieces of digital electronic data in the data flows $D_{f1}$-$D_{f128}$, respectively, that is, the data flows $D_{i1}$-$D_{i128}$ carry substantially the same information as the respective data flows $D_{f1}$-$D_{f128}$ carry.

Referring to FIG. 3C, the second output mapping unit 240 is arranged for dynamically mapping the digital electronic data in the data flows $D_{i1}$-$D_{i128}$ and can be implemented digitally in software programming in a microprocessor, programmable application-specific integrated circuit (ASIC), and/or field-programmable gate array (FPGA). The second output mapping unit 240 can perform time-domain multiplexing (TDM), frequency-division/domain multiplexing (FDM) or combinations of FDM/TDM techniques, to map the digital electronic data in the data flows $D_{i1}$-$D_{i128}$. In this embodiment, the second output mapping unit 240 may include thirty-three time-domain multiplexers (TDM) $240_1$-$240_{33}$ each combining the corresponding number of the received pieces of digital electronic data in the corresponding ones of the data flows $D_{i1}$-$D_{i128}$ into a piece of digital electronic data in corresponding one of the thirty-three data flows $D_{n1}$-$D_{n33}$ based on the corresponding number of respective non-overlapped time slots, which can refer to the above paragraphs in the section "Time-domain multiplexer (TDM)". For example, the time-domain multiplexer $240_1$ may combine the thirty-two received pieces of digital electronic data in the thirty-two data flows $D_{i1}$-$D_{i32}$ into a piece of digital electronic data in the data flow $D_{n1}$ based on thirty-two respective non-overlapped time slots $tf1_1$-$tf1_{32}$. For more elaboration, the digital electronic data in the data flow $D_{n1}$ output from the time-domain multiplexer $240_1$ at the time slot $tf1_1$ may be the digital electronic data in the data flow $D_{i1}$. The digital electronic data in the data flow $D_{n1}$ output from the time-domain multiplexer $240_1$ at the time slot $tf1_2$ may be the digital electronic data in the data flow $D_{i2}$. The digital electronic data in the data flow $D_{n1}$ output from the time-domain multiplexer $240_1$ at the time slot $tf1_{32}$ may be the digital electronic data in the data flow $D_{i32}$. Other situations can be considered in a similar way.

Alternatively, the thirty-three time-domain multiplexers $240_1$-$240_{33}$ may be replaced with thirty-three respective frequency-domain multiplexers each combining the corresponding number of the received pieces of digital electronic data in the corresponding ones of the data flows $D_{i1}$-$D_{i128}$ into a piece of digital electronic data in corresponding one of the thirty-three data flows $D_{n1}$-$D_{n33}$ based on the corresponding number of respective non-overlapped frequency spectrums. For example, the frequency-domain multiplexer $240_1$ may combine the thirty-two received pieces of digital electronic data in the thirty-two data flows $D_{i1}$-$D_{i32}$ into a piece of digital electronic data in the data flow $D_{n1}$ based on thirty-two respective non-overlapped frequency spectrum $ff1_1$-$ff1_{32}$. For more elaboration, the digital electronic data in the data flow $D_{n1}$ output from the frequency-domain multiplexer $240_1$ at the frequency spectrum $ff1_1$ may be the digital electronic data in the data flow $D_{i1}$. The digital electronic data in the data flow $D_{n1}$ output from the frequency-domain multiplexer $240_1$ at the frequency spectrum $ff1_2$ may be the digital electronic data in the data flow $D_{i2}$. The digital electronic data in the data flow $D_{n1}$ output from the frequency-domain multiplexer $240_1$ at the frequency spectrum $ff1_{32}$ may be the digital electronic data in the data flow $D_{i32}$. Other situations can be considered in a similar way.

When the devices $218_1$-$218_{33}$ of the first input mapping unit 218 are the above-mentioned time-domain demultiplexers, the devices $240_1$-$240_{33}$ of the second output mapping unit 240 in each of the user processors $222_1$-$222_{32}$ can be the above-mentioned time-domain multiplexers. When the devices $218_1$-$218_{33}$ of the first input mapping unit 218 are the above-mentioned frequency-domain demultiplexers, the devices $240_1$-$240_{33}$ of the second output mapping unit 240 in each of the user processors $222_1$-$222_{32}$ can be the above-mentioned frequency-domain multiplexers.

Thereby, the digital electronic data in the data flows $D_{n1}$-$D_{n33}$ output from the second output mapping unit 240 can be substantially equivalent to the digital electronic data in the data flows $D_{a1}$-$D_{a32}$ and $X_Z$ injected to the first input mapping unit 218, respectively, that is, the data flows $D_{n1}$-$D_{n33}$ carry substantially the same information as the respective data flows $D_{a1}$-$D_{a32}$ and $X_Z$ carry.

Referring to FIG. 3C, in the equalizing and optimizing process, one (F1) of the cost functions may observe the change between the known diagnostic data, which is carried by the diagnostic or pilot signal $X_Z$, and the digital electronic data in the data flow $D_{n33}$ received by the first optimizer 235. Others (F2) of the cost functions may be based on observations among the signals $D_{n1}$-$D_{n33}$. More specifically, the cost functions (F2) may be related to cross-correlation between each two of the signals $D_{n1}$-$D_{n33}$ received by the first optimizer 235. In the equalizing and optimizing process, the first optimizer 235 is configured to calculate a total cost based on the sum of all of the cost functions (F1) and (F2) and then compare the total cost with a predetermined cost threshold. When the total cost is verified to be greater than the predetermined cost threshold, the first optimizer 235 is configured to calculate a variation in the total cost in response to perturbations on the equalizing weights buffered in the first equalization processor 231 or to measure each gradient of the total cost with respect to the equalizing weights buffered in the first equalization processor 231. Based on the calculated variation or measured gradients, the first optimizer 235 creates updated equalizing weights, based on a cost minimization algorithm, such as steepest descent method, to be sent to the first equalization processor 231 and to replace current ones buffered in the first equalization processor 231 in the next scheduled clock cycle. Thereby, the equalizing weights buffered in the first equalization processor 231 can be updated. The first optimizer 235 is configured to stop the equalizing and optimizing process when the total cost is verified to be less than the predetermined cost threshold.

Referring to FIG. 3C, the filter 244 can filter one of the thirty-two pieces of digital electronic data in the respective data flows $D_{n1}$-$D_{n32}$. For example, the filter 244 of the user processor 222$_1$ can filter the digital electronic data in the data flow $D_{n1}$. The filter 244 of the user processor 222$_2$ can filter the digital electronic data in the data flow $D_{n2}$. The filter 244 of the user processor 222$_{31}$ can filter the digital electronic data in the data flow $D_{n31}$. The filter 244 of the user processor 222$_{32}$ can filter the digital electronic data in the data flow $D_{n32}$.

Referring to FIG. 3C, the sub-controllers 250 of the user processors 222$_1$-222$_{32}$ are controlled by the controller 220 of the central office processor 210 and can alter or control the mapping of the second output mapping units 240 of the user processors 222$_1$-222$_{32}$, respectively. The mapping of the second output mapping unit 240 in each of the thirty-two user processor 222$_1$-222$_{32}$ is correspondent to that of the first input mapping unit 218 in the central office processor 210, that is, the number of specific pieces of digital electronic data in the output data flows, e.g. $D_{f1}$-$D_{f32}$, into which the digital electronic data in the input data flow, e.g. $D_{a1}$ are mapped, by the first input mapping unit 218, to be allocated, can be the same as the number of pieces of digital electronic data in the input data flows, e.g. $D_{i1}$-$D_{i32}$, substantially equivalent to the specific pieces of digital electronic data in the respective output data flows, e.g. $D_{f1}$-$D_{f32}$ from the first input mapping unit 218, that are mapped, by the second output mapping unit 240 in each of the user processors 222$_1$-222$_{32}$, to be combined into a piece of digital electronic data in the output data flow, e.g. $D_{n1}$.

For instance, when the time-domain or frequency-domain demultiplexer 218$_1$ of the first input mapping unit 218, as illustrated in FIG. 3B, is mapped to allocate the input digital electronic data in the data flow $D_{a1}$ into the thirty-two pieces of digital electronic data in the data flows $D_{f1}$-$D_{f32}$ based on the thirty-two respective non-overlapped time slots $ta1_1$-$ta1_{32}$ or frequency spectrums $fa1_1$-$fa1_{32}$, the time-domain or frequency-domain multiplexer 240$_1$ in each of the user processors 222$_1$-222$_{32}$, complementary to the time-domain or frequency-domain demultiplexer 218$_1$, as illustrated in FIG. 3C, can be mapped to combine the thirty-two pieces of digital electronic data in the data flows $D_{i1}$-$D_{i32}$, which are substantially equivalent to the thirty-two pieces of digital electronic data in the data flows $D_{f1}$-$D_{f32}$ respectively, into the digital electronic data in the data flow $D_{n1}$ based on the thirty-two respective non-overlapped time slots $tf1_1$-$tf1_{32}$ or frequency spectrums $ff1_1$-$ff1_{32}$. The time slots $ta1_1$-$ta1_{32}$ may have substantially the same time interval or period as the time slots $tf1_1$-$tf1_{32}$, respectively. For example, the time slot $tf1_1$ may have substantially the same time interval or period as the time slot $ta1_1$. The time slot $tf1_{32}$ may have substantially the same time interval or period as the time slot $ta1_{32}$. Alternatively, all of the time slots $tf1_1 tf1_{32}$ and $ta1_1$-$ta1_{32}$ may have substantially the same time interval or period. The frequency spectrums $fa1_1$-$fa1_{32}$ may have substantially the same frequency bandwidth as the frequency spectrums $ff1_1$-$ff1_{32}$, respectively. For example, the frequency spectrum $ff1_1$ may have substantially the same frequency bandwidth as the frequency spectrum $fa1_1$. The frequency spectrum $ff1_{32}$ may have substantially the same frequency bandwidth as the frequency spectrum $fa1_{32}$. Alternatively, all of the frequency spectrums $ff1_1$-$ff1_{32}$ and $fa1_1$-$fa1_{32}$ may have substantially the same frequency bandwidth.

For instance, when the time-domain or frequency-domain demultiplexer 218$_2$ of the first input mapping unit 218, as illustrated in FIG. 3B, is mapped to allocate the input digital electronic data in the data flow $D_{a2}$ into the sixteen pieces of digital electronic data in the data flows $D_{f33}$-$D_{f48}$ based on the sixteen respective non-overlapped time slots $ta2_1$-$ta2_{16}$ or frequency spectrums $fa2_1$-$fa2_{16}$, the time-domain or frequency-domain multiplexer 240$_2$ in each of the user processors 222$_1$-222$_{32}$, complementary to the time-domain or frequency-domain demultiplexer 218$_2$, as illustrated in FIG. 3C, can be mapped to combine the sixteen pieces of digital electronic data in the data flows $D_{i33}$-$D_{i48}$, which are substantially equivalent to the sixteen pieces of digital electronic data in the data flows $D_{f33}$-$D_{f48}$ respectively, into the digital electronic data in the data flow $D_{n2}$ based on the sixteen respective non-overlapped time slots $tf2_1$-$tf2_{16}$ or frequency spectrums $ff2_1$-$ff2_{16}$. The time slots $ta2_1$-$ta2_{16}$ may have substantially the same time interval or period as the time slots $tf2_1$-$tf2_{16}$, respectively. For example, the time slot $tf2_1$ may have substantially the same time interval or period as the time slot $ta2_1$. The time slot $tf2_{16}$ may have substantially the same time interval or period as the time slot $ta2_{16}$. Alternatively, all of the time slots $tf2_1$-$tf2_{16}$ and $ta2_1$-$ta2_{16}$ may have substantially the same time interval or period. The frequency spectrums $fa2_1$-$fa2_{16}$ may have substantially the same frequency bandwidth as the frequency spectrums $ff2_1$-$ff2_{16}$, respectively. For example, the frequency spectrum $ff2_1$ may have substantially the same frequency bandwidth as the frequency spectrum $fa2_1$. The frequency spectrum $ff2_{16}$ may have substantially the same frequency bandwidth as the frequency spectrum $fa2_{16}$. Alternatively, all of the frequency spectrums $ff2_1$-$ff2_{16}$ and $fa2_1$-$fa2_{16}$ may have substantially the same frequency bandwidth.

For instance, when the time-domain or frequency-domain demultiplexer 218$_{33}$ of the first input mapping unit 218, as illustrated in FIG. 3B, is mapped to allocate the input digital electronic data in the data flow $X_Z$ into the two pieces of digital electronic data in the data flows $D_{f127}$ and $D_{f128}$ based on the two respective non-overlapped time slots $ta33_1$ and $ta33_2$ or frequency spectrums $fa33_1$ and $fa33_2$, the time-domain or frequency-domain multiplexer 240$_{33}$ in each of the user processors 222$_1$-222$_{32}$, complementary to the time-domain demultiplexer 218$_{33}$, as illustrated in FIG. 3C, can be mapped to combine the two pieces of digital electronic data in the data flows $D_{f127}$ and $D_{f128}$, which are substantially equivalent to the two pieces of digital electronic data in the data flows $D_{f127}$ and $D_{f128}$ respectively, into the digital electronic data in the data flow $D_{n33}$ based on the two respective non-overlapped time slots $tf33_1$ and $tf33_2$ or frequency spectrums $ff33_1$ and $ff33_2$. The time slots $ta33_1$ and $ta33_2$ may have substantially the same time interval or period as the time slots $tf32_1$ and $tf32_2$, respectively. For example, the time slot $tf33_1$ may have substantially the same time interval or period as the time slot $ta33_1$ and the time slot $tf33_2$ may have substantially the same time interval or period as the time slot $ta33_2$. Alternatively, all of the time slots $tf33_1$, $tf33_2$, $ta33_1$ and $ta33_2$ may have substantially the same time interval or period. The frequency spectrums $fa33_1$ and $fa33_2$ may have substantially the same frequency bandwidth as the frequency spectrums $ff33_1$ and $ff33_2$, respectively. For example, the frequency spectrum $ff33_1$ may have substantially the same frequency bandwidth as the frequency spectrum $fa33_1$. The frequency spectrum $ff33_2$ may have substantially the same frequency bandwidth as the frequency spectrum $ff33_2$. Alternatively, all of the frequency spectrums $ff33_1$, $ff33_2$, $fa33_1$ and $fa33_2$ may have substantially the same frequency bandwidth. Other situations can be considered in a similar way.

The controller 220 can dynamically and synchronously alter or control the input mapping of the central office processor 210 and the output mapping of the user processors $222_1$-$222_{32}$ such that the mapping of the first input mapping unit 218 can be correspondent to that of the second output mapping unit 240 in each of the thirty-two user processor $222_1$-$222_{32}$. Thereby, the digital electronic data in the data flows $D_{a1}$-$D_{a32}$ and $X_Z$ can efficiently share the resource or bandwidth of the passive optical network 200. The resource or bandwidth of the passive optical network 200 for the digital electronic data in the data flows $D_{a1}$-$D_{a32}$ and $X_Z$ can be dynamically controlled or altered.

In this embodiment, the first output mapping unit 224 of the central office processor 210, the time-domain or frequency-domain multiplexer 226 of the optical line terminal (OLT) 202, the optical laser device 228 of the optical line terminal (OLT) 202, the optical transferring device 204, the optical signal receiver 230 in one of the optical network units (ONU) $206_1$-$206_{32}$, the time-domain demultiplexer 238 in one of the optical network units (ONU) $206_1$-$206_{32}$ and the second input mapping unit 234 in one of the user processors $222_1$-$222_{32}$ compose the data relaying system 998 as illustrated in FIGS. 1A and 1B and are arranged in sequence between the wave-front multiplexer 213 and the wave-front demultiplexer 232.

Upstream Dataflow Via Passive Optical Network (PON):

FIGS. 4A-4D are schematic diagrams showing upstream dataflow performed by a passive optical network (PON) system in combination with wave-front multiplexing and demultiplexing techniques according to an embodiment of the present invention.

Figure 4A:
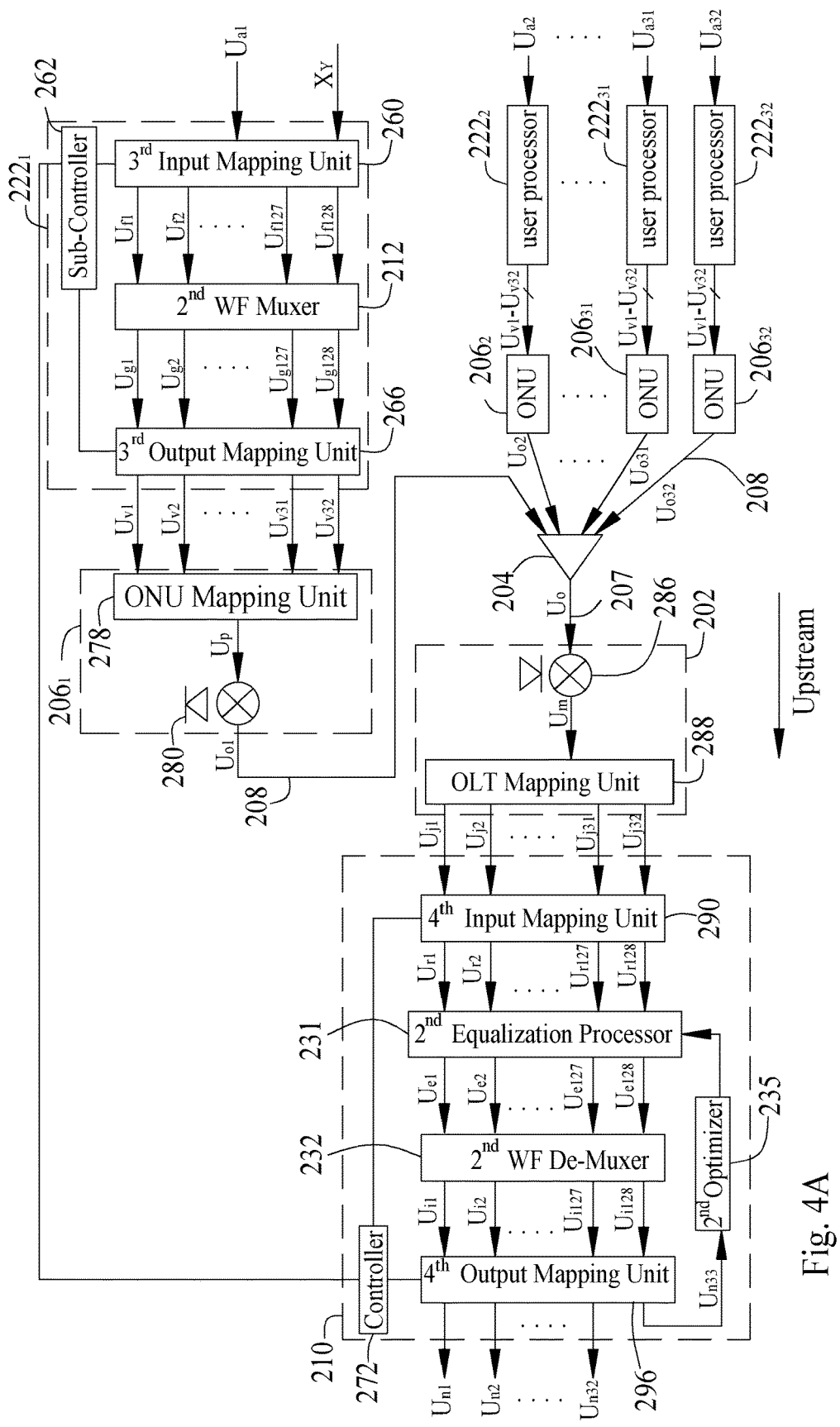
FIGS. 4A-4D show schematic diagrams of upstream data flows via a passive optical network PON system according to an embodiment of the present disclosure.
Figure 4B:
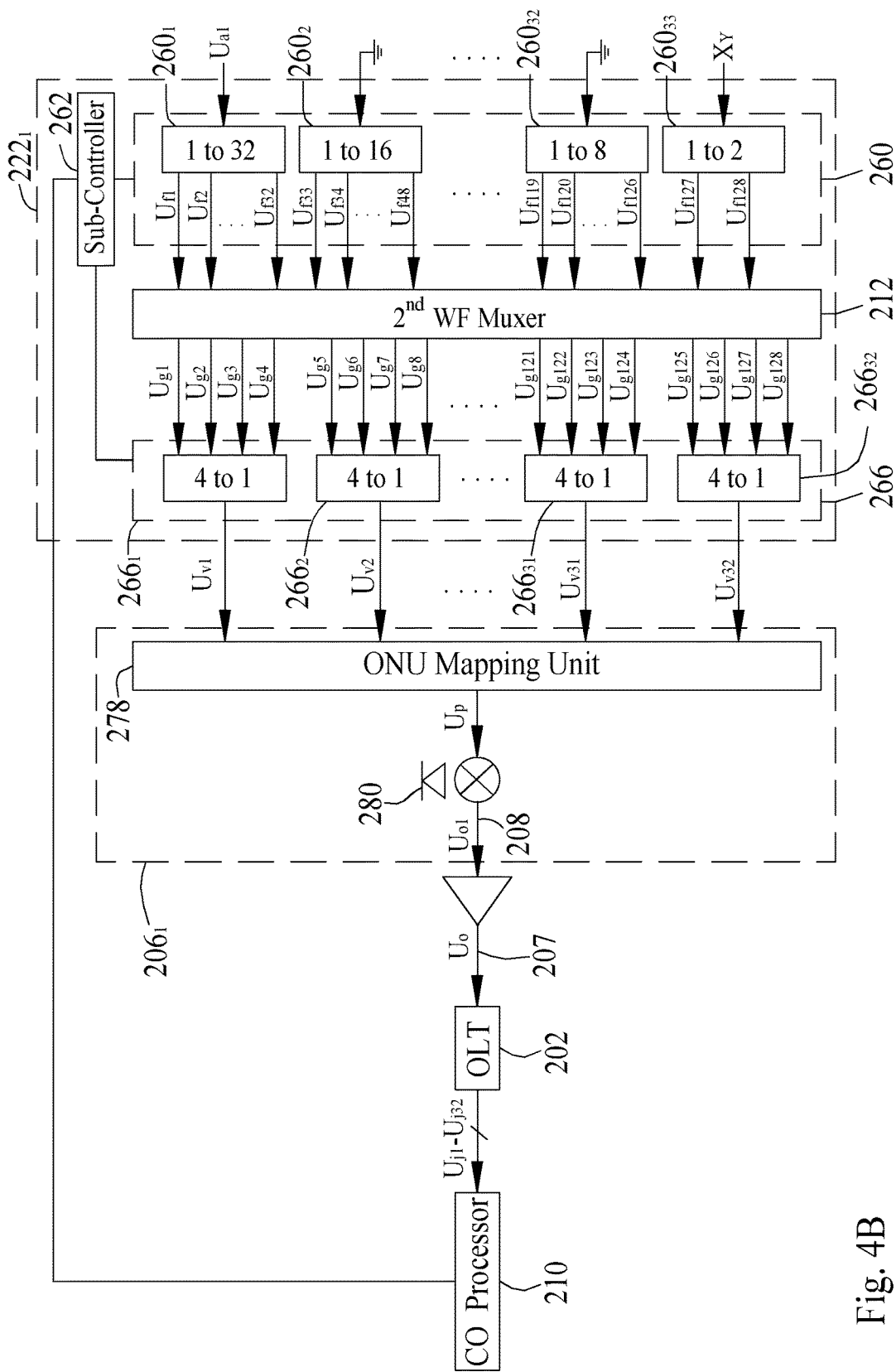
Figure 4C:
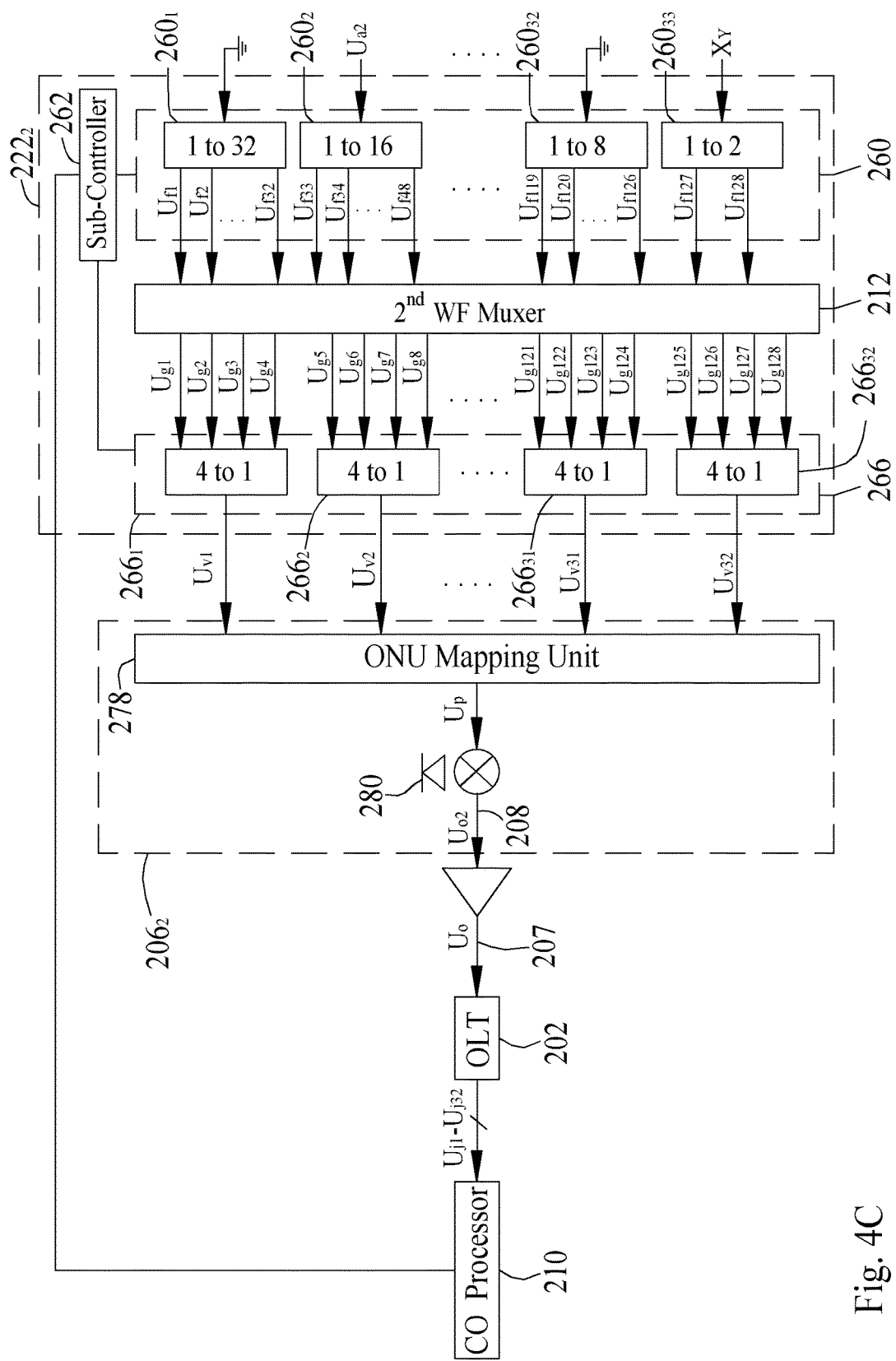

Referring to FIGS. 4A-4C, the user processors $222_1$-$222_{32}$ have the same architecture as one another and each further include a second wave-front multiplexer 212, which can refer to the wave-front multiplexer 212 as illustrated in FIGS. 1A and 1B, a third input mapping unit 260 at the upstream side of the wave-front multiplexer 212, a third output mapping unit 266 at the downstream side of the wave-front multiplexer 212 and a sub-controller 262 controlling the mapping of the third input mapping unit 260 and/or third output mapping unit 266. The user processors $222_1$-$222_{32}$ may receive digital electronic data in thirty-two data flows $U_{a1}$-$U_{a32}$, respectively. Further, each of the user processor $222_1$-$222_{32}$ may generate a pilot or diagnostic signal $X_Y$ to be transmitted to the corresponding third input mapping unit 260 in each of the user processor $222_1$-$222_{32}$. The pilot or diagnostic signal $X_Y$ may have a single frequency and fixed amplitude. Alternatively, the pilot or diagnostic signal $X_Y$ could change based on time or could be any signal known by the passive optical network (PON). In contrast, the extraneous signals $U_{a1}$-$U_{a32}$ are unknown by the passive optical network and input into the passive optical network from an extraneous system. Two of the thirty-two user processors $222_1$-$222_{32}$ are shown in detail in FIGS. 4A-4C.

Referring to FIG. 4A, the third input mapping unit 260 in each of the user processors $222_1$-$222_{32}$ is arranged for dynamically mapping digital electronic data in a corresponding one of the data flows $U_{a1}$-$U_{a32}$ and pilot or diagnostic data in the data flow $X_Y$. The third input mapping unit 260 can be implemented digitally in software programming in a microprocessor, programmable application-specific integrated circuit (ASIC), and/or field-programmable gate array (FPGA). The third input mapping unit 260 in each of the user processors $222_1$-$222_{32}$ can perform time-domain demultiplexing (TDDM), frequency-division/domain demultiplexing (FDDM) or combinations of FDDM/TDDM techniques, to map digital electronic data in a corresponding one of the data flows $U_{a1}$-$U_{a32}$ and the pilot or diagnostic data in the data flow $X_Y$.

The third input mapping units 260 of the user processors $222_1$-$222_{32}$ may have the same infrastructures as one another. In this embodiment, the third input mapping unit 260 may include thirty-three time-domain demultiplexers $260_1$-$260_{33}$ arranged in parallel. Each of the third input mapping units 260 of the user processors $222_1$-$222_{32}$ employs one of the thirty-three time-domain demultiplexers $260_1$-$260_{33}$ to perform time-domain demultiplexing to the received one piece of digital electronic data in the data flows $U_{a1}$-$U_{a32}$, which can refer to the above paragraphs in the section "Time-domain demultiplexer (TDDM)", but either two of the third input mapping units 260 of the user processors $222_1$-$222_{32}$ employs different ones of the thirty-three time-domain demultiplexers $260_1$-$260_{33}$ to perform time-domain demultiplexing to the different pieces of digital electronic data in data flows $U_{a1}$-$U_{a32}$.

For example, referring to FIG. 4B, with regards to the user processor $222_1$, the digital electronic data in the data stream $U_{a1}$ injected to the user processor $222_1$ can be allocated by the time-domain demultiplexer $260_1$ into thirty-two pieces of digital electronic data in the data flows $U_{f1}$-$U_{f32}$ based on thirty-two respective non-overlapped time slots $tg1_1$-$tg1_{32}$, the time-domain demultiplexers $260_2$-$260_{32}$ can be coupled to the ground, and the pilot and diagnostic data can be allocated by the time-domain demultiplexer $260_{33}$ into two pieces of digital electronic data in the data flows $U_{f127}$ and $U_{f128}$ based on two respective non-overlapped time slots $tg33_1$ and $tg33_2$. For more elaboration, the digital electronic data in the data flow $U_{f1}$ output from the time-domain demultiplexer $260_1$ may be the digital electronic data, in the data flow $U_{a1}$, arriving at the time-domain demultiplexer $260_1$ at the time slot $tg1_1$. The digital electronic data in the data flow $U_{f2}$ output from the time-domain demultiplexer $260_1$ may be the digital electronic data, in the data flow $U_{a1}$, arriving at the time-domain demultiplexer $260_1$ at the time slot $tg1_2$. Other situations can be considered in a similar way. However, the time-domain demultiplexers $260_1$ in the other user processors $222_2$-$222_{32}$, correspondent to the time-domain demultiplexer $260_1$ of the user processor $222_1$, are coupled to the ground.

For example, referring to FIG. 4C, with regards to the user processor $222_2$, the digital electronic data in the data stream $U_{a2}$ injected to the user processor $222_2$ can be allocated by the time-domain demultiplexer $260_2$ into sixteen pieces of digital electronic data in the data flows $U_{f33}$-$U_{f48}$ based on sixteen respective non-overlapped time slots $tg2_1$-$tg2_{16}$, the time-domain demultiplexers $260_1$ and $260_3$-$260_{32}$ can be coupled to the ground, and the pilot and diagnostic data can be allocated by the time-domain demultiplexer $260_{33}$ into two pieces of digital electronic data in the data flows $U_{f127}$ and $U_{f128}$ based on two respective non-overlapped time slots $tg33_1$ and $tg33_2$. For more elaboration, the digital electronic data in the data flow $U_{f33}$ output from the time-domain demultiplexer $260_2$ may be the digital electronic data, in the data flow $U_{a2}$, arriving at the time-domain demultiplexer $260_2$ at the time slot $tg2_1$. The digital electronic data in the data flow $U_{f34}$ output from the time-domain demultiplexer $260_2$ may be the digital electronic data, in the data flow $U_{a2}$, arriving at the time-domain demultiplexer $260_2$ at the time slot $tg2_2$. Other situations can be considered in a similar way. However, the time-domain demultiplexers $260_2$ in the other user processors $222_1$ and $222_3$-$222_{32}$, correspondent to the time-domain demultiplexer $260_2$ of the user processor $222_2$, are coupled to the ground.

Alternatively, the thirty-three time-domain demultiplexers $260_1$-$260_{33}$ in each of the user processors $222_1$-$222_{32}$ can be replaced with thirty-three frequency-domain demultiplexers performing frequency-domain demultiplexing to the received one piece of digital electronic data in the data flows $U_{a1}$-$U_{a32}$, but either two of the third input mapping units 260 of the user processors $222_1$-$222_{32}$ employs different ones of the thirty-three frequency-domain demultiplexers $260_1$-$260_{33}$ to perform frequency-domain demultiplexing to the different pieces of digital electronic data in data flows $U_{a1}$-$U_{a32}$.

For example, referring to FIG. 4B, with regards to the user processor $222_1$, the digital electronic data in the data stream $U_{a1}$ injected to the user processor $222_1$ can be allocated by the frequency-domain demultiplexer $260_1$ into thirty-two pieces of digital electronic data in the data flows $U_{f1}$-$U_{f32}$ based on thirty-two respective non-overlapped frequency spectrums $fg1_1$-$fg1_{32}$, the frequency-domain demultiplexers $260_2$-$260_{32}$ can be coupled to the ground, and the pilot and diagnostic data can be allocated by the frequency-domain demultiplexer $260_{33}$ into two pieces of digital electronic data in the data flows $U_{f127}$ and $U_{f128}$ based on two respective non-overlapped time slots $tg33_1$ and $tg33_2$. For more elaboration, the digital electronic data in the data flow $U_{f1}$ output from the frequency-domain demultiplexer $260_1$ may be the digital electronic data in the data flow $U_{a1}$ at the frequency spectrum $fg1_1$. The digital electronic data in the data flow $U_{f2}$ output from the frequency-domain demultiplexer $260_1$ may be the digital electronic data in the data flow $U_{a1}$ at the frequency spectrum $fg1_2$. Other situations can be considered in a similar way. However, the frequency-domain demultiplexers $260_1$ in the other user processors $222_2$-$222_{32}$, correspondent to the frequency-domain demultiplexer $260_1$ of the user processor $222_1$, are coupled to the ground.

For example, referring to FIG. 4C, with regards to the user processor $222_2$, the digital electronic data in the data stream $U_{a2}$ injected to the user processor $222_2$ can be allocated by the frequency-domain demultiplexer $260_2$ into sixteen pieces of digital electronic data in the data flows $U_{f33}$-$U_{f48}$ based on sixteen respective non-overlapped frequency spectrums $fg2_1$-$fg2_{16}$, the frequency-domain demultiplexers $260_1$ and $260_3$-$260_{32}$ can be coupled to the ground, and the pilot and diagnostic data can be allocated by the frequency-domain demultiplexer $260_{33}$ into two pieces of digital electronic data in the data flows $U_{f127}$ and $U_{f128}$ based on two respective non-overlapped frequency spectrums $fg33_1$ and $fg33_2$. For more elaboration, the digital electronic data in the data flow $U_{f33}$ output from the frequency-domain demultiplexer $260_2$ may be the digital electronic data in the data flow $U_{a2}$ at the frequency spectrum $fg2_1$. The digital electronic data in the data flow $U_{f34}$ output from the frequency-domain demultiplexer $260_2$ may be the digital electronic data in the data flow $U_{a2}$ at the frequency spectrum $fg2_2$. Other situations can be considered in a similar way. However, the frequency-domain demultiplexers $260_2$ in the other user processors $222_1$ and $222_3$-$222_{32}$, correspondent to the frequency-domain demultiplexer $260_2$ of the user processor $222_2$, are coupled to the ground.

Referring to FIGS. 4A-4C, with regards to each of the user processors $222_1$-$222_{32}$, the second wave-front multiplexer 212 performs the above wave-front multiplexing transform to process 128 input signals, carrying 128 respective pieces of digital electronic data in the respective data flows $U_{f1}$-$U_{f128}$, into 128 linear combinations in the respective data flows $U_{g1}$-$U_{g128}$, each combining all of the input signals multiplied by respective weightings, which can refer to the description illustrated in FIGS. 1A, 1B and 1C. In this case, the number of H is equal to 128. The first wave-front multiplexer 212 may include 128*128 computing units (CU) and 128 summing processors (SP). The computing units (CU) form a processor array with 128 rows and 128 columns. The 128 input digital signals $U_{f1}$-$U_{f128}$ can be received by the computing units (CU) in the respective 128 columns in the processor array. Upon receiving the input digital signals $U_{f1}$-$U_{f128}$, each of the computing units (CU) independently weights or multiplies its received signal by a weighting value, to generate a weighted signal. The 128 summing processors (SP) can output 128 digital signals $U_{g1}$-$U_{g128}$ each combining the weighted signals output from the computing units (CU) in a corresponding one of the 128 rows in the processor array.

With regards to each of the user processors $222_1$-$222_{32}$, the third output mapping unit 266 can receive digital electronic data in the data flows $U_{g1}$-$U_{g128}$ output from the first wave-front multiplexer 212, wherein the third output mapping unit 266 comprises thirty-two 4-to-1 time-domain multiplexers (TDM) $266_1$-$266_{32}$, each combining four received corresponding pieces of digital electronic data in respective four of the data flows $U_{g1}$-$U_{g128}$ into a piece of digital electronic data in corresponding one of the thirty-two data flows $U_{v1}$-$U_{v32}$ based on four respective non-overlapped time slots, which can refer to the above paragraphs in the section "Time-domain multiplexer (TDM)". For example, with regards to the user processor $222_1$, referring to FIG. 4B, the time-domain multiplexer $266_1$ may combine or integrate the four received pieces of digital electronic data in the respective four data flows $U_{g1}$-$U_{g4}$ into a piece of digital electronic data in the data flow $U_{v1}$ based on four respective non-overlapped time slots $th1_1$-$th1_4$. For more elaboration, the digital electronic data in the data flow $U_{v1}$ output from the time-domain multiplexer $266_1$ at the time slot $th1_1$ may be the digital electronic data in the data flow $U_{g1}$, the digital electronic data in the data flow $U_{v1}$ output from the time-domain multiplexer $266_1$ at the time slot $th1_2$ may be the digital electronic data in the data flow $U_{g2}$, the digital electronic data in the data flow $U_{v1}$ output from the time-domain multiplexer $266_1$ at the time slot $th1_3$ may be the digital electronic data in the data flow $U_{g3}$ and the digital electronic data in the data flow $U_{v1}$ output from the time-domain multiplexer $266_1$ at the time slot $th1_4$ may be the digital electronic data in the data flow $U_{g4}$. Other situations can be considered in a similar way.

For example, with regards to the user processor $222_2$, referring to FIG. 4C, the time-domain multiplexer $266_2$ may combine or integrate the four received pieces of digital electronic data in the respective four data flows $U_{g5}$-$U_{g8}$ into a piece of digital electronic data in the data flow $U_{v2}$ based on four respective non-overlapped time slots $th2_1$-$th2_4$. For more elaboration, the digital electronic data in the data flow $U_{v2}$ output from the time-domain multiplexer $266_2$ at the time slot $th2_1$ may be the digital electronic data in the data flow $U_{g5}$, the digital electronic data in the data flow $U_{v2}$ output from the time-domain multiplexer $266_2$ at the time slot $th2_2$ may be the digital electronic data in the data flow $U_{g6}$, the digital electronic data in the data flow $U_{v2}$ output from the time-domain multiplexer $266_2$ at the time slot $th2_3$ may be the digital electronic data in the data flow $U_{g7}$ and the digital electronic data in the data flow $U_{v2}$ output from the time-domain multiplexer $266_2$ at the time slot $th2_4$ may be the digital electronic data in the data flow $U_{g8}$. Other situations can be considered in a similar way.

Alternatively, the thirty-two 4-to-1 time-domain multiplexers $266_1$-$266_{32}$ can be replaced with thirty-two 4-to-1 frequency-domain multiplexers each combining four received corresponding pieces of digital electronic data in respective four of the data flows $U_{g1}$-$U_{g128}$ into a piece of digital electronic data in corresponding one of the thirty-two data flows $U_{v1}$-$U_{v32}$ based on four respective non-overlapped frequency spectrums. For example, with regards to the user processor $222_1$, referring to FIG. 4B, the frequency-domain multiplexer $266_1$ may combine or integrate the four received pieces of digital electronic data in the respective four data flows $U_{g1}$-$U_{g4}$ into a piece of digital electronic data in the data flow $U_{v1}$ based on four respective non-overlapped frequency spectrums $fh1_1$-$fh1_4$. For more elaboration, the digital electronic data in the data flow $U_{v1}$ output from the frequency-domain multiplexer $266_1$ at the frequency spectrum $fh1_1$ may be the digital electronic data in the data flow $U_{g1}$, the digital electronic data in the data flow $U_{v1}$ output from the frequency-domain multiplexer $266_1$ at the frequency spectrum $fh1_2$ may be the digital electronic data in the data flow $U_{g2}$, the digital electronic data in the data flow $U_{v1}$ output from the frequency-domain multiplexer $266_1$ at the frequency spectrum $fh1_3$ may be the digital electronic data in the data flow $U_{g3}$, and the digital electronic data in the data flow $U_{v1}$ output from the frequency-domain multiplexer $266_1$ at the frequency spectrum $fh1_4$ may be the digital electronic data in the data flow $U_{g4}$. Other situations can be considered in a similar way.

For example, with regards to the user processor $222_2$, referring to FIG. 4C, the frequency-domain multiplexer $266_2$ may combine or integrate the four received pieces of digital electronic data in the respective four data flows $U_{g5}$-$U_{g8}$ into a piece of digital electronic data in the data flow $U_{v2}$ based on four respective non-overlapped frequency spectrums $fh2_1$-$fh2_4$. For more elaboration, the digital electronic data in the data flow $U_{v2}$ output from the frequency-domain multiplexer $266_2$ at the frequency spectrum $fh2_1$ may be the digital electronic data in the data flow $U_{g5}$, the digital electronic data in the data flow $U_{v2}$ output from the frequency-domain multiplexer $266_2$ at the frequency spectrum $fh2_2$ may be the digital electronic data in the data flow $U_{g6}$, the digital electronic data in the data flow $U_{v2}$ output from the frequency-domain multiplexer $266_2$ at the frequency spectrum $fh2_3$ may be the digital electronic data in the data flow $U_{g7}$ and the digital electronic data in the data flow $U_{v2}$ output from the frequency-domain multiplexer $266_2$ at the frequency spectrum $fh2_4$ may be the digital electronic data in the data flow $U_{g8}$. Other situations can be considered in a similar way.

Referring to FIGS. 4A-4C, the optical network units (ONU) $206_1$-$206_{32}$ have the same architecture as one another and each include a time-domain multiplexer (TDM) 278 receiving digital electronic data in the data flows $U_{v1}$-$U_{v32}$ output from the third output mapping unit 206 of the corresponding one of the user processors $212_1$-$212_{32}$ and an optical laser device 280 at the downstream side of the time-domain multiplexer 278. Two of the thirty-two optical network units (ONU) $206_1$-$206_{32}$ are shown in detail in FIGS. 4A-4C. With regards to each of the optical network units (ONU) $206_1$-$206_{32}$, the time-domain multiplexer 278 may combine or integrate the thirty-two received pieces of digital electronic data in the respective thirty-two data flows $U_{v1}$-$U_{v32}$ into a piece of digital electronic data in the data flow $U_p$ based on thirty-two respective non-overlapped time slots $ti_1$-$ti_{32}$, which can refer to the above paragraphs in the section "Time-domain multiplexer (TDM)". For more elaboration, the digital electronic data in the data flow $U_p$ output from the time-domain multiplexer 278 at the time slot $ti_1$ may be the digital electronic data in the data flow $U_{v1}$. The digital electronic data in the data flow $U_p$ output from the time-domain multiplexer 278 at the time slot $ti_2$ may be the digital electronic data in the data flow $U_{v2}$. Other situations can be considered in a similar way.

Alternatively, the time-domain multiplexer 278 may be replaced with a time-domain multiplexer combining or integrating the thirty-two received pieces of digital electronic data in the respective thirty-two data flows $U_{v1}$-$U_{v32}$ into a piece of digital electronic data in the data flow $U_p$ based on thirty-two respective non-overlapped frequency spectrums $fi_1$-$fi_{32}$. For more elaboration, the digital electronic data in the data flow $U_p$ output from the frequency-domain multiplexer 278 at the frequency spectrum $fi_1$ may be the digital electronic data in the data flow $U_{v1}$. The digital electronic data in the data flow $U_p$ output from the frequency-domain multiplexer 278 at the frequency spectrum $f_{i2}$ may be the digital electronic data in the data flow $U_{v2}$. Other situations can be considered in a similar way.

Referring to FIGS. 4A-4C, with regards to each of the thirty-two optical network units (ONU) $206_1$-$206_{32}$, the optical laser device 280 can transform the electronic digital electronic data in the data flow $U_p$ into corresponding one of thirty-two optical signals $U_{o1}$-$U_{o32}$, wherein the thirty-two optical signals $D_{o1}$-$U_{o32}$ can be output from the optical laser devices 228 of the respective optical network units (ONU) $206_1$-$206_{32}$ to the optical transferring device 204 via the thirty-two respective optical fibers 208. In this embodiment, the optical transferring device 204 serves as an optical coupler. The optical signals $U_{o1}$-$U_{o32}$ can be combined into an optical signal $U_o$ by the optical transferring device $204_o$. The combined optical signals $U_o$ can be transmitted to the optical line terminal (OLT) 202 via the optical fiber 207.

The optical line terminal (OLT) 202 may further includes an optical signal receiver 286 receiving the optical signal $U_o$ and a time-domain demultiplexer (TDDM) 288 at downstream side of the optical signal receiver 286. The optical signal receiver 286 can transform the optical signals $U_o$ into electronic digital electronic data $U_m$ to be transmitted to the time-domain demultiplexer (TDDM) 288. The digital electronic data in the data flow $U_m$ is substantially equivalent to the combination of the digital electronic data in the data flows $U_p$ input to the optical laser devices 280 of all of the optical network units (ONU) $206_1$-$206_{32}$, that is the data flow $U_m$ carries substantially the same information as the combination of the digital electronic data in the data flows $U_p$ input to the optical laser devices 280 of all of the optical network units (ONU) $206_1$-$206_{32}$. The time-domain demultiplexer (TDDM) 288 can allocate the received electronic digital electronic data $U_m$ into thirty-two pieces of digital electronic data in thirty-two respective data flows $U_{j1}$-$U_{j32}$ based on thirty-two respective non-overlapped time slots $tj_1$-$tj_{32}$, which can refer to the above paragraphs in the section "Time-domain demultiplexer (TDDM)". For more elaboration, the digital electronic data in the data flow $U_{j1}$ output from the time-domain demultiplexer 288 may be the digital electronic data $U_m$ arriving at the time-domain demultiplexer 288 at the time slot $tj_1$, the digital electronic data in the data flow $U_{j2}$ output from the time-domain demultiplexer 288 may be the digital electronic data $U_m$ arriving at the time-domain demultiplexer 288 at the time slot $tj_2$. Other situations can be considered in a similar way.

Alternatively, the time-domain demultiplexer 288 may be replaced with a frequency-domain demultiplexer allocating the received electronic digital electronic data $U_m$ into thirty-two pieces of digital electronic data in thirty-two respective data flows $U_{j1}$-$U_{j32}$ based on thirty-two respective non-overlapped frequency spectrums $f_{j1}$-$f_{j32}$. For more elaboration, the digital electronic data in the data flow $U_{j1}$ output from the time-domain demultiplexer 288 may be the digital electronic data $U_m$ at the frequency spectrum $tj_1$. The digital electronic data in the data flow $U_{j2}$ output from the time-domain demultiplexer 288 may be the digital electronic data $U_m$ at the frequency spectrum $fj_2$. Other situations can be considered in a similar way.

Figure 4D:
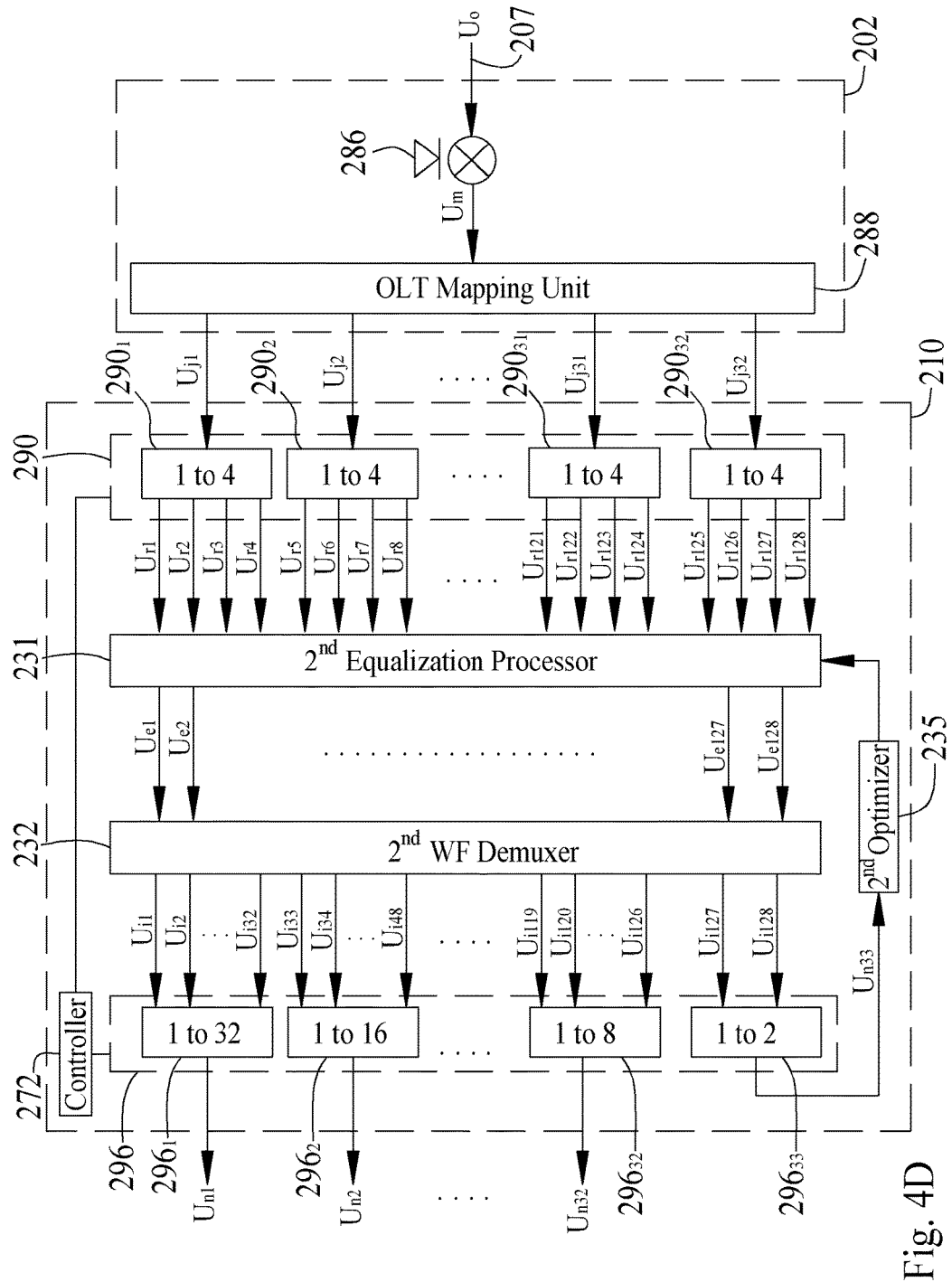

When the device 288 of the optical line terminal (OLT) 202 is the above-mentioned time-domain demultiplexer, the device 278 in each of the optical network units (ONU) $206_1$-$206_{32}$ can be the above-mentioned time-domain multiplexer. When the device 288 of the optical line terminal (OLT) 202 is the above-mentioned frequency-domain demultiplexer, the device 278 in each of the optical network units (ONU) $206_1$-$206_{32}$ can be the above-mentioned frequency-domain multiplexer. The thirty-two pieces of digital electronic data in the data flows $U_{j1}$-$U_{j32}$ are substantially equivalent to the combination of the digital electronic data in the respective data flows $U_{v1}$-$U_{v32}$ output from all of the user processors $222_1$-$222_{32}$, that is, the data flows $U_{j1}$-$U_{j32}$ carry substantially the same information as the combination of the digital electronic data in the respective data flows $U_{v1}$-$U_{v32}$ output from all of the user processors $222_1$-$222_{32}$. For example, the digital electronic data in the data flows $U_{j1}$ is substantially equivalent to the combination of the digital electronic data in the data flows $U_{v1}$ output from all of the user processors $222_1$-$222_{32}$, that is, the data flows $U_{j1}$ carry substantially the same information as the combination of the digital electronic data in the data flows $U_{v1}$ output from all of the user processors $222_1$-$222_{32}$. Referring to FIGS. 4A and 4D, the central office processor 210 includes a fourth input mapping unit 290 at a downstream side of the optical line terminal (OLT) 202, a second equalization processor 231 at a downstream side of the fourth input mapping unit 231, a second wave-front demultiplexer 232 at a downstream side of the second equalization processor 231, a fourth output mapping unit 296 at a downstream side of the second wave-front demultiplexer 232, a second optimizer 235 arranged between outputs of the fourth output mapping unit 296 and the second equalization processor 231 and a controller 272 configured to control or alter the mapping of the fourth output mapping unit 296 and third input mapping unit 260 and/or the mapping of the third output mapping unit 266 and fourth input mapping unit 290.

Referring to FIG. 4D, the fourth input mapping unit 290 can receive digital electronic data in the data flows $U_{j1}$-$U_{j32}$ output from the optical line terminal (OLT) 202, wherein the fourth input mapping unit 290 comprises thirty-two 1-to-4 time-domain demultiplexers (TDDM) $290_1$-$290_{32}$, each allocating digital electronic data in a corresponding received one of the data flows $U_{j1}$-$U_{j32}$ into four pieces of digital electronic data in corresponding four of 128 data flows $U_{r1}$-$Ur_{128}$ based on four respective non-overlapped time slots, which can refer to the above paragraphs in the section "Time-domain demultiplexer (TDDM)". For example, the time-domain demultiplexer $290_1$ may allocate the received digital electronic data in the data flow $U_{j1}$ into four pieces of digital electronic data in the four respective data flows $U_{r1}$-$U_{r4}$ based on four respective non-overlapped time slots $tk1_1$-$tk1_4$. For more elaboration, the digital electronic data in the data flow $U_{r1}$ output from the time-domain demultiplexer $290_1$ may be the digital electronic data, in the data flow $U_{j1}$, arriving at the time-domain demultiplexer $290_1$ at the time slot $tk1_1$, the digital electronic data in the data flow $U_{r2}$ output from the time-domain demultiplexer $290_1$ may be the digital electronic data, in the data flow $U_{j1}$, arriving at the time-domain demultiplexer $290_1$ at the time slot $tk1_2$, the digital electronic data in the data flow $U_{r3}$ output from the time-domain demultiplexer $290_1$ may be the digital electronic data, in the data flow $U_{j1}$, arriving at the time-domain demultiplexer $290_1$ at the time slot $tk1_3$, and the digital electronic data in the data flow $U_{r4}$ output from the time-domain demultiplexer $290_1$ may be the digital electronic data, in the data flow $U_{j1}$, arriving at the time-domain demultiplexer $290_1$ at the time slot $tk1_4$. Other situations can be considered in a similar way.

Alternatively, the thirty-two 1-to-4 time-domain demultiplexer (TDDM) $290_1$-$290_{32}$ may be replaced with thirty-two respective 1-to-4 frequency-domain demultiplexer each allocating digital electronic data in a corresponding received one of the data flows $U_{j1}$-$U_{j32}$ into four pieces of digital electronic data in corresponding four of 128 data flows $U_{r1}$-$Ur_{128}$ based on four respective non-overlapped frequency spectrums. For example, the frequency-domain demultiplexer $290_1$ may allocate the received digital electronic data in the data flow $U_{j1}$ into four pieces of digital electronic data in the four respective data flows $U_{r1}$-$U_{r4}$ based on four respective non-overlapped frequency spectrums $fk1_1$-$fk1_4$. For more elaboration, the digital electronic data in the data flow $U_{r1}$ output from the frequency-domain demultiplexer $290_1$ may be the digital electronic data in the data flow $U_{j1}$ at the frequency spectrum $fk1_1$, the digital electronic data in the data flow $U_{r2}$ output from the frequency-domain demultiplexer $290_1$ may be the digital electronic data in the data flow $U_{j1}$ at the frequency spectrum $fk1_2$, the digital electronic data in the data flow $U_{r3}$ output from the frequency-domain demultiplexer $290_1$ may be the digital electronic data in the data flow $U_{j1}$ at the frequency spectrum $fk1_3$, and the digital electronic data in the data flow $U_{r4}$ output from the frequency-domain demultiplexer $290_1$ may be the digital electronic data in the data flow $U_{j1}$ at the frequency spectrum $fk1_4$. Other situations can be considered in a similar way.

When the devices $290_1$-$290_{32}$ of the fourth input mapping unit 290 are the above-mentioned time-domain demultiplexers, the devices $266_1$-$266_{32}$ of the third output mapping unit 266 in each of the user processors $222_1$-$222_{32}$ can be the above-mentioned time-domain multiplexers. When the devices $290_1$-$290_{32}$ of the fourth input mapping unit 290 are the above-mentioned frequency-domain demultiplexers, the devices $266_1$-$266_{32}$ of the third output mapping unit 266 in each of the user processors $222_1$-$222_{32}$ can be the above-mentioned frequency-domain multiplexers. The 128 pieces of digital electronic data in the data flows $U_{r1}$-$U_{r128}$ are substantially equivalent to the combination of the digital electronic data in the respective data flows $U_{g1}$-$U_{g128}$ input to the third input mapping units 266 in all of the user processors $222_1$-$222_{32}$, that is, the data flows $U_{r1}$-$U_{r128}$ carry substantially the same information as the combination of the digital electronic data in the respective data flows $U_{g1}$-$U_{g128}$ input to the third input mapping units 266 in all of the user processors $222_1$-$222_{32}$. For example, the digital electronic data in the data flows $U_{r1}$ is substantially equivalent to the combination of the digital electronic data in the data flows $U_{g1}$ input to the third input mapping units 266 in all of the user processors $222_1$-$222_{32}$, that is, the data flows $U_{r1}$ carry substantially the same information as the combination of the digital electronic data in the data flows $U_{g1}$ input to the third input mapping units 266 in all of the user processors $222_1$-$222_{32}$.

Referring to FIG. 4C, the controller 272 of the central office processor 210 can control the sub-controllers 262 in all of the user processors $222_1$-$222_{32}$ and can alter or control the mapping of the fourth input mapping unit 290 of the central office processor 210. The mapping of the fourth input mapping unit 290 in the central office processor 210 is correspondent to that of the third output mapping unit 266 in each of the user processors $222_1$-$222_{32}$, that is, the number of pieces of digital electronic data in the input data flows, e.g. $U_{g1}$-$U_{g4}$, that are mapped, by the third output mapping unit 266 in each of the user processors $222_1$-$222_{32}$, to be combined into a specific piece of digital electronic data in the output data flow, e.g. $U_{v1}$, can be substantially the same as the number of pieces of digital electronic data in the output data flows, e.g. $U_{r1}$-$U_{r4}$, into which the digital electronic data in the input data flow, e.g. $U_{j1}$, substantially equivalent to the combination of the specific pieces of digital electronic data in the output data flow, e.g. $U_{v1}$, from the third output mapping unit 266, are mapped, by the fourth input mapping unit 290, to be allocated.

For instance, when the time-domain or frequency-domain multiplexer $266_1$ of the third output mapping unit 266 in each of the user processors $222_1$-$222_{32}$, as illustrated in FIGS. 4B and 4C, is mapped to combine the four pieces of digital electronic data in the data flows $U_{g1}$-$U_{g4}$ into the digital electronic data in the data flow $U_{v1}$ based on the four respective non-overlapped time slots $th1_1$-$th1_4$ or frequency spectrums $fh1_1$-$fh1_4$, the time-domain or frequency-domain multiplexer $290_1$ in the central office processor 210, complementary to the time-domain or frequency-domain demultiplexer $266_1$ in each of the user processors $222_1$-$222_{32}$, as illustrated in FIG. 4D, can be mapped to allocate the input digital electronic data in the data flow $U_{j1}$ into the four pieces of digital electronic data in the data flows $U_{r1}$-$U_{r4}$, which are substantially equivalent to the combination of the four respective pieces of digital electronic data in the respective data flows $U_{g1}$-$U_{g4}$ input to the third output mapping units 266 in the user processors $222_1$-$222_{32}$, based on the four respective non-overlapped time slots $tk1_1$-$tk1_4$ or frequency spectrums $fk1_1$-$fk1_4$. The time slots $th1_1$-$th1_4$ may have substantially the same time interval or period as the time slots $tk1_1$-$tk1_4$, respectively. For example, the time slot $tk1_1$ may have substantially the same time interval or period as the time slot $th1_1$. The time slot $tk1_4$ may have substantially the same time interval or period as the time slot $th1_4$. Alternatively, all of the time slots $tk1_1$-$tk1_4$ and $th1_1$-$th1_4$ may have substantially the same time interval or period. The frequency spectrums $fh1_1$-$fh1_4$ may have substantially the same frequency bandwidth as the frequency spectrums $fk1_1$-$fk1_4$, respectively. For example, the frequency spectrum $fk1_1$ may have substantially the same frequency bandwidth as the frequency spectrum $fh1_1$. The frequency spectrum $fk1_4$ may have substantially the same frequency bandwidth as the frequency spectrum $fh1_4$. Alternatively, all of the frequency spectrums $fk1_1$-$fk1_4$ and $fh1_1$-$fh1_4$ may have substantially the same frequency bandwidth.

Referring to FIG. 4D, the digital electronic data in the data flows $U_{r1}$-$U_{r128}$ can be transmitted in parallel to the second equalization processor 231 through, e.g., 128 parallel signal paths, 128 parallel wireless channels, or 128 parallel physical channels. The second equalization processor 231 can weight or multiply each of the 128 input signals, i.e. the digital electronic data in the data flows $U_{r1}$-$U_{r128}$, by a corresponding equalizing weight, which can refer to the illustration in FIG. 1B, so as to create 128 equalized signals, i.e. the digital electronic data in the data flows $U_{e1}$-$U_{e128}$, respectively. The second equalization processor 231 can compensate unbalanced amplitudes, unbalanced phases and/or unbalanced time-delays among the digital electronic data in the data flows $U_{r1}$-$U_{r128}$. The equalizing weights can be updated by the second optimizer 235 based on calculation of cost functions in accordance with a cost minimization algorithm, such as steepest descent method, as mentioned above. The second equalization processor 231 and second optimizer 235 can perform the above-mentioned equalizing and optimizing process, which can refer to the illustration in FIG. 1B.

Referring to FIG. 4D, upon receiving the digital electronic data in the data flows $U_{e1}$-$U_{e128}$, the second wave-front demultiplexer 232 performs the above wave-front demultiplexing transformation, which can refer to the illustration in FIGS. 1A-1D, to process the equalized signals, i.e. the digital electronic data in the data flows $U_{e1}$-$U_{e128}$, into multiple linear combinations, each combining all of the 128 equalized signals, i.e. the digital electronic data in the data flows $U_{e1}$-$U_{e128}$, multiplied by 128 respective weightings, represented by the digital electronic data in the respective data flows $U_{i1}$-$U_{i128}$ output in parallel from the second wave-front demultiplexer 232 to the fourth output mapping unit 296. The 128 pieces of digital electronic data in the data flows $U_{i1}$-$U_{i128}$ are substantially equivalent to the 128 pieces of digital electronic data in the respective data flows $U_{f1}$-$U_{f128}$ associated with the thirty-two pieces of digital electronic data in the data flows $U_{a1}$-$U_{a32}$ received by the thirty-two respective user processors $232_1$-$232_{32}$. For example, the thirty-two pieces of digital electronic data in the data flows $U_{i1}$-$U_{i32}$ are substantially equivalent to the thirty-two pieces of digital electronic data in the respective data flows $U_{f1}$-$U_{f32}$ associated with the digital electronic data in the data flow $U_{a1}$ received by the user processor $232_1$. The thirty-two pieces of digital electronic data in the data flows $U_{i1}$-$U_{i32}$ are substantially equivalent to the thirty-two pieces of digital electronic data in the respective data flows $U_{f1}$-$U_{f32}$ associated with the digital electronic data in the data flow $U_{a1}$ received by the user processor $232_1$ as seen in FIG. 4B. The sixteen pieces of digital electronic data in the data flows $U_{i33}$-$U_{i48}$ are substantially equivalent to the sixteen pieces of digital electronic data in the respective data flows $U_{f33}$-$U_{f48}$ associated with the digital electronic data in the data flow $U_{a2}$ received by the user processor 2322 as seen in FIG. 4C. Other situations can be considered in a similar way. The 128 pieces of digital electronic data in the data flows $U_{i1}$-$U_{i28}$ are substantially equivalent to the combination of the digital electronic data in the respective data flows $U_{f1}$-$U_{f128}$ input to the second wave-front multiplexers 212 in all of the user processors $222_1$-$222_{32}$, that is, the data flows $U_{i1}$-$U_{i128}$ carry substantially the same information as the combination of the digital electronic data in the respective data flows $U_{f1}$-$U_{f128}$ input to the second wave-front multiplexers 212 in all of the user processors $222_1$-$222_{32}$. For example, the digital electronic data in the data flows $U_{i1}$ is substantially equivalent to the combination of the digital electronic data in the data flows $U_{f1}$ input to the second wave-front multiplexers 212 in all of the user processors $222_1$-$222_{32}$, that is, the data flows $U_{i1}$ carry substantially the same information as the combination of the digital electronic data in the data flows $U_{f1}$ input to the second wave-front multiplexers 212 in all of the user processors $222_1$-$222_{32}$.

Referring to FIG. 4D, the fourth output mapping unit 296 is arranged for dynamically mapping the digital electronic data in the data flows $U_{i1}$-$U_{i128}$ and can be implemented digitally in software programming in a microprocessor, programmable application-specific integrated circuit (ASIC), and/or field-programmable gate array (FPGA). The fourth output mapping unit 296 can perform time-domain multiplexing (TDM), frequency-division/domain multiplexing (FDM), or combinations of FDM/TDM techniques, to map the digital electronic data in the data flows $U_{i1}$-$U_{i128}$. In this embodiment, the fourth output mapping unit 296 may include thirty-three time-domain multiplexers (TDM) $296_1$-$296_{33}$ each combining the corresponding number of the received pieces of digital electronic data in the corresponding ones of the data flows $U_{i1}$-$U_{i128}$ into a piece of digital electronic data in corresponding one of the thirty-three data flows $U_{n1}$-$U_{n33}$ based on the corresponding number of respective non-overlapped time slots, which can refer to the above paragraphs in the section "Time-domain multiplexer (TDM)". For example, the time-domain multiplexer $296_1$ may combine the thirty-two received pieces of digital electronic data in the thirty-two data flows $D_{i1}$-$D_{i32}$ into a piece of digital electronic data in the data flow $D_{n1}$ based on thirty-two respective non-overlapped time slots $tm1_1$-$tm1_{32}$. For more elaboration, the digital electronic data in the data flow $U_{n1}$ output from the time-domain multiplexer $296_1$ at the time slot $tm1_1$ may be the digital electronic data in the data flow $U_{i1}$. The digital electronic data in the data flow $U_{n1}$ output from the time-domain multiplexer $296_1$ at the time slot $tm1_2$ may be the digital electronic data in the data flow $U_{i2}$. The digital electronic data in the data flow $U_{n1}$ output from the time-domain multiplexer $296_1$ at the time slot $tm1_{32}$ may be the digital electronic data in the data flow $U_{i32}$. Other situations can be considered in a similar way.

Alternatively, the thirty-three time-domain multiplexers $296_1$-$296_{33}$ can be replaced with thirty-three respective frequency-domain multiplexers each combining the corresponding number of the received pieces of digital electronic data in the corresponding ones of the data flows $U_{i1}$-$U_{i128}$ into a piece of digital electronic data in corresponding one of the thirty-three data flows $U_{n1}$-$U_{n33}$ based on the corresponding number of respective non-overlapped frequency spectrums. For example, the frequency-domain multiplexer $296_1$ may combine the thirty-two received pieces of digital electronic data in the thirty-two data flows $D_{i1}$-$D_{i32}$ into a piece of digital electronic data in the data flow $D_{n1}$ based on thirty-two respective non-overlapped frequency spectrums $fm1_1$-$fm1_{32}$. For more elaboration, the digital electronic data in the data flow $U_{n1}$ output from the frequency-domain multiplexer $296_1$ at the frequency spectrum $fm1_1$ may be the digital electronic data in the data flow $U_{i1}$. The digital electronic data in the data flow $U_{n1}$ output from the frequency-domain multiplexer $296_1$ at the frequency spectrum $fm1_2$ may be the digital electronic data in the data flow $U_{i2}$. The digital electronic data in the data flow $U_{n1}$ output from the frequency-domain multiplexer $296_1$ at the frequency spectrum $fm1_{32}$ may be the digital electronic data in the data flow $U_{i32}$. Other situations can be considered in a similar way.

When the devices $296_1$-$296_{33}$ of the fourth output mapping unit 296 are the above-mentioned time-domain multiplexers, the devices $260_1$-$260_{33}$ of the third input mapping unit 260 in each of the user processors $222_1$-$222_{32}$ can be the above-mentioned time-domain demultiplexers. When the devices $296_1$-$296_{33}$ of the fourth output mapping unit 296 are the above-mentioned frequency-domain multiplexers, the devices $260_1$-$260_{33}$ of the third input mapping unit 260 in each of the user processors $222_1$-$222_{32}$ can be the above-mentioned frequency-domain demultiplexers.

Thereby, the digital electronic data in the data flows $U_{n1}$-$U_{n32}$ output from the fourth output mapping unit 296 can be substantially equivalent to the digital electronic data in the data flows $U_{a1}$-$U_{a32}$ injected to the user processors $222_1$-$222_{32}$, respectively, that is, the digital electronic data in the data flows $U_{n1}$-$U_{n32}$ output from the fourth output mapping unit 296 can carry substantially the same information as the digital electronic data in the respective data flows $U_{a1}$-$U_{a32}$ injected to the user processors $222_1$-$222_{32}$. For example, the digital electronic data in the data flow $U_{n1}$ output from the fourth output mapping unit 296 can be substantially equivalent to the digital electronic data in the data flow $U_{a1}$ injected to the user processor $222_1$, that is, the digital electronic data in the data flow $U_{n1}$ output from the fourth output mapping unit 296 can carry substantially the same information as the digital electronic data in the data flow $U_{a1}$ injected to the user processor $222_1$. The digital electronic data in the data flow $U_{n33}$ output from the fourth output mapping unit 296 can be substantially equivalent to the digital electronic data in the data flows $X_Y$ input to the time-domain demultiplexers $260_{33}$ in all of the user processors $222_1$-$222_{32}$, that is, the digital electronic data in the data flow $U_{n33}$ output from the fourth output mapping unit 296 carry substantially the same information as the digital electronic data in the data flows $X_Y$ input to the time-domain demultiplexers $260_{33}$ in all of the user processors $222_1$-$222_{32}$ carry.

Referring to FIG. 4D, in the equalizing and optimizing process, one (F1) of the cost functions may observe the change between the known diagnostic data, which is carried by the diagnostic or pilot signal $X_Y$, and the digital electronic data in the data flow $U_{n33}$ received by the second optimizer 235. Others (F2) of the cost functions may be based on observations among the signals $U_{n1}$-$U_{n33}$. More specifically, the cost functions (F2) may be related to cross-correlation between each two of the signals $U_{n1}$-$U_{n33}$ received by the second optimizer 235. In the equalizing and optimizing process, the second optimizer 235 is configured to calculate a total cost based on the sum of all of the cost functions (F1) and (F2) and then compare the total cost with a predetermined cost threshold. When the total cost is verified to be greater than the predetermined cost threshold, the second optimizer 235 is configured to calculate a variation in the total cost in response to perturbations on the equalizing weights buffered in the second equalization processor 231 or to measure each gradient of the total cost with respect to the equalizing weights buffered in the second equalization processor 231. Based on the calculated variation or measured gradients, the second optimizer 235 creates updated equalizing weights, based on a cost minimization algorithm, such as steepest descent method, to be sent to the second equalization processor 231 and to replace current ones buffered in the second equalization processor 231 in the next scheduled clock cycle. Thereby, the equalizing weights buffered in the second equalization processor 231 can be updated. The second optimizer 235 is configured to stop the equalizing and optimizing process when the total cost is verified to be less than the predetermined cost threshold.

Referring to FIGS. 4A-4D, the sub-controllers 262 of the user processors $222_1$-$222_{32}$ are controlled by the controller 272 of the central office processor 210 and can alter or control the mapping of the third input mapping units 260 of the user processors $222_1$-$222_{32}$, respectively. The controller 272 of the central office processor 210 can also alter or control the mapping of the fourth output mapping unit 296 such that the mapping of the third input mapping unit 260 in each of the thirty-two user processor $222_1$-$222_{32}$ is correspondent to that of the fourth output mapping unit 296 in the central office processor 210, that is, the number of specific pieces of digital electronic data in the output data flows, e.g. $U_{f1}$-$U_{f32}$, into which the digital electronic data in the input data flow, e.g. $U_{a1}$ are mapped, by the third input mapping unit 260 in each of the user processors $222_1$-$222_{32}$, to be allocated, can be the same as the number of pieces of digital electronic data in the input data flows, e.g. $U_{i1}$-$U_{i32}$, substantially equivalent to the specific pieces of digital electronic data in the respective output data flows, e.g. $U_{f1}$-$U_{f32}$ from the third input mapping unit 260 in each of the user processors $222_1$-$222_{32}$, that are mapped, by the fourth output mapping unit 296, to be combined into a piece of digital electronic data in the output data flow, e.g. $U_{n1}$.

For instance, when the time-domain or frequency-domain demultiplexer $260_1$ of the third input mapping unit 260, as illustrated in FIG. 4B, in the user processor $222_1$ is mapped to allocate the input digital electronic data in the data flow $U_{a1}$ into the thirty-two pieces of digital electronic data in the data flows $U_{f1}$-$U_{f32}$ based on the thirty-two respective non-overlapped time slots $tg1_1$-$tg1_{32}$ or frequency spectrums $fg1_1$-$fg1_{32}$ and the time-domain or frequency-domain demultiplexer $260_1$ of the third input mapping unit 260, as illustrated in FIG. 4C, in each of the user processors $222_2$-$222_{32}$ is mapped to allocate the received ground data into the thirty-two pieces of ground data in the data flows $U_{f1}$-$U_{f32}$ based on the thirty-two respective non-overlapped time slots $tg1_1$-$tg1_{32}$ or frequency spectrums $fg1_1$-$fg1_{32}$, the time-domain or frequency-domain multiplexer $296_1$ of the fourth output mapping unit 296 as illustrated in FIG. 4D, complementary to the time-domain or frequency-domain demultiplexers $260_1$ of the user processors $222_1$-$222_{32}$ as illustrated in FIGS. 4B and 4C, can be mapped to combine the thirty-two pieces of digital electronic data in the data flows $U_{i1}$-$U_{i32}$, which are substantially equivalent to the thirty-two pieces of digital electronic data in the data flows $U_{f1}$-$U_{f32}$, associated with the digital electronic data in the data flow $U_{a1}$ input to the user processor $222_1$, respectively, into the digital electronic data in the data flow $U_{a1}$ based on the thirty-two respective non-overlapped time slots $tm1_1$-$tm1_{32}$ or frequency spectrums $fm1_1$-$fm1_{32}$. The time slots $tg1_1$-$tg1_{32}$ may have substantially the same time interval or period as the time slots $tm1_1$-$tm1_{32}$, respectively. For example, the time slot $tg1_1$ may have substantially the same time interval or period as the time slot $tm1_1$. The time slot $tg1_{32}$ may have substantially the same time interval or period as the time slot $tm1_{32}$. Alternatively, all of the time slots $tg1_1$-$tg1_{32}$ and $tm1_1$-$tm1_{32}$ may have substantially the same time interval or period. The frequency spectrums $fg1_1$-$fg1_{32}$ may have substantially the same frequency bandwidth as the frequency spectrums $fm1_1$-$fm1_{32}$, respectively. For example, the frequency spectrum $fg1_1$ may have substantially the same frequency bandwidth as the frequency spectrum $fm1_1$. The frequency spectrum $fg1_{32}$ may have substantially the same frequency bandwidth as the frequency spectrum $fm1_{32}$. Alternatively, all of the frequency spectrums $fg1_1$-$fg1_{32}$ and $fm1_1$-$fm1_{32}$ may have substantially the same frequency bandwidth.

For instance, when the time-domain or frequency-domain demultiplexer $260_2$ of the third input mapping unit 260, as illustrated in FIG. 4C, in the user processor $222_2$ is mapped to allocate the input digital electronic data in the data flow $U_{a2}$ into the sixteen pieces of digital electronic data in the data flows $U_{f33}$-$U_{f48}$ based on the sixteen respective non-overlapped time slots $tg2_1$-$tg2_{16}$ or frequency spectrums $fg2_1$-$fg2_{16}$ and the time-domain or frequency-domain demultiplexer $260_2$ of the third input mapping unit 260, as illustrated in FIG. 4B, in each of the user processors $222_1$ and $222_3$-$222_{32}$ is mapped to allocate the received ground data into the sixteen pieces of ground data in the data flows $U_{f33}$-$U_{f48}$ based on the sixteen respective non-overlapped time slots $tg2_1$-$tg2_{16}$ or frequency spectrums $fg2_1$-$fg2_{16}$, the time-domain or frequency-domain multiplexer $296_2$ of the fourth output mapping unit 296 as illustrated in FIG. 4D, complementary to the time-domain or frequency-domain demultiplexers $260_2$ of the user processors $222_1$-$222_{32}$ as illustrated in FIGS. 4B and 4C, can be mapped to combine the sixteen pieces of digital electronic data in the data flows $U_{i33}$-$U_{i48}$, which are substantially equivalent to the sixteen pieces of digital electronic data in the data flows $U_{f33}$-$U_{f48}$, associated with the digital electronic data in the data flow $U_{a2}$ input to the user processor $222_2$, respectively, into the digital electronic data in the data flow $U_{n2}$ based on the sixteen respective non-overlapped time slots $tm2_1$-$tm2_{16}$ or frequency spectrums $fm2_1$-$fm2_{16}$. The time slots $tg2_1$-$tg2_{16}$ may have substantially the same time interval or period as the time slots $tm2_1$-$tm2_{16}$, respectively. For example, the time slot $tg2_1$ may have substantially the same time interval or period as the time slot $tm2_1$. The time slot $tg2_{16}$ may have substantially the same time interval or period as the time slot $tm2_{16}$. Alternatively, all of the time slots $tg2_1$-$tg2_{16}$ and $tm2_1$-$tm2_{16}$ may have substantially the same time interval or period. The frequency spectrums $fg2_1$-$fg2_{16}$ may have substantially the same frequency bandwidth as the frequency spectrums $fm2_1$-$fm2_{16}$, respectively. For example, the frequency spectrum $fg2_1$ may have substantially the same frequency bandwidth as the frequency spectrum $fm2_1$. The frequency spectrum $fg2_{16}$ may have substantially the same frequency bandwidth as the frequency spectrum $fm2_{16}$. Alternatively, all of the frequency spectrums $fg2_1$-$fg2_{16}$ and $fm2_1$-$fm2_{16}$ may have substantially the same frequency bandwidth.

For instance, when the time-domain or frequency-domain demultiplexer $260_{33}$ of the third input mapping unit 260, as illustrated in FIGS. 4B and 4C, in each of the user processors $222_1$-$222_{32}$ is mapped to allocate the input diagnostic or pilot data in the data flow $X_Y$ into the two pieces of digital electronic data in the data flows $U_{f127}$-$U_{f128}$ based on the two respective non-overlapped time slots $tg33_1$ and $tg33_2$ or frequency spectrums $fg33_1$ and $fg33_2$, the time-domain or frequency-domain multiplexer $296_{33}$ of the fourth output mapping unit 296 as illustrated in FIG. 4D, complementary to the time-domain or frequency-domain demultiplexers $260_{33}$ of the user processors $222_1$-$222_{32}$ as illustrated in FIGS. 4B and 4C, can be mapped to combine the two pieces of digital electronic data in the data flows $U_{i127}$ and $U_{i128}$, which are substantially equivalent to the two pieces of digital electronic data in the data flows $U_{f127}$ and $U_{f128}$, associated with the diagnostic or pilot data in the data flows $X_Y$ input to the time-domain demultiplexers $260_{33}$ of the user processors $222_1$-$222_{32}$, respectively, into the digital electronic data in the data flow $U_{n33}$ based on the two respective non-overlapped time slots $tm33_1$ and $tm33_2$ or frequency spectrums $fm33_1$ and $fm33_2$. The time slots $tg33_1$ and $tg33_2$ may have substantially the same time interval or period as the time slots $tm33_1$ and $tm33_2$, respectively. For example, the time slot $tg33_1$ may have substantially the same time interval or period as the time slot $tm33_1$. The time slot $tg33_2$ may have substantially the same time interval or period as the time slot $tm33_2$. Alternatively, all of the time slots $tg33_1$, $tg33_2$, $tm33_1$ and $tm33_2$ may have substantially the same time interval or period. The frequency spectrums $fg33_1$ and $fg33_2$ may have substantially the same frequency bandwidth as the frequency spectrums $fm33_1$ and $fm33_2$, respectively. For example, the frequency spectrum $fg33_1$ may have substantially the same frequency bandwidth as the frequency spectrum $fm33_1$. The frequency spectrum $fg33_2$ may have substantially the same frequency bandwidth as the frequency spectrum $fm33_2$. Alternatively, all of the frequency spectrums $fg33_1$, $fg33_2$, $fm33_1$ and $fm33_2$ may have substantially the same frequency bandwidth. Other situations can be considered in a similar way.

The controller 272 can dynamically and synchronously alter or control the input mapping of the user processors $222_1$-$222_{32}$ and the output mapping of the central office processor 210 such that the mapping of the third input mapping unit 260 in each of the thirty-two user processor $222_1$-$222_{32}$ can be correspondent to that of the fourth output mapping unit 296. Thereby, the digital electronic data in the data flows $U_{a1}$-$U_{a32}$ and $X_Y$ can efficiently share the resource or bandwidth of the passive optical network 200. The resource or bandwidth of the passive optical network 200 for the digital electronic data in the data flows $U_{a1}$-$U_{a32}$ and $X_Y$ can be dynamically controlled or altered. The digital electronic data in each of the data flows $U_{a1}$-$U_{a32}$ can be allocated into the various number of pieces of data in accordance with user's subscription for a specific data flow rate.

In this embodiment, the third output mapping unit 266 in one of the user processors $222_1$-$222_{32}$, the time-domain or frequency-domain multiplexer 278 in one of the optical network units (ONU) $206_1$-$206_{32}$, the optical laser device 280 in one of the optical network units (ONU) $206_1$-$206_{32}$, the optical transferring device 204, the optical signal receiver 286 of the optical line terminal (OLT) 202, the time-domain demultiplexer 288 of the optical line terminal (OLT) 202 and the fourth input mapping unit 290 in the central office processor 210 composes the data relaying system 998 as illustrated in FIGS. 1A and 1B and are arranged in sequence between the wave-front multiplexer 213 and the wave-front demultiplexer 232.

Accordingly, dynamic allocations of time slots or equivalent bandwidths of passive optical networks (PON) in combination with wave-front (WF) multiplexing/demultiplexing techniques to generate multi-dimensional wavefront-multiplexed signals concurrently propagating through the passive optical networks (PON) can break through bandwidth limits set for subscribers. The architectures of the invention support dynamic bandwidth allocations as well as configurable bandwidth allocations. The architectures of the invention support dynamic bandwidth allocations as well as configurable bandwidth allocations. They also support dynamic allocations for power resources as well as configurable allocations for power resources of optical lasers with regards to different signals transmitted to/from various subscribers.

Wave-front multiplexing techniques allow a fiber infrastructure to be used more effectively, while enabling a subscriber to dynamically access the passive optical network with high re-configurable data rate, up to the full 1,250 Mbps.

The upgraded passive optical networks in accordance with the invention can support:

a. subscribers/users ask for different but fixed needs in data rates;

b. subscribers/users ask for different and dynamic needs in data rates; and c. subscribers/users ask for different needs in optical powers in a passive optical network.

The invention can enhance coverage quality of the passive optical network because subscribers/users (user processors) in shorter distances from the central office processor can obtain relatively small shares of laser power to boost their signals for compensating subscribers/users (user processors) in long distances from the central office processor to obtain relatively large shares of laser power to boost their signals.

Other Applications:

Alternatively, the above techniques may be applicable to wireless communication. For example, referring to FIGS. 3A-3C and 4A-4D, the optical transferring device 204 can be replaced with a satellite. The optical laser device 228 and the optical signal receiver 286 in the optical line terminal (OLT) 202 can be replaced with a first signal radiating/receiving system and a first antenna array. The optical laser device 280 and the optical signal receiver 230 in each of the optical network units (ONU) $206_1$-$206_{32}$ can be replaced with a second signal radiating/receiving system and a second antenna array. Referring to FIGS. 3A-3C, in a downstream dataflow, the first signal radiating/receiving system can convert the digital electronic data in the data flow $D_p$ output from the time-domain multiplexer 226 into a relatively high frequency band, such as Ka or Ku band, and into an analog mode. The first antenna array can radiate analog data, converted by the first signal radiating/receiving system, to the second antenna arrays, coupled to the respective user processors $222_1$-$222_{32}$, through the satellite. For each of the user processors $222_1$-$222_{32}$, the second signal radiating/receiving system can convert the analog data, received by the corresponding second antenna array, into a relatively low frequency band, such as intermediate frequency band or baseband, and into a digital mode. Digital electronic data, converted by the second signal radiating/receiving system, can be output in the data flow $D_m$ to the corresponding time-domain demultiplexer 238.

Referring to FIGS. 4A-4D, in an upstream dataflow, for each of the user processors $222_1$-$222_{32}$, the second signal radiating/receiving system can convert the digital electronic data in the data flow $D_p$ output from the corresponding time-domain multiplexer 226 into a relatively high frequency band, such as Ka or Ku band, and into an analog mode. The second antenna arrays can radiate analog data, converted by the second signal radiating/receiving systems, to the satellite. The radiated analog data from the second antenna arrays can be combined at the satellite. The first antenna array can receive the combined analog data from the satellite. The first signal radiating/receiving system can convert the received analog data into a relatively low frequency band, such as intermediate frequency band or baseband, and into a digital mode. Digital electronic data, converted by the first signal radiating/receiving system, can be output in the data flow $U_m$ to the time-domain demultiplexer 288.

Alternatively, the above techniques may be applicable to cable networks replacing the optical transferring device 204, the optical laser device 228 and optical signal receiver 286 in the optical line terminal (OLT) 202 and the optical laser device 280 and optical signal receiver 230 in each of the optical network units (ONU) 206$_1$-206$_{32}$.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

In reading the present disclosure, one skilled in the art will appreciate that embodiments of the present disclosure can be implemented in hardware, software, firmware, or any combinations of such, and over one or more networks. Suitable software can include computer-readable or machine-readable instructions for performing methods and techniques (and portions thereof) of designing and/or controlling the implementation of the wave-front multiplexing and demultiplexing processes.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A data communication system comprising:
    an optical transferring device coupled to a first optical fiber to receive and split a first optical signal into a plurality of split optical signals, each of the split optical signals being substantially equivalent to the first optical signal;
    a set of optical network units coupled to the optical transferring device via optical fibers to receive the split optical signals respectively, each of the optical network units transforming a respective split optical signal into a set of M first digital electronic data signals, M being an integer greater than 1; and
    a set of user processors coupled to the optical network units respectively, each of the user processors receiving the respective set of M first digital electronic data signals, each of the user processors comprising:
        a first input mapping unit to receive and dynamically map the respective set of M first digital electronic data signals into a set of N second digital electronic data signals, N being an integer greater than or equal to M;
        an equalization processor coupled to the first input mapping unit to receive and equalize the N second digital electronic data signals using equalizing weights and generate a set of N equalized digital electronic data signals;
        a wave-front demultiplexer coupled to the equalization processor to receive the N equalized digital electronic data signals, perform a wave-front demultiplexing transform on the N equalized digital electronic data signals, and output N wave-front demultiplexed signals, each of the N wave-front demultiplexed signals being a unique linear combination of the N equalized digital electronic data signals; and
        a first output mapping unit coupled to the wave-front demultiplexer to receive and dynamically map the N wave-front demultiplexed signals into at least M third digital electronic data signals.

2. The data communication system of claim 1, wherein the wave-front demultiplexing transform is one of an inverse orthogonal matrix transform, an inverse Fourier transform, and an inverse Hadamard transform.

3. The data communication system of claim 1, wherein each of the user processors further comprises a filter coupled to the first output mapping unit to filter and output one of the at least M third digital electronic data signals.

4. The data communication system of claim 1, wherein each of the user processors further comprises an optimizer coupled to the first output mapping unit and to the equalization processor, the optimizer using at least one of the at least M third digital electronic data signals to calculate a total cost which is a sum of cost functions, and compare the total cost to a predetermined cost threshold, and update the equalizing weights used by the equalization processor when the total cost is greater than the predetermined cost threshold.

5. The data communication system of claim 1, wherein each of the optical network units comprises:
    an optical signal receiver to receive and transform the respective split optical signal into a respective intermediate electronic data signal; and
    a time-division demultiplexer or a frequency-division demultiplexer to transform the respective intermediate electronic data signal into the M first digital electronic data signals.

6. The data communication system of claim 1 further comprising:
    a central office processor, comprising:
        a second input mapping unit to receive and dynamically map M input electronic data signals and an optional diagnostic data signal into a set of N third digital electronic data signals;
        a wave-front multiplexer coupled to the second input mapping unit to receive the N third digital electronic data signals, perform a wave-front multiplexing transform on the N third digital electronic data signals, and output N wave-front multiplexed signals, each of the N wave-front multiplexed signals being a unique linear combination of the N third digital electronic data signals, the wave-front multiplexing transform being an inverse of the wave-front demultiplexing transform; and a second output mapping unit coupled to the wave-front multiplexer to receive and dynamically map the N wave-front multiplexed signals into M fourth digital electronic data signals.

7. The data communication system of claim 6 further comprising an optical line terminal coupled to the second output mapping unit to receive the M fourth digital electronic data signals, transform the M fourth digital electronic data signals into the first optical signal, and output the first optical signal to the first optical fiber.

8. The data communication system of claim 7, wherein the optical line terminal comprises:
    an optical-line-terminal mapping unit comprising at least one of a time-division multiplexer and a frequency-division multiplexer to map the M fourth digital electronic data signals into a fifth digital electronic data signal; and
    an optical laser device coupled to the optical-line-terminal mapping unit to receive and transform the fifth digital electronic data signal into the first optical signal and output the first optical signal to the first optical fiber.

9. The data communication system of claim 6, wherein the central office processor further comprises a controller coupled to the second input mapping unit and the second output mapping unit to control mapping functions of the second input mapping unit and the second output mapping unit and coupled to the sub-controller of each of the user processors to control the sub-controller.

10. The data communication system of claim 9, wherein each of the user processors further comprises a sub-controller coupled to the first input mapping unit, the first output mapping unit and the controller of the central office processor, the sub-controller being controlled by the controller to control mapping functions of the first input mapping unit and the first output mapping unit.

11. A data communication system comprising:
    a set of M user processors, each of the M user processors receiving a respective one of M first digital electronic data signals, M being an integer greater than 1, and comprising:
        a first input mapping unit to receive and dynamically map the respective one of the M first digital electronic data signals and an optional diagnostic data signal into a set of N second digital electronic data signals, N being an integer greater than or equal to M;
        a wave-front multiplexer coupled to the first input mapping unit to receive the N second digital electronic data signals, perform a wave-front multiplexing transform on the N second digital electronic data signals, and output N wave-front multiplexed signals, each of the N wave-front multiplexed signals being a unique linear combination of the N second digital electronic data signals; and
        a first output mapping unit coupled to the wave-front multiplexer to receive and dynamically map the N wave-front multiplexed signals into M third digital electronic data signals;
    a set of M optical network units coupled to the M user processors respectively, each of the M optical network units receiving and transforming a respective set of M third digital electronic data signals into a respective optical signal; and
    an optical transferring device coupled to the M optical network units via optical fibers to receive and combine the respective optical signals into an output optical signal and to output the output optical signal to a first optical fiber.

12. The data communication system of claim 11, wherein the wave-front multiplexing transform is one of an orthogonal matrix transform, a Fourier transform, and a Hadamard transform.

13. The data communication system of claim 11, wherein each of the M optical network units comprises:
    a time-division multiplexer or a frequency-division multiplexer to receive and transform the respective set of M third digital electronic data signals into a combined digital electronic data signal; and
    an optical laser device to transform the combined digital electronic data signal into the respective optical signal.

14. The data communication system of claim 11 further comprising:
    an optical line terminal coupled to the first optical fiber to receive and transform the output optical signal into M fourth digital electronic data signals.

15. The data communication system of claim 14, wherein the optical line terminal comprises:
    an optical signal receiver coupled to the first optical fiber to receive and transform the output optical signal into an upstream electronic data signal; and
    an optical-line-terminal mapping unit comprising at least one of a time-division demultiplexer and a frequency-division demultiplexer to map the upstream electronic data signal into the M fourth digital electronic data signals.

16. The data communication system of claim 14 further comprising:
    a central office processor coupled to the optical line terminal, comprising:
        a second input mapping unit to receive and dynamically map the M fourth digital electronic data signals into a set of N fifth digital electronic data signals;
        an equalization processor coupled to the second input mapping unit to receive and equalize the N fifth digital electronic data signals using equalizing weights and generate a set of N equalized digital electronic data signals;
        a wave-front demultiplexer coupled to the equalization processor to receive the N equalized digital electronic data signals, perform a wave-front demultiplexing transform on the N equalized digital electronic data signals, and output N wave-front demultiplexed signals, each of the N wave-front demultiplexed signals being a unique linear combination of the N equalized digital electronic data signals, the wave-front demultiplexing transform being an inverse of the wave-front multiplexing transform; and
        a second output mapping unit coupled to the wave-front demultiplexer to receive and dynamically map the N wave-front demultiplexed signals into at least M output digital electronic data signals.

17. The data communication system of claim 16, wherein the wave-front multiplexing transform is one of an orthogonal matrix transform, a Fourier transform, and a Hadamard transform.

18. The data communication system of claim 16, wherein the central office processor further comprises an optimizer coupled to the second output mapping unit and the equalization processor, the optimizer using at least one of the at least M output digital electronic data signals to calculate a total cost which is a sum of cost functions, and compare the total cost to a predetermined cost threshold, and update the equalizing weights used by the equalization processor when the total cost is greater than the predetermined cost threshold.

19. The data communication system of claim 16, wherein the central office processor further comprises a controller coupled to the second input mapping unit and the second output mapping unit to control mapping functions of the second input mapping unit and the second output mapping unit.

20. The data communication system of claim 19, wherein each of the M user processors further comprises a sub-controller coupled to the first input mapping unit, the first output mapping unit and the controller of the central office processor, the sub-controller being controlled by the controller to control mapping functions of the first input mapping unit and the first output mapping unit.

* * * * *